US007689493B1

(12) United States Patent
Sullivan et al.

(10) Patent No.: US 7,689,493 B1
(45) Date of Patent: Mar. 30, 2010

(54) METHODS FOR ASSET INDEX TRACKING

(75) Inventors: Michael A. Sullivan, New York, NY (US); Philip Fischer, New York, NY (US); Philip Galdi, Orangeburg, NY (US); David Shen, Short Hill, NJ (US)

(73) Assignee: Merrill Lynch Co., Inc., New York, NY (US)

( * ) Notice: Subject to any disclaimer, the term of this patent is extended or adjusted under 35 U.S.C. 154(b) by 416 days.

(21) Appl. No.: 11/558,834

(22) Filed: Nov. 10, 2006

Related U.S. Application Data

(60) Provisional application No. 60/737,535, filed on Nov. 15, 2005.

(51) Int. Cl.
*G06Q 40/00* (2006.01)

(52) U.S. Cl. .................................................. 705/36 R

(58) Field of Classification Search ................ 705/36 R
See application file for complete search history.

(56) References Cited

U.S. PATENT DOCUMENTS

| | | | | | |
|---|---|---|---|---|---|
| 5,148,365 | A * | 9/1992 | Dembo | ..................... | 705/36 R |
| 5,819,238 | A * | 10/1998 | Fernholz | ................... | 705/36 R |
| 6,061,663 | A * | 5/2000 | Bloom et al. | ............. | 705/36 R |
| 2001/0014875 | A1 * | 8/2001 | Young et al. | .................. | 705/37 |
| 2002/0062272 | A1 * | 5/2002 | Kim et al. | ..................... | 705/36 |

OTHER PUBLICATIONS

Asset Allocation in a Lower Stock-bond Correlation Environment. Frederick E. Dopfel. The Journal of Portfolio Management. Fall 2003. p. 25.*
Measuring Interest Rate Risk. Steven Davidson. America's Community Banker, Oct. 1996 vol. 5, issue 10.*
Risk and Return. Merrill Cassell. Management Accounting. Oct 1999. vol. 77, issue 9.*

* cited by examiner

*Primary Examiner*—Alexander Kalinowski
*Assistant Examiner*—John O Preston
(74) *Attorney, Agent, or Firm*—Baker Botts L.L.P.

(57) ABSTRACT

The disclosure details the implementation of apparatuses, methods, and systems for asset index tracking. The disclosure details how an asset index tracker aligns investor asset portfolios to a selected asset index. The asset index tracker enables investors to automatically match their portfolio to a predefined index. The asset index tracker compares the investor's portfolio to the selected index and provides recommendations to rebalance the portfolio at specified intervals. This is achieved by comparing the investor's portfolio to the index to determine the trades necessary to align the portfolio to the index. A correlation and estimated tracking error of the portfolio to the index may be calculated to validate how the portfolio matches the index. The resulting trade recommendations may be executed upon the investor's approval or automatically. The execution of the trades achieves the rebalancing of the investor's portfolio to more closely track a selected target index.

33 Claims, 19 Drawing Sheets

Technology Process Flow

Client order execution

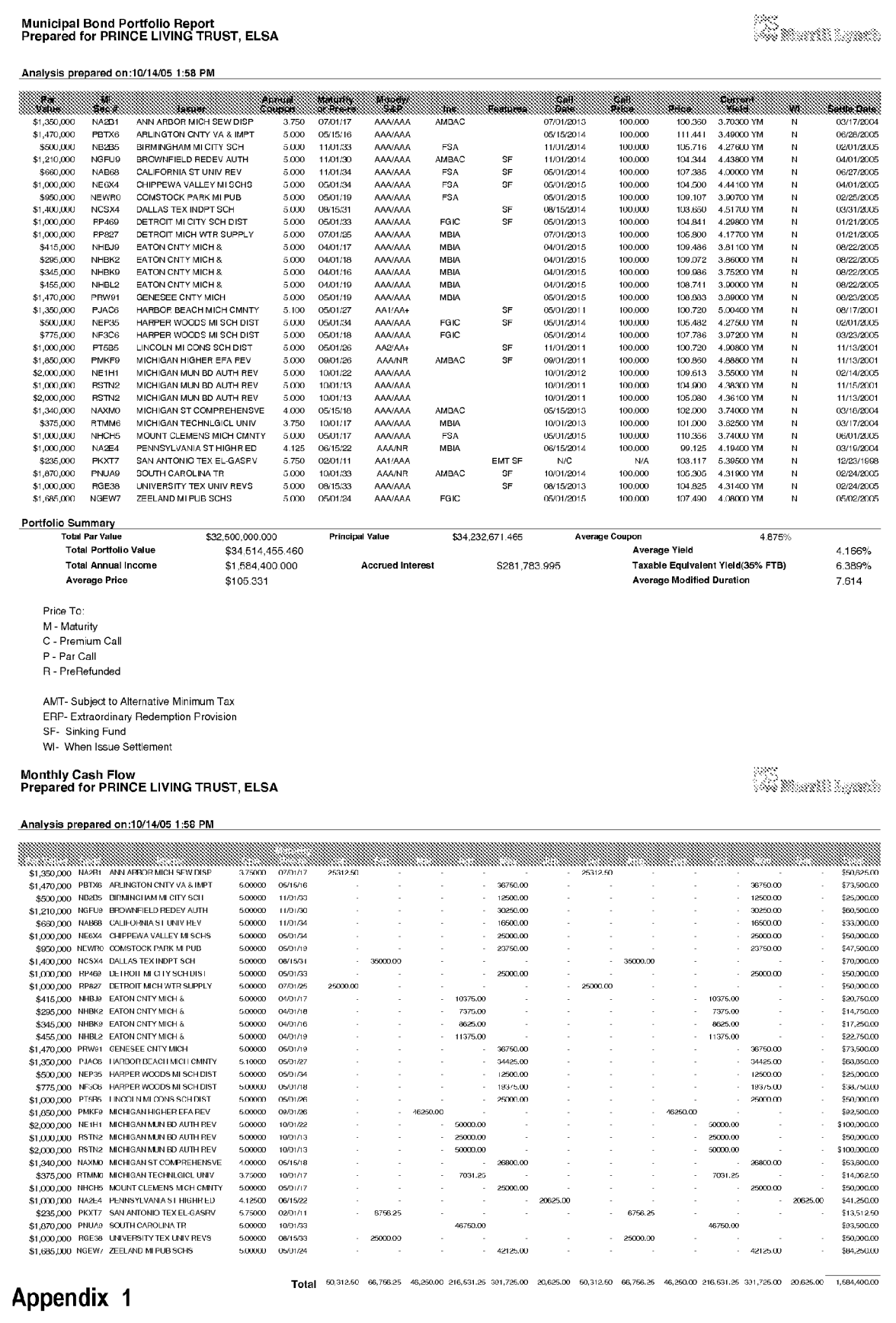

Municipal Bond Portfolio Report
Prepared for PRINCE LIVING TRUST, ELSA

Analysis prepared on:10/14/05 1:58 PM

| Par Value | ML Sec # | Issuer | Annual Coupon | Maturity or Pre-re | Moody/ S&P | Ins | Features | Call Date | Call Price | Price | Current Yield | WI | Settle Date |
|---|---|---|---|---|---|---|---|---|---|---|---|---|---|
| $1,350,000 | NA2B1 | ANN ARBOR MICH SEW DISP | 3.750 | 07/01/17 | AAA/AAA | AMBAC | | 07/01/2013 | 100.000 | 100.360 | 3.70300 YM | N | 03/17/2004 |
| $1,470,000 | PBTX6 | ARLINGTON CNTY VA & IMPT | 5.000 | 05/15/16 | AAA/AAA | | | 05/15/2014 | 100.000 | 111.441 | 3.49000 YM | N | 06/28/2005 |
| $500,000 | NB2B5 | BIRMINGHAM MI CITY SCH | 5.000 | 11/01/33 | AAA/AAA | FSA | | 11/01/2014 | 100.000 | 105.716 | 4.27600 YM | N | 02/01/2005 |
| $1,210,000 | NGFU9 | BROWNFIELD REDEV AUTH | 5.000 | 11/01/30 | AAA/AAA | AMBAC | SF | 11/01/2014 | 100.000 | 104.344 | 4.43800 YM | N | 04/01/2005 |
| $660,000 | NAB68 | CALIFORNIA ST UNIV REV | 5.000 | 11/01/34 | AAA/AAA | FSA | SF | 05/01/2014 | 100.000 | 107.385 | 4.00000 YM | N | 06/27/2005 |
| $1,000,000 | NE6X4 | CHIPPEWA VALLEY MI SCHS | 5.000 | 05/01/34 | AAA/AAA | FSA | SF | 05/01/2015 | 100.000 | 104.500 | 4.44100 YM | N | 04/01/2005 |
| $950,000 | NEWR0 | COMSTOCK PARK MI PUB | 5.000 | 05/01/19 | AAA/AAA | FSA | | 05/01/2015 | 100.000 | 109.107 | 3.90700 YM | N | 02/25/2005 |
| $1,400,000 | NCSX4 | DALLAS TEX INDPT SCH | 5.000 | 08/15/31 | AAA/AAA | | SF | 08/15/2014 | 100.000 | 103.650 | 4.51700 YM | N | 03/31/2005 |
| $1,000,000 | RP469 | DETROIT MI CITY SCH DIST | 5.000 | 05/01/33 | AAA/AAA | FGIC | SF | 05/01/2013 | 100.000 | 104.841 | 4.29800 YM | N | 01/21/2005 |
| $1,000,000 | RP827 | DETROIT MICH WTR SUPPLY | 5.000 | 07/01/25 | AAA/AAA | MBIA | | 07/01/2013 | 100.000 | 105.900 | 4.17700 YM | N | 01/21/2005 |
| $415,000 | NHBJ9 | EATON CNTY MICH & | 5.000 | 04/01/17 | AAA/AAA | MBIA | | 04/01/2015 | 100.000 | 109.486 | 3.81100 YM | N | 08/22/2005 |
| $295,000 | NHBK2 | EATON CNTY MICH & | 5.000 | 04/01/18 | AAA/AAA | MBIA | | 04/01/2015 | 100.000 | 109.072 | 3.86000 YM | N | 08/22/2005 |
| $345,000 | NHBK9 | EATON CNTY MICH & | 5.000 | 04/01/16 | AAA/AAA | MBIA | | 04/01/2015 | 100.000 | 109.986 | 3.75200 YM | N | 08/22/2005 |
| $455,000 | NHBL2 | EATON CNTY MICH & | 5.000 | 04/01/19 | AAA/AAA | MBIA | | 04/01/2015 | 100.000 | 108.741 | 3.90000 YM | N | 08/22/2005 |
| $1,470,000 | PRW91 | GENESEE CNTY MICH | 5.000 | 05/01/19 | AAA/AAA | MBIA | | 05/01/2015 | 100.000 | 108.833 | 3.89000 YM | N | 06/23/2005 |
| $1,350,000 | PJAC6 | HARBOR BEACH MICH CMNTY | 5.100 | 05/01/27 | AA1/AA+ | | SF | 05/01/2011 | 100.000 | 100.720 | 5.00400 YM | N | 08/17/2001 |
| $500,000 | NEP35 | HARPER WOODS MI SCH DIST | 5.000 | 05/01/34 | AAA/AAA | FGIC | SF | 05/01/2014 | 100.000 | 105.482 | 4.27500 YM | N | 02/01/2005 |
| $775,000 | NF3C6 | HARPER WOODS MI SCH DIST | 5.000 | 05/01/18 | AAA/AAA | FGIC | | 05/01/2014 | 100.000 | 107.786 | 3.97200 YM | N | 03/23/2005 |
| $1,000,000 | PT5B5 | LINCOLN MI CONS SCH DIST | 5.000 | 05/01/26 | AA2/AA+ | | SF | 11/01/2011 | 100.000 | 100.720 | 4.90800 YM | N | 11/13/2001 |
| $1,850,000 | PMKF9 | MICHIGAN HIGHER EFA REV | 5.000 | 09/01/26 | AAA/NR | AMBAC | SF | 09/01/2011 | 100.000 | 100.860 | 4.88800 YM | N | 11/13/2001 |
| $2,000,000 | NE1H1 | MICHIGAN MUN BD AUTH REV | 5.000 | 10/01/22 | AAA/AAA | | | 10/01/2012 | 100.000 | 109.613 | 3.55000 YM | N | 02/14/2005 |
| $1,000,000 | RSTN2 | MICHIGAN MUN BD AUTH REV | 5.000 | 10/01/13 | AAA/AAA | | | 10/01/2011 | 100.000 | 104.900 | 4.38300 YM | N | 11/15/2001 |
| $2,000,000 | RSTN2 | MICHIGAN MUN BD AUTH REV | 5.000 | 10/01/13 | AAA/AAA | | | 10/01/2011 | 100.000 | 105.080 | 4.36100 YM | N | 11/13/2001 |
| $1,340,000 | NAXM0 | MICHIGAN ST COMPREHENSVE | 4.000 | 05/15/18 | AAA/AAA | AMBAC | | 05/15/2013 | 100.000 | 102.000 | 3.74000 YM | N | 03/18/2004 |
| $375,000 | RTMM6 | MICHIGAN TECHNLGICL UNIV | 3.750 | 10/01/17 | AAA/AAA | MBIA | | 10/01/2013 | 100.000 | 101.000 | 3.62500 YM | N | 03/17/2004 |
| $1,000,000 | NHCH5 | MOUNT CLEMENS MICH CMNTY | 5.000 | 05/01/17 | AAA/AAA | FSA | | 05/01/2015 | 100.000 | 110.356 | 3.74000 YM | N | 06/01/2005 |
| $1,000,000 | NA2E4 | PENNSYLVANIA ST HIGHR ED | 4.125 | 06/15/22 | AAA/NR | MBIA | | 06/15/2014 | 100.000 | 99.125 | 4.19400 YM | N | 03/19/2004 |
| $235,000 | PKXT7 | SAN ANTONIO TEX EL-GASRV | 5.750 | 02/01/11 | AA1/AA | | EMT SF | N/C | N/A | 103.117 | 5.39500 YM | N | 12/23/1998 |
| $1,870,000 | PNUA9 | SOUTH CAROLINA TR | 5.000 | 10/01/33 | AAA/NR | AMBAC | SF | 10/01/2014 | 100.000 | 105.305 | 4.31900 YM | N | 02/24/2005 |
| $1,000,000 | RGE38 | UNIVERSITY TEX UNIV REVS | 5.000 | 08/15/33 | AAA/AAA | | SF | 08/15/2013 | 100.000 | 104.825 | 4.31400 YM | N | 02/24/2005 |
| $1,685,000 | NGEW7 | ZEELAND MI PUB SCHS | 5.000 | 05/01/24 | AAA/AAA | FGIC | | 05/01/2015 | 100.000 | 107.490 | 4.08000 YM | N | 05/02/2005 |

Portfolio Summary

| | | | | | |
|---|---|---|---|---|---|
| Total Par Value | $32,500,000.000 | Principal Value | $34,232,671.465 | Average Coupon | 4.875% |
| Total Portfolio Value | $34,514,455.460 | | | Average Yield | 4.166% |
| Total Annual Income | $1,584,400.000 | Accrued Interest | $281,783.995 | Taxable Equivalent Yield(35% FTB) | 6.389% |
| Average Price | $105.331 | | | Average Modified Duration | 7.614 |

Price To:
M - Maturity
C - Premium Call
P - Par Call
R - PreRefunded

AMT- Subject to Alternative Minimum Tax
ERP- Extraordinary Redemption Provision
SF- Sinking Fund
WI- When Issue Settlement

Monthly Cash Flow
Prepared for PRINCE LIVING TRUST, ELSA

Analysis prepared on:10/14/05 1:58 PM

| Par Value | Sec # | Issuer | Cpn | Maturity Date | Jan | Feb | Mar | Apr | May | Jun | Jul | Aug | Sep | Oct | Nov | Dec | Total |
|---|---|---|---|---|---|---|---|---|---|---|---|---|---|---|---|---|---|
| $1,350,000 | NA2B1 | ANN ARBOR MICH SEW DISP | 3.75000 | 07/01/17 | 25312.50 | - | - | - | - | - | 25312.50 | - | - | - | - | - | $50,625.00 |
| $1,470,000 | PBTX6 | ARLINGTON CNTY VA & IMPT | 5.00000 | 05/15/16 | - | - | - | - | 36750.00 | - | - | - | - | - | 36750.00 | - | $73,500.00 |
| $500,000 | NB2B5 | BIRMINGHAM MI CITY SCH | 5.00000 | 11/01/33 | - | - | - | - | 12500.00 | - | - | - | - | - | 12500.00 | - | $25,000.00 |
| $1,210,000 | NGFU9 | BROWNFIELD REDEV AUTH | 5.00000 | 11/01/30 | - | - | - | - | 30250.00 | - | - | - | - | - | 30250.00 | - | $60,500.00 |
| $660,000 | NAB68 | CALIFORNIA ST UNIV REV | 5.00000 | 11/01/34 | - | - | - | - | 16500.00 | - | - | - | - | - | 16500.00 | - | $33,000.00 |
| $1,000,000 | NE6X4 | CHIPPEWA VALLEY MI SCHS | 5.00000 | 05/01/34 | - | - | - | - | 25000.00 | - | - | - | - | - | 25000.00 | - | $50,000.00 |
| $950,000 | NEWR0 | COMSTOCK PARK MI PUB | 5.00000 | 05/01/19 | - | - | - | - | 23750.00 | - | - | - | - | - | 23750.00 | - | $47,500.00 |
| $1,400,000 | NCSX4 | DALLAS TEX INDPT SCH | 5.00000 | 08/15/31 | - | 35000.00 | - | - | - | - | - | 35000.00 | - | - | - | - | $70,000.00 |
| $1,000,000 | RP469 | DETROIT MI CITY SCH DIST | 5.00000 | 05/01/33 | - | - | - | - | 25000.00 | - | - | - | - | - | 25000.00 | - | $50,000.00 |
| $1,000,000 | RP827 | DETROIT MICH WTR SUPPLY | 5.00000 | 07/01/25 | 25000.00 | - | - | - | - | - | 25000.00 | - | - | - | - | - | $50,000.00 |
| $415,000 | NHBJ9 | EATON CNTY MICH & | 5.00000 | 04/01/17 | - | - | - | 10375.00 | - | - | - | - | - | 10375.00 | - | - | $20,750.00 |
| $295,000 | NHBK2 | EATON CNTY MICH & | 5.00000 | 04/01/18 | - | - | - | 7375.00 | - | - | - | - | - | 7375.00 | - | - | $14,750.00 |
| $345,000 | NHBK9 | EATON CNTY MICH & | 5.00000 | 04/01/16 | - | - | - | 8625.00 | - | - | - | - | - | 8625.00 | - | - | $17,250.00 |
| $455,000 | NHBL2 | EATON CNTY MICH & | 5.00000 | 04/01/19 | - | - | - | 11375.00 | - | - | - | - | - | 11375.00 | - | - | $22,750.00 |
| $1,470,000 | PRW91 | GENESEE CNTY MICH | 5.00000 | 05/01/19 | - | - | - | - | 36750.00 | - | - | - | - | - | 36750.00 | - | $73,500.00 |
| $1,350,000 | PJAC6 | HARBOR BEACH MICH CMNTY | 5.10000 | 05/01/27 | - | - | - | - | 34425.00 | - | - | - | - | - | 34425.00 | - | $68,850.00 |
| $500,000 | NEP35 | HARPER WOODS MI SCH DIST | 5.00000 | 05/01/34 | - | - | - | - | 12500.00 | - | - | - | - | - | 12500.00 | - | $25,000.00 |
| $775,000 | NF3C6 | HARPER WOODS MI SCH DIST | 5.00000 | 05/01/18 | - | - | - | - | 19375.00 | - | - | - | - | - | 19375.00 | - | $38,750.00 |
| $1,000,000 | PT5B5 | LINCOLN MI CONS SCH DIST | 5.00000 | 05/01/26 | - | - | - | - | 25000.00 | - | - | - | - | - | 25000.00 | - | $50,000.00 |
| $1,850,000 | PMKF9 | MICHIGAN HIGHER EFA REV | 5.00000 | 09/01/26 | - | - | 46250.00 | - | - | - | - | - | 46250.00 | - | - | - | $92,500.00 |
| $2,000,000 | NE1H1 | MICHIGAN MUN BD AUTH REV | 5.00000 | 10/01/22 | - | - | - | 50000.00 | - | - | - | - | - | 50000.00 | - | - | $100,000.00 |
| $1,000,000 | RSTN2 | MICHIGAN MUN BD AUTH REV | 5.00000 | 10/01/13 | - | - | - | 25000.00 | - | - | - | - | - | 25000.00 | - | - | $50,000.00 |
| $2,000,000 | RSTN2 | MICHIGAN MUN BD AUTH REV | 5.00000 | 10/01/13 | - | - | - | 50000.00 | - | - | - | - | - | 50000.00 | - | - | $100,000.00 |
| $1,340,000 | NAXM0 | MICHIGAN ST COMPREHENSVE | 4.00000 | 05/15/18 | - | - | - | - | 26800.00 | - | - | - | - | - | 26800.00 | - | $53,600.00 |
| $375,000 | RTMM6 | MICHIGAN TECHNLGICL UNIV | 3.75000 | 10/01/17 | - | - | - | 7031.25 | - | - | - | - | - | 7031.25 | - | - | $14,062.50 |
| $1,000,000 | NHCH5 | MOUNT CLEMENS MICH CMNTY | 5.00000 | 05/01/17 | - | - | - | - | 25000.00 | - | - | - | - | - | 25000.00 | - | $50,000.00 |
| $1,000,000 | NA2E4 | PENNSYLVANIA ST HIGHR ED | 4.12500 | 06/15/22 | - | - | - | - | - | 20625.00 | - | - | - | - | - | 20625.00 | $41,250.00 |
| $235,000 | PKXT7 | SAN ANTONIO TEX EL-GASRV | 5.75000 | 02/01/11 | - | 6756.25 | - | - | - | - | - | 6756.25 | - | - | - | - | $13,512.50 |
| $1,870,000 | PNUA9 | SOUTH CAROLINA TR | 5.00000 | 10/01/33 | | | | 46750.00 | | | | | | 46750.00 | | | $93,500.00 |
| $1,000,000 | RGE38 | UNIVERSITY TEX UNIV REVS | 5.00000 | 08/15/33 | - | 25000.00 | - | - | - | - | - | 25000.00 | - | - | - | - | $50,000.00 |
| $1,685,000 | NGEW7 | ZEELAND MI PUB SCHS | 5.00000 | 05/01/24 | - | - | - | - | 42125.00 | - | - | - | - | - | 42125.00 | - | $84,250.00 |
| | | | | Total | 50,312.50 | 66,756.25 | 46,250.00 | 216,531.25 | 391,725.00 | 20,625.00 | 50,312.50 | 66,756.25 | 46,250.00 | 216,531.25 | 391,725.00 | 20,625.00 | 1,584,400.00 |

Appendix 1

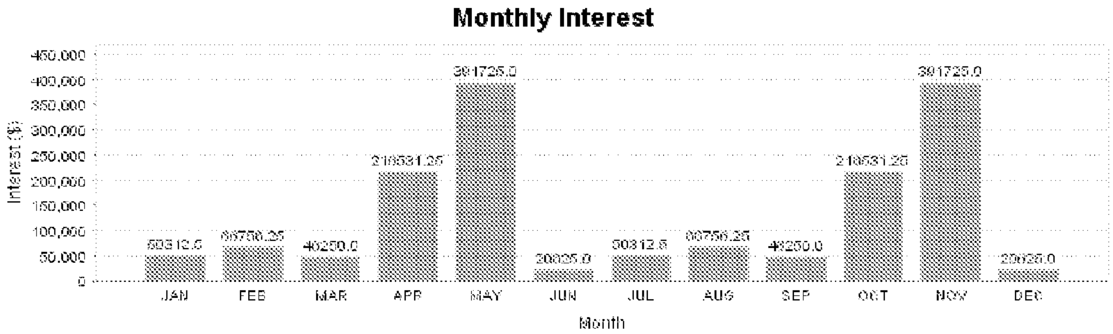

Characteristics
Prepared for PRINCE LIVING TRUST, ELSA

Analysis prepared on:10/14/05 1:58 PM

Portfolio Summary

| | | | |
|---|---|---|---|
| Par Value | $32,500,000.00 | Average Coupon | 4.875% |
| Portfolio Value | $34,514,455.46 | Average Yield | 4.166% |
| Annual Income | $1,584,400.00 | Taxable Equivalent Yield(35% FTB) | 6.369% |
| | | Average Modified Duration | 7.614 |
| Average Price | $105.331 | Average Rating | AAA |

Rating Schedule

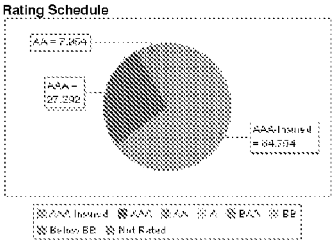

| | | | |
|---|---|---|---|
| AAA-Insured | 22 | $21,04,50,00 | 64.754% |
| AAA | 6 | $8,87,00,00 | 27.292% |
| AA | 3 | $2,58,50,00 | 7.954% |
| A | 0 | 0 | .000% |
| BAA | 0 | 0 | .000% |
| BB | 0 | 0 | .000% |
| Below BB | 0 | 0 | .000% |
| Not Rated | 0 | 0 | .000% |
| Total | 31 | 32,50,00,00 | 100.000 |

Issuers

| | | | |
|---|---|---|---|
| MI | 24 | $24,86,50,00 | 76.508% |
| TX | 3 | $2,63,50,00 | 8.108% |
| SC | 1 | $1,87,00,00 | 5.754% |
| VA | 1 | $1,47,00,00 | 4.523% |
| PA | 1 | $1,00,00,00 | 3.077% |
| CA | 1 | $66,00,00 | 2.031% |

Misc

| | | | |
|---|---|---|---|
| Zero Coupon Bonds | 0 | $0 | .000% |
| A.M.T Bonds | 0 | $0 | .000% |
| Pre-refunded Municipals | 0 | $0 | .000% |
| General Obligation | 18 | $16,82,00,0 0 | 51.754% |
| Revenue | 13 | $15,68,00,0 0 | 48.246% |

| | | | |
|---|---|---|---|
| Price | 99.125 | 111.441 | 105.331 |
| Yield | 3.490% | 5.395% | 4.166% |
| Mod Duration | 6.2826 | 12.69619 | 7.614 |
| Coupon | 3.750% | 5.750% | 4.875% |

Characteristics
Prepared for PRINCE LIVING TRUST, ELSA

Analysis prepared on:10/14/05 1:58 PM

Portfolio Summary

| | | | |
|---|---|---|---|
| Par Value | $32,500,000.00 | Average Coupon | 4.875% |
| Portfolio Value | $34,514,455.46 | Average Yield | 4.166% |
| Annual Income | $1,584,400.00 | Taxable Equivalent Yield(35% FTB) | 6.369% |
| | | Average Modified Duration | 7.614 |
| Average Price | $105.331 | Average Rating | AAA |

Rating Schedule

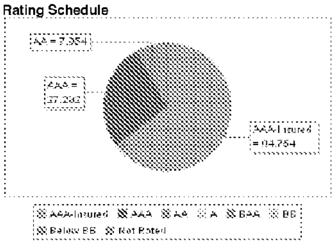

| | | | |
|---|---|---|---|
| AAA-Insured | 22 | $21,04,50,00 | 64.754% |
| AAA | 6 | $8,87,00,00 | 27.292% |
| AA | 3 | $2,58,50,00 | 7.954% |
| A | 0 | 0 | .000% |
| BAA | 0 | 0 | .000% |
| BB | 0 | 0 | .000% |
| Below BB | 0 | 0 | .000% |
| Not Rated | 0 | 0 | .000% |
| Total | 31 | 32,50,00,00 | 100.000 |

Issuers

| | | | |
|---|---|---|---|
| MI | 24 | $24,86,50,00 | 76.508% |
| TX | 3 | $2,63,50,00 | 8.108% |
| SC | 1 | $1,87,00,00 | 5.754% |
| VA | 1 | $1,47,00,00 | 4.523% |
| PA | 1 | $1,00,00,00 | 3.077% |
| CA | 1 | $66,00,00 | 2.031% |

Misc

| | | | |
|---|---|---|---|
| Zero Coupon Bonds | 0 | $0 | .000% |
| A.M.T Bonds | 0 | $0 | .000% |
| Pre-refunded Municipals | 0 | $0 | .000% |
| General Obligation | 18 | $16,82,00,0 0 | 51.754% |
| Revenue | 13 | $15,68,00,0 0 | 48.246% |

| | | | |
|---|---|---|---|
| Price | 99.125 | 111.441 | 105.331 |
| Yield | 3.490% | 5.395% | 4.166% |
| Mod Duration | 6.2826 | 12.69619 | 7.614 |
| Coupon | 3.750% | 5.750% | 4.875% |

Appendix 2

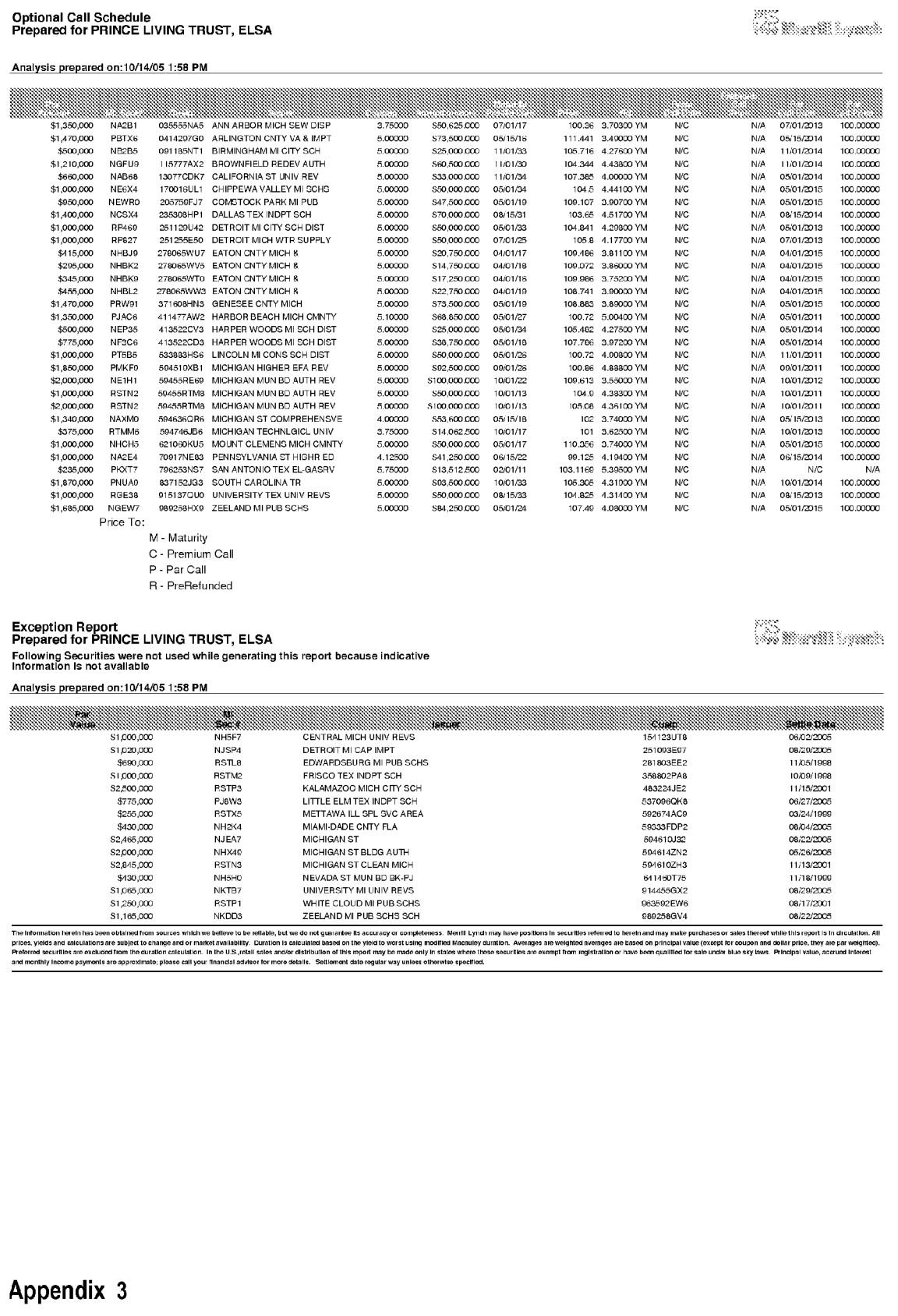

Optional Call Schedule
Prepared for PRINCE LIVING TRUST, ELSA

Analysis prepared on:10/14/05 1:58 PM

| | | | | | | | | | | | | |
|---|---|---|---|---|---|---|---|---|---|---|---|---|
| $1,350,000 | NA2B1 | 035555NA5 | ANN ARBOR MICH SEW DISP | 3.75000 | $50,625.000 | 07/01/17 | 100.36 | 3.70300 YM | N/C | N/A | 07/01/2013 | 100.00000 |
| $1,470,000 | PBTX6 | 0414297G0 | ARLINGTON CNTY VA & IMPT | 5.00000 | $73,500.000 | 05/15/16 | 111.441 | 3.49000 YM | N/C | N/A | 05/15/2014 | 100.00000 |
| $500,000 | NB2B5 | 091185NT1 | BIRMINGHAM MI CITY SCH | 5.00000 | $25,000.000 | 11/01/33 | 105.716 | 4.27600 YM | N/C | N/A | 11/01/2014 | 100.00000 |
| $1,210,000 | NGFU9 | 115777AX2 | BROWNFIELD REDEV AUTH | 5.00000 | $60,500.000 | 11/01/30 | 104.344 | 4.43800 YM | N/C | N/A | 11/01/2014 | 100.00000 |
| $660,000 | NAB68 | 13077CDK7 | CALIFORNIA ST UNIV REV | 5.00000 | $33,000.000 | 11/01/34 | 107.385 | 4.00000 YM | N/C | N/A | 05/01/2014 | 100.00000 |
| $1,000,000 | NE6X4 | 170016UL1 | CHIPPEWA VALLEY MI SCHS | 5.00000 | $50,000.000 | 05/01/34 | 104.5 | 4.44100 YM | N/C | N/A | 05/01/2015 | 100.00000 |
| $950,000 | NEWR0 | 205759FJ7 | COMSTOCK PARK MI PUB | 5.00000 | $47,500.000 | 05/01/19 | 109.107 | 3.90700 YM | N/C | N/A | 05/01/2015 | 100.00000 |
| $1,400,000 | NCSX4 | 235308HP1 | DALLAS TEX INDPT SCH | 5.00000 | $70,000.000 | 08/15/31 | 103.65 | 4.51700 YM | N/C | N/A | 08/15/2014 | 100.00000 |
| $1,000,000 | RP469 | 251129U42 | DETROIT MI CITY SCH DIST | 5.00000 | $50,000.000 | 05/01/33 | 104.841 | 4.29800 YM | N/C | N/A | 05/01/2013 | 100.00000 |
| $1,000,000 | RP827 | 251255E50 | DETROIT MICH WTR SUPPLY | 5.00000 | $50,000.000 | 07/01/25 | 105.8 | 4.17700 YM | N/C | N/A | 07/01/2013 | 100.00000 |
| $415,000 | NHBJ9 | 278065WU7 | EATON CNTY MICH & | 5.00000 | $20,750.000 | 04/01/17 | 109.486 | 3.81100 YM | N/C | N/A | 04/01/2015 | 100.00000 |
| $295,000 | NHBK2 | 278065WV5 | EATON CNTY MICH & | 5.00000 | $14,750.000 | 04/01/18 | 109.072 | 3.86000 YM | N/C | N/A | 04/01/2015 | 100.00000 |
| $345,000 | NHBK9 | 278065WT0 | EATON CNTY MICH & | 5.00000 | $17,250.000 | 04/01/16 | 109.986 | 3.75200 YM | N/C | N/A | 04/01/2015 | 100.00000 |
| $455,000 | NHBL2 | 278065WW3 | EATON CNTY MICH & | 5.00000 | $22,750.000 | 04/01/19 | 108.741 | 3.90000 YM | N/C | N/A | 04/01/2015 | 100.00000 |
| $1,470,000 | PRW91 | 371608HN3 | GENESEE CNTY MICH | 5.00000 | $73,500.000 | 05/01/19 | 108.883 | 3.89000 YM | N/C | N/A | 05/01/2015 | 100.00000 |
| $1,350,000 | PJAC6 | 411477AW2 | HARBOR BEACH MICH CMNTY | 5.10000 | $68,850.000 | 05/01/27 | 100.72 | 5.00400 YM | N/C | N/A | 05/01/2011 | 100.00000 |
| $500,000 | NEP35 | 413522CV3 | HARPER WOODS MI SCH DIST | 5.00000 | $25,000.000 | 05/01/34 | 105.482 | 4.27500 YM | N/C | N/A | 05/01/2014 | 100.00000 |
| $775,000 | NF3C6 | 413522CD3 | HARPER WOODS MI SCH DIST | 5.00000 | $38,750.000 | 05/01/18 | 107.786 | 3.97200 YM | N/C | N/A | 05/01/2014 | 100.00000 |
| $1,000,000 | PT5B5 | 533883HS6 | LINCOLN MI CONS SCH DIST | 5.00000 | $50,000.000 | 05/01/26 | 100.72 | 4.90800 YM | N/C | N/A | 11/01/2011 | 100.00000 |
| $1,850,000 | PMKF0 | 594510XB1 | MICHIGAN HIGHER EFA REV | 5.00000 | $92,500.000 | 09/01/26 | 100.86 | 4.88800 YM | N/C | N/A | 09/01/2011 | 100.00000 |
| $2,000,000 | NE1H1 | 59455RE69 | MICHIGAN MUN BD AUTH REV | 5.00000 | $100,000.000 | 10/01/22 | 109.613 | 3.55000 YM | N/C | N/A | 10/01/2012 | 100.00000 |
| $1,000,000 | RSTN2 | 59455RTM8 | MICHIGAN MUN BD AUTH REV | 5.00000 | $50,000.000 | 10/01/13 | 104.9 | 4.38300 YM | N/C | N/A | 10/01/2011 | 100.00000 |
| $2,000,000 | RSTN2 | 59455RTM8 | MICHIGAN MUN BD AUTH REV | 5.00000 | $100,000.000 | 10/01/13 | 105.08 | 4.36100 YM | N/C | N/A | 10/01/2011 | 100.00000 |
| $1,340,000 | NAXM0 | 594636QR6 | MICHIGAN ST COMPREHENSVE | 4.00000 | $53,600.000 | 05/15/18 | 102 | 3.74000 YM | N/C | N/A | 05/15/2013 | 100.00000 |
| $375,000 | RTMM6 | 594746JB6 | MICHIGAN TECHNLGICL UNIV | 3.75000 | $14,062.500 | 10/01/17 | 101 | 3.62500 YM | N/C | N/A | 10/01/2013 | 100.00000 |
| $1,000,000 | NHCH5 | 621060KU5 | MOUNT CLEMENS MICH CMNTY | 5.00000 | $50,000.000 | 05/01/17 | 110.356 | 3.74000 YM | N/C | N/A | 05/01/2015 | 100.00000 |
| $1,000,000 | NA2E4 | 70917NE83 | PENNSYLVANIA ST HIGHR ED | 4.12500 | $41,250.000 | 06/15/22 | 99.125 | 4.19400 YM | N/C | N/A | 06/15/2014 | 100.00000 |
| $235,000 | PKXT7 | 796253NS7 | SAN ANTONIO TEX EL-GASRV | 5.75000 | $13,512.500 | 02/01/11 | 103.1169 | 5.39500 YM | N/C | N/A | N/C | N/A |
| $1,870,000 | PNUA0 | 837152JG3 | SOUTH CAROLINA TR | 5.00000 | $93,500.000 | 10/01/33 | 105.305 | 4.31000 YM | N/C | N/A | 10/01/2014 | 100.00000 |
| $1,000,000 | RGE38 | 915137QU0 | UNIVERSITY TEX UNIV REVS | 5.00000 | $50,000.000 | 08/15/33 | 104.825 | 4.31400 YM | N/C | N/A | 08/15/2013 | 100.00000 |
| $1,685,000 | NGEW7 | 989258HX9 | ZEELAND MI PUB SCHS | 5.00000 | $84,250.000 | 05/01/24 | 107.49 | 4.08000 YM | N/C | N/A | 05/01/2015 | 100.00000 |

Price To:

M - Maturity
C - Premium Call
P - Par Call
R - PreRefunded

Exception Report
Prepared for PRINCE LIVING TRUST, ELSA

Following Securities were not used while generating this report because indicative Information is not available

Analysis prepared on:10/14/05 1:58 PM

| Par Value | MI Sec # | Issuer | Cusip | Settle Date |
|---|---|---|---|---|
| $1,000,000 | NH5F7 | CENTRAL MICH UNIV REVS | 154123UT8 | 06/02/2005 |
| $1,020,000 | NJSP4 | DETROIT MI CAP IMPT | 251093E97 | 08/29/2005 |
| $690,000 | RSTL8 | EDWARDSBURG MI PUB SCHS | 281803EE2 | 11/05/1998 |
| $1,000,000 | RSTM2 | FRISCO TEX INDPT SCH | 358802PA8 | 10/09/1998 |
| $2,500,000 | RSTP3 | KALAMAZOO MICH CITY SCH | 483224JE2 | 11/15/2001 |
| $775,000 | PJ8W3 | LITTLE ELM TEX INDPT SCH | 537096QK8 | 06/27/2005 |
| $255,000 | RSTX5 | METTAWA ILL SPL SVC AREA | 592674AC9 | 03/24/1999 |
| $430,000 | NH2K4 | MIAMI-DADE CNTY FLA | 59333FDP2 | 08/04/2005 |
| $2,465,000 | NJEA7 | MICHIGAN ST | 594610J32 | 08/22/2005 |
| $2,000,000 | NHX49 | MICHIGAN ST BLDG AUTH | 594614ZN2 | 05/26/2005 |
| $2,845,000 | RSTN3 | MICHIGAN ST CLEAN MICH | 594610ZH3 | 11/13/2001 |
| $430,000 | NH5H0 | NEVADA ST MUN BD BK-PJ | 641460T75 | 11/18/1999 |
| $1,065,000 | NKTB7 | UNIVERSITY MI UNIV REVS | 914455GX2 | 08/29/2005 |
| $1,250,000 | RSTP1 | WHITE CLOUD MI PUB SCHS | 963592EW6 | 08/17/2001 |
| $1,165,000 | NKDD3 | ZEELAND MI PUB SCHS SCH | 989258GV4 | 08/22/2005 |

The information herein has been obtained from sources which we believe to be reliable, but we do not guarantee its accuracy or completeness. Merrill Lynch may have positions in securities referred to herein and may make purchases or sales thereof while this report is in circulation. All prices, yields and calculations are subject to change and or market availability. Duration is calculated based on the yield to worst using modified Macauley duration. Averages are weighted averages are based on principal value (except for coupon and dollar price, they are par weighted). Preferred securities are excluded from the duration calculation. In the U.S.,retail sales and/or distribution of this report may be made only in states where these securities are exempt from registration or have been qualified for sale under blue sky laws. Principal value, accrued interest and monthly income payments are approximate; please call your financial advisor for more details. Settlement date regular way unless otherwise specified.

Appendix 3

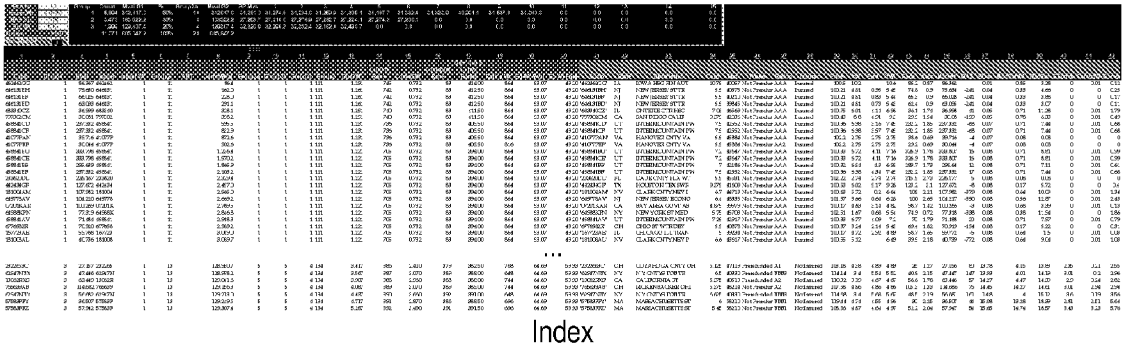
Index
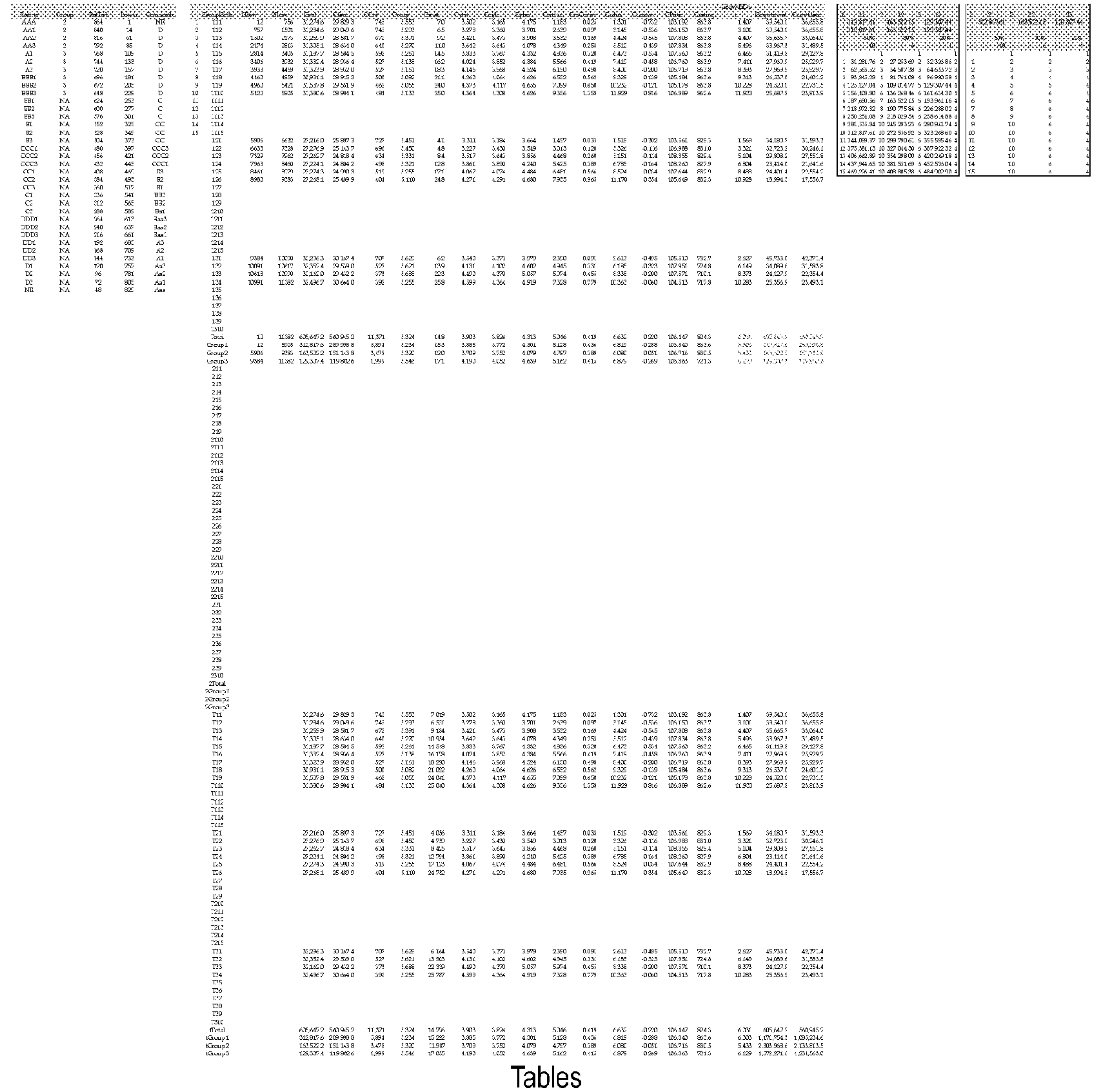
Tables
Appendix 4

[illegible]

| | Cell # | 1st Row | 2nd Row | Minimum Dur Convx Diff | Bond Row | Cusip | Description | Wt | Edur | G1MVal | Price | Accr | Face | PValue | Accual | Market Value |
|---|---|---|---|---|---|---|---|---|---|---|---|---|---|---|---|---|
| 1 | 111 | 12 | 756 | 19 | 267 | 59259NJF | METROPOLITAN TRA | 50,213 | 1.25 | 50,000 | 100.15 | 1.13 | 50,000 | 50,075 | 565 | 50,640 |
| 2 | 112 | 757 | 1501 | 5.5 | 374 | 546415JZ | LOUISIANA ST | 49,989 | 3.15 | 50,000 | 105.08 | 2.41 | 45,000 | 47,286 | 1,085 | 48,371 |
| 3 | 113 | 1502 | 2173 | 7.5 | 353 | 5481004Y | LOWER COLO RIVER | 49,985 | 4.43 | 50,000 | 109.15 | 2.2 | 45,000 | 49,118 | 990 | 50,108 |
| 4 | 114 | 2174 | 2813 | 5 | 322 | 45853JBC | INTERCOMMUNITY H | 49,990 | 5.52 | 50,000 | 103.37 | 2.17 | 45,000 | 46,517 | 977 | 47,493 |
| 5 | 115 | 2814 | 3405 | 8.5 | 297 | 372480BE | GEORGE L SMITH I | 49,985 | 6.46 | 50,000 | 107.44 | 1.36 | 45,000 | 48,348 | 612 | 48,960 |
| 6 | 116 | 3406 | 3932 | 10.5 | 287 | 575930T8 | MASSACHUSETTS ST | 49,991 | 7.43 | 50,000 | 100.89 | 1.27 | 50,000 | 50,445 | 635 | 51,060 |
| 7 | 117 | 3933 | 4459 | 23 | 266 | 4521507J | ILLINOIS ST | 49,982 | 8.39 | 50,000 | 106.97 | 2.61 | 45,000 | 46,137 | 1,175 | 49,311 |
| 8 | 118 | 4460 | 4959 | 12 | 261 | 592646LB | METROPOLITAN WAS | 49,969 | 9.33 | 50,000 | 103.52 | 2.49 | 45,000 | 46,584 | 1,121 | 47,705 |
| 9 | 119 | 4960 | 5421 | 14 | 245 | 161036DA | CHARLOTTE N C AR | 49,958 | 10.26 | 50,000 | 104.17 | 1.24 | 45,000 | 46,877 | 558 | 47,435 |
| 10 | 1110 | 5422 | 5905 | 7.5 | 311 | 576049K5 | MASSACHUSETTS ST | 49,939 | 12.00 | 50,000 | 105.39 | 0.82 | 45,000 | 47,425 | 369 | 47,795 |
| 11 | 1111 | 0 | 0 | 0 | 0 | 0 | 0 | | 0.00 | 0 | 0 | 0 | 0 | 0 | 0 | 0 |
| 12 | 1112 | 0 | 0 | 0 | 0 | 0 | 0 | | 0.00 | 0 | 0 | 0 | 0 | 0 | 0 | 0 |
| | | | | | | | | 500,000 | 6.819 | 500,000 | | | 460,000 | 480,811 | 8,085 | 488,896 |
| | | | | | | | | 500,000 | 6.819 | 6.822 | | | | | | 6.760 |

Solve 1

[illegible]

| | Cell # | 1st Row | 2nd Row | Dur Convx Diff | Bond Row | Cusip | Description | Wt | Edur | G1MVal | Price | Accr | Face | PValue | Accual | Market Value |
|---|---|---|---|---|---|---|---|---|---|---|---|---|---|---|---|---|
| 1 | 121 | 5906 | 6632 | 15.5 | 290 | 64971KL2 | NEW YORK N Y CIT | 49,903 | 1.46 | 50,000 | 99.47 | 1.24 | 50,000 | 49,735 | 620 | 50,355 |
| 2 | 122 | 6633 | 7328 | 23 | 319 | 8827193A | TEXAS ST | 50,009 | 3.30 | 50,000 | 106.23 | 2.55 | 45,000 | 47,804 | 1,148 | 48,951 |
| 3 | 123 | 7329 | 7962 | 11 | 346 | 57583PDH | MASSACHUSETTS ST | 50,016 | 5.19 | 50,000 | 110.29 | 1.68 | 45,000 | 49,631 | 756 | 50,387 |
| 4 | 124 | 7963 | 8460 | 14.5 | 250 | 130658HV | CALIFORNIA ST DE | 50,020 | 6.82 | 50,000 | 105.52 | 1.82 | 45,000 | 47,484 | 819 | 48,303 |
| 5 | 125 | 8461 | 8979 | 2.5 | 281 | 79575DPE | SALT RIVER PROJ | 50,025 | 8.53 | 50,000 | 105.6 | 1.24 | 45,000 | 47,520 | 558 | 48,078 |
| 6 | 126 | 8980 | 9383 | 8.5 | 279 | 57586CFW | MASSACHUSETTS ST | 50,027 | 11.15 | 50,000 | 105.46 | 0.79 | 45,000 | 47,457 | 356 | 47,813 |
| 7 | 127 | 0 | 0 | 0 | 0 | 0 | 0 | | 0.00 | 0 | 0 | 0 | 0 | 0 | 0 | 0 |
| 8 | 128 | 0 | 0 | 0 | 0 | 0 | 0 | | 0.00 | 0 | 0 | 0 | 0 | 0 | 0 | 0 |
| 9 | 129 | 0 | 0 | 0 | 0 | 0 | 0 | | 0.00 | 0 | 0 | 0 | 0 | 0 | 0 | 0 |
| 10 | 1210 | 0 | 0 | 0 | 0 | 0 | 0 | | 0.00 | 0 | 0 | 0 | 0 | 0 | 0 | 0 |
| 11 | 1211 | 0 | 0 | 0 | 0 | 0 | 0 | | 0.00 | 0 | 0 | 0 | 0 | 0 | 0 | 0 |
| 12 | 1212 | 0 | 0 | 0 | 0 | 0 | 0 | | 0.00 | 0 | 0 | 0 | 0 | 0 | 0 | 0 |
| | | | | | | | | 300,000 | 6.080 | 300,000 | | | 275,000 | 289,630 | 4,256 | 293,886 |
| | | | | | | | | 300,000 | 6.080 | 6.078 | | | | | | 6.023 |

Solve 2

[illegible]

| | Cell # | 1st Row | 2nd Row | Dur Convx Diff | Bond Row | Cusip | Description | Wt | Edur | G1MVal | Price | Accr | Face | PValue | Accual | Market Value |
|---|---|---|---|---|---|---|---|---|---|---|---|---|---|---|---|---|
| 1 | 131 | 9384 | 10090 | 20.5 | 331 | 649665DB | NEW YORK N Y | 49,716 | 2.52 | 50,000 | 98.95 | 0.41 | 50,000 | 49,475 | 205 | 49,680 |
| 2 | 132 | 10091 | 10617 | 11 | 261 | 64579EM6 | NEW JERSEY HEALT | 50,085 | 6.19 | 50,000 | 107.2 | 1.41 | 45,000 | 48,240 | 635 | 48,875 |
| 3 | 133 | 10618 | 10990 | 5 | 173 | 13062NM6 | CALIFORNIA ST | 50,084 | 8.32 | 50,000 | 103.82 | 2.49 | 45,000 | 46,719 | 1,121 | 47,840 |
| 4 | 134 | 10991 | 11382 | 11 | 266 | 649665QS | NEW YORK N Y | 50,115 | 10.45 | 50,000 | 103.92 | 2.07 | 45,000 | 46,764 | 932 | 47,696 |
| 5 | 135 | 0 | 0 | 0 | 0 | 0 | 0 | | 0.00 | 0 | 0 | 0 | 0 | 0 | 0 | 0 |
| 6 | 136 | 0 | 0 | 0 | 0 | 0 | 0 | | 0.00 | 0 | 0 | 0 | 0 | 0 | 0 | 0 |
| 7 | 137 | 0 | 0 | 0 | 0 | 0 | 0 | | 0.00 | 0 | 0 | 0 | 0 | 0 | 0 | 0 |
| 8 | 138 | 0 | 0 | 0 | 0 | 0 | 0 | | 0.00 | 0 | 0 | 0 | 0 | 0 | 0 | 0 |
| 9 | 139 | 0 | 0 | 0 | 0 | 0 | 0 | | 0.00 | 0 | 0 | 0 | 0 | 0 | 0 | 0 |
| 10 | 1310 | 0 | 0 | 0 | 0 | 0 | 0 | | 0.00 | 0 | 0 | 0 | 0 | 0 | 0 | 0 |
| | | | | | | | | 200,000 | 6.879 | 200,000 | | | 185,000 | 191,198 | 2,892 | 194,090 |
| | | | | | | | | 200,000 | 6.879 | 6.870 | | | | | | 6.822 |

Solve 3

Appendix 5

Bucket Characteristics

| | Group 1 Cells | 1st Row | 2nd Row | Fval | Mval | Count | Coupon | Maturity | Effective Duration | Effective Convexity |
|---|---|---|---|---|---|---|---|---|---|---|
| 1 | 111 | 12 | 756 | 29,829.3 | 31,274.6 | 745 | 5.553 | 7.0 | 1.301 | -0.732 |
| 2 | 112 | 757 | 1501 | 29,049.6 | 31,284.6 | 745 | 5.293 | 6.5 | 3.145 | -0.536 |
| 3 | 113 | 1502 | 2173 | 28,581.7 | 31,259.9 | 672 | 5.391 | 9.2 | 4.424 | -0.545 |
| 4 | 114 | 2174 | 2813 | 28,631.0 | 31,305.1 | 640 | 5.270 | 11.0 | 5.512 | -0.439 |
| 5 | 115 | 2814 | 3405 | 28,584.5 | 31,187.7 | 592 | 5.261 | 14.5 | 6.473 | -0.531 |
| 6 | 116 | 3406 | 3932 | 28,936.4 | 31,332.4 | 527 | 5.138 | 16.2 | 7.419 | -0.458 |
| 7 | 117 | 3933 | 4459 | 28,932.0 | 31,323.9 | 527 | 5.161 | 18.3 | 8.400 | -0.200 |
| 8 | 118 | 4460 | 4959 | 28,915.3 | 30,931.1 | 500 | 5.082 | 21.1 | 9.329 | -0.139 |
| 9 | 119 | 4960 | 5421 | 29,551.9 | 31,537.8 | 462 | 5.055 | 24.0 | 10.232 | -0.121 |
| 10 | 1110 | 5422 | 5905 | 28,984.1 | 31,380.6 | 484 | 5.133 | 25.0 | 11.929 | 0.816 |
| 11 | 1111 | | | | | | | | | |
| 12 | 1112 | | | | | | | | | |
| | | | | 289,998.8 | 312,817.6 | 5894 | 5.234 | 15.3 | 6.819 | -0.288 |

| Cusip | Face Value | Description | Coupon | Maturity Date | Rating | | Ins | Price | Yield to Worst | Mod Dur to Worst | Convexity to Worst | Principal Value | Accrued | Market Value | % of Index | OAS | Effective Yield | Effective Duration | Effective Convexity | Yield to Maturity | |
|---|---|---|---|---|---|---|---|---|---|---|---|---|---|---|---|---|---|---|---|---|---|
| 59259NJF | 50.000 | METROPOLITAN TRA | 3.000 | 11/15/06 | AAA | 864 | ####### | 100.150 | 2.870 | 1.090 | 0.020 | 50,075 | 565 | 50,640 | 0.01% | -5 | 2.87 | 1.25 | -0.650 | 2.870 | 1.13 |
| 546415JZ | 45.000 | LOUISIANA ST | 5.250 | 4/15/11 | AAA | 864 | ####### | 105.080 | 3.520 | 2.330 | 0.070 | 47,286 | 1,085 | 48,371 | 0.01% | 20 | 3.59 | 3.15 | -0.520 | 4.210 | 2.41 |
| 5481004Y | 45.000 | LOWER COLO RIVER | 5.875 | 5/15/14 | AAA | 864 | ####### | 109.150 | 3.430 | 3.220 | 0.130 | 49,118 | 990 | 50,108 | 0.01% | -8 | 3.65 | 4.43 | -0.460 | 4.580 | 2.20 |
| 45853JBC | 45.000 | INTERCOMMUNITY H | 5.250 | 11/1/19 | A2 | 744 | ####### | 103.370 | 4.500 | 4.350 | 0.230 | 46,517 | 977 | 47,493 | 0.01% | 45 | 4.48 | 5.52 | -0.480 | 4.910 | 2.17 |
| 372480BE | 45.000 | GEORGE L SMITH I | 5.500 | 7/1/20 | AAA | 864 | ####### | 107.440 | 3.960 | 4.140 | 0.210 | 48,348 | 612 | 48,960 | 0.01% | | 4.05 | 6.46 | -0.560 | 4.790 | 1.36 |
| 575930T8 | 50.000 | MASSACHUSETTS ST | 5.150 | 7/1/26 | AAA | 864 | ####### | 100.890 | 5.010 | 6.260 | 0.470 | 50,445 | 635 | 51,080 | 0.01% | 91 | 4.91 | 7.43 | -0.380 | 5.080 | 1.27 |
| 4521507J | 45.000 | ILLINOIS ST | 5.250 | 4/1/27 | AAA | 864 | ####### | 106.970 | 4.020 | 5.390 | 0.350 | 48,137 | 1,175 | 49,311 | 0.01% | -20 | 3.91 | 8.39 | -0.300 | 4.730 | 2.61 |
| 592646LB | 45.000 | METROPOLITAN WAS | 5.000 | 10/1/22 | AAA | 864 | ####### | 103.520 | 4.520 | 7.060 | 0.610 | 46,584 | 1,121 | 47,705 | 0.01% | 32 | 4.31 | 9.33 | -0.090 | 4.700 | 2.49 |
| 161036DA | 45.000 | CHARLOTTE N C AR | 5.000 | 7/1/29 | AAA | 864 | ####### | 104.170 | 4.420 | 6.990 | 0.590 | 46,877 | 558 | 47,435 | 0.01% | 7 | 4.19 | 10.26 | -0.110 | 4.710 | 1.24 |
| 576049K5 | 45.000 | MASSACHUSETTS ST | 5.000 | 8/1/34 | AAA | 864 | ####### | 105.390 | 4.410 | 8.890 | 0.980 | 47,426 | 369 | 47,795 | 0.01% | 5 | 4.19 | 12.00 | 0.660 | 4.660 | 0.82 |
| | | | | | | | ####### | | | | | | | | | | | | | | |
| | | | | | | | ####### | | | | | | | | | | | | | | |
| | 460.000 | | 5.007 | 15.5 | Aaa | 852 | | 104.524 | 4.061 | 4.944 | 0.363 | 480,811 | 8,085 | 488,896 | 0.08% | 17 | 4.01 | 6.78 | -0.294 | 4.519 | |

| | Group 2 Cells | 1st Row | 2nd Row | Fval | Mval | Count | Coupon | Maturity | Effective Duration | Effective Convexity |
|---|---|---|---|---|---|---|---|---|---|---|
| 1 | 121 | 5906 | 6632 | 25,897.3 | 27,216.0 | 727 | 5.451 | 4.1 | 1.519 | -0.302 |
| 2 | 122 | 6633 | 7328 | 25,143.7 | 27,276.9 | 696 | 5.450 | 4.8 | 3.326 | -0.116 |
| 3 | 123 | 7329 | 7962 | 24,818.4 | 27,262.7 | 634 | 5.331 | 8.4 | 5.151 | -0.114 |
| 4 | 124 | 7963 | 8460 | 24,804.2 | 27,224.1 | 498 | 5.321 | 12.8 | 6.785 | -0.164 |
| 5 | 125 | 8461 | 8979 | 24,990.3 | 27,274.3 | 519 | 5.255 | 17.1 | 8.524 | 0.034 |
| 6 | 126 | 8980 | 9383 | 25,489.9 | 27,268.1 | 404 | 5.110 | 24.8 | 11.170 | 0.354 |
| 7 | 127 | | | | | | | | | |
| 8 | 128 | | | | | | | | | |
| 9 | 129 | | | | | | | | | |
| 10 | 1210 | | | | | | | | | |
| | | | | 151,143.8 | 163,522.2 | 3478 | 5.320 | 12.0 | 6.080 | -0.051 |

| Cusip | Face Value | Description | Coupon | Maturity Date | Rating | | Price | Yield to Worst | Mod Dur to Worst | Convexity to Worst | Principal Value | Accrued | Market Value | % of Index | OAS | Effective Yield | Effective Duration | Effective Convexity | Yield to Maturity | |
|---|---|---|---|---|---|---|---|---|---|---|---|---|---|---|---|---|---|---|---|---|
| 64971KL2 | 50.000 | NEW YORK N Y CIT | 2.500 | 11/1/06 | AA1 | 840 | 99.47 | 3.000 | 1.050 | 0.020 | 49,735 | 620 | 50,355 | 0.01% | -6 | 3.00 | 1.48 | -0.42 | 3.000 | 1.24 |
| 8827193A | 45.000 | TEXAS ST | 5.125 | 10/1/10 | AA1 | 840 | 106.23 | 3.250 | 2.720 | 0.090 | 47,804 | 1,148 | 48,951 | 0.01% | -2 | 3.30 | 3.30 | -0.28 | 3.750 | 2.55 |
| 57583PDH | 45.000 | MASSACHUSETTS ST | 5.750 | 6/15/13 | AA3 | 792 | 110.29 | 3.570 | 4.460 | 0.240 | 49,631 | 756 | 50,387 | 0.01% | 5 | 3.69 | 5.19 | -0.02 | 4.170 | 1.68 |
| 130658HV | 45.000 | CALIFORNIA ST DE | 5.500 | 12/1/19 | AA3 | 792 | 105.52 | 4.480 | 5.210 | 0.330 | 47,484 | 819 | 48,303 | 0.01% | 51 | 4.54 | 6.82 | -0.03 | 4.950 | 1.82 |
| 79575DPE | 45.000 | SALT RIVER PROJ | 5.000 | 1/1/22 | AA2 | 816 | 105.6 | 4.100 | 6.010 | 0.430 | 47,520 | 558 | 48,078 | 0.01% | -7 | 3.91 | 8.53 | 0.04 | 4.510 | 1.24 |
| 57586CFW | 45.000 | MASSACHUSETTS ST | 5.000 | 7/15/32 | AAA | 864 | 105.46 | 4.310 | 7.700 | 0.720 | 47,457 | 356 | 47,813 | 0.01% | -9 | 4.03 | 11.15 | 0.26 | 4.640 | 0.79 |
| | 275.000 | | 4.770 | 11.7 | Aa1 | 824 | 105.320 | 3.776 | 4.490 | 0.301 | 289,630 | 4,256 | 293,886 | 0.05% | 5 | 3.74 | 6.02 | -0.078 | 4.160 | 9.32 |

| | Group 3 Cells | 1st Row | 2nd Row | Fval | Mval | Count | Coupon | Maturity | Effective Duration | Effective Convexity |
|---|---|---|---|---|---|---|---|---|---|---|
| 1 | 131 | 9384 | 10090 | 30,167.4 | 32,296.3 | 707 | 5.629 | 6.2 | 2.613 | -0.495 |
| 2 | 132 | 10091 | 10617 | 29,539.0 | 32,352.4 | 527 | 5.621 | 13.9 | 6.185 | -0.323 |
| 3 | 133 | 10618 | 10990 | 29,432.2 | 32,162.0 | 373 | 5.688 | 22.3 | 8.338 | -0.200 |
| 4 | 134 | 10991 | 11382 | 30,664.0 | 32,496.7 | 392 | 5.255 | 25.8 | 10.363 | -0.060 |
| 5 | 135 | | | | | | | | | |
| 6 | 136 | | | | | | | | | |
| 7 | 137 | | | | | | | | | |
| 8 | 138 | | | | | | | | | |
| 9 | 139 | | | | | | | | | |
| 10 | 1310 | | | | | | | | | |
| | | | | 119,802.6 | 129,307.4 | 1999 | 5.546 | 17.1 | 6.879 | -0.269 |
| | | 12 | 11382 | 560,945.2 | 605,647.2 | 11.371 | 5.339 | 14.8 | 6.632 | -0.220 |

| Cusip | Face Value | Description | Coupon | Maturity Date | Rating | | Price | Yield to Worst | Mod Dur to Worst | Convexity to Worst | Principal Value | Accrued | Market Value | % of Index | OAS | Effective Yield | Effective Duration | Effective Convexity | Yield to Maturity | |
|---|---|---|---|---|---|---|---|---|---|---|---|---|---|---|---|---|---|---|---|---|
| 64966DDB | 50.000 | NEW YORK N Y | 2.500 | 8/1/07 | A1 | 768 | 98.95 | 3.090 | 1.770 | 0.040 | 49,475 | 205 | 49,680 | 0.01% | -8 | 3.09 | 2.52 | -0.430 | 3.090 | 0.41 |
| 64579EM6 | 45.000 | NEW JERSEY HEALT | 5.700 | 7/1/20 | A2 | 744 | 107.2 | 4.020 | 4.120 | 0.200 | 48,240 | 635 | 48,875 | 0.01% | 15 | 4.21 | 6.19 | -0.430 | 5.000 | 1.41 |
| 13062NM6 | 45.000 | CALIFORNIA ST | 5.000 | 4/1/22 | A2 | 744 | 103.82 | 4.320 | 5.400 | 0.350 | 46,719 | 1,121 | 47,840 | 0.01% | 8 | 4.05 | 8.32 | -0.190 | 4.670 | 2.49 |
| 64966DQS | 45.000 | NEW YORK N Y | 5.000 | 11/1/27 | A1 | 768 | 103.92 | 4.470 | 7.150 | 0.620 | 46,764 | 932 | 47,696 | 0.01% | 8 | 4.17 | 10.45 | -0.060 | 4.710 | 2.07 |
| | 185.000 | | 4.495 | 13.7 | A1 | 756.0409 | 103.350 | 3.966 | 4.579 | 0.299 | 191,198 | 2,892 | 194,090 | 0.03% | 6 | 3.87 | 6.82 | -0.280 | 4.359 | 6.38 |
| | 920.000 | | 4.833 | 14.0 | Aa1 | 824 | 104.526 | 3.956 | 4.735 | 0.332 | 961,639 | 15,233 | 976,871 | 0.16% | 11 | 3.90 | 6.56 | -0.226 | 4.379 | 15.70 |

Bonds

| | g1v | g2v | g3v | g1x | g2x | g3x | g1xe | g2xe | g3xe |
|---|---|---|---|---|---|---|---|---|---|
| 11371 | 12 | 5906 | 9384 | 11382 | 11382 | 11382 | 11382 | 11382 | 11382 |
| | 5905 | 9383 | 11382 | 11382 | 11382 | 11382 | 11382 | 11382 | 11382 |

Index & Selected Bond Summary Characteristics

| | | Total Index | Total Valid | Total Selected | Index Group1 | Index Group2 | Index Group3 | Valid Group1 | Valid Group2 | Valid Group3 | Selected Group1 | Selected Group2 | Selected Group3 | Selected Total |
|---|---|---|---|---|---|---|---|---|---|---|---|---|---|---|
| | Count | 11,371 | 11,371 | 20 | 5,894 | 3,478 | 1,999 | 5,894 | 3,478 | 1,999 | 10 | 6 | 4 | 20 |
| Cface | Face Value | 560,945.2 | 560,945.2 | 920.0 | 289,998.8 | 151,143.8 | 119,802.6 | 289,998.8 | 151,143.8 | 119,802.6 | 460.0 | 275.0 | 185.0 | 920.0 |
| Cval | Market Value | 605,647.2 | 605,647.2 | 976.9 | 312,817.6 | 163,522.2 | 129,307.4 | 312,817.6 | 163,522.2 | 129,307.4 | 488.9 | 293.9 | 194.1 | 976.9 |
| | Percent of Total | | | | 52% | 27% | 21% | 52% | 27% | 21% | 50% | 30% | 20% | |
| Ccoup | Coupon | 5.324 | 5.324 | 4.833 | 5.234 | 5.320 | 5.546 | 5.234 | 5.320 | 5.546 | 5.007 | 4.770 | 4.495 | 4.833 |
| Cmat | Maturity Years | 14.8 | 14.8 | 14.0 | 15.3 | 12.0 | 17.0 | 15.3 | 12.0 | 17.1 | 15.5 | 11.7 | 13.7 | 14.0 |
| crating | Rating | Aa1 | Aa1 | Aa1 | Aaa | Aaa | A2 | Aaa | Aaa | A2 | Aaa | Aa1 | A1 | Aa1 |
| Cytw | Yield to Worst | 3.903 | 3.903 | 3.956 | 3.885 | 3.709 | 4.190 | 3.885 | 3.709 | 4.190 | 4.061 | 3.776 | 3.966 | 3.956 |
| cprice | Price | 106.447 | 106.447 | 104.526 | 106.340 | 106.716 | 106.363 | 106.340 | 106.716 | 106.363 | 104.524 | 105.320 | 103.350 | 104.526 |
| Cmdur | Mod Duration | 5.046 | 5.046 | 4.735 | 5.128 | 4.797 | 5.162 | 5.128 | 4.797 | 5.162 | 4.944 | 4.490 | 4.579 | 4.735 |
| CmConvx | Mod Convx | 0.419 | 0.419 | 0.332 | 0.436 | 0.389 | 0.415 | 0.436 | 0.389 | 0.415 | 0.363 | 0.301 | 0.299 | 0.332 |
| COAS | OAS | 6 | 6 | 11 | -4 | 12 | 22 | -4 | 12 | 22 | 17 | 5 | 6 | 11 |
| Ceyld | Effective Yield | 3.826 | 3.826 | 3.902 | 3.772 | 3.752 | 4.052 | 3.772 | 3.752 | 4.052 | 4.011 | 3.738 | 3.874 | 3.902 |
| Cedur | Effective Duration | 6.632 | 6.632 | 6.561 | 6.819 | 6.080 | 6.879 | 6.819 | 6.080 | 6.879 | 6.780 | 6.023 | 6.822 | 6.561 |
| Ceconvx | Effective Convx | -0.220 | -0.220 | -0.226 | -0.288 | -0.051 | -0.269 | -0.288 | -0.051 | -0.269 | -0.294 | -0.078 | -0.280 | -0.226 |
| Cytm | Yield to Maturity | 4.313 | 4.313 | 4.379 | 4.301 | 4.079 | 4.639 | 4.301 | 4.079 | 4.639 | 4.519 | 4.160 | 4.359 | 4.379 |

Summary

Appendix 6

| | Cell # | 1st Row | 2nd Row | Minimum Dur Convx Diff | Bond Row | Cusip | Description | Cell Bond Eff Dur | Cell Bond Eff Convx | Cell Avg Eff Dur | Cell Avg Eff Convx | Cell Dur Band | Cell Convex Band |
|---|---|---|---|---|---|---|---|---|---|---|---|---|---|
| 1 | 111 | 12 | 756 | 19 | 267 | 59259NJF | Metropolitan Tra | 1.250 | -0.650 | 1.301 | -0.732 | 0.063 | -0.146 |
| 2 | 112 | 757 | 1501 | 5.5 | 374 | 546415JZ | Louisiana St | 3.150 | -0.540 | 3.145 | -0.536 | 0.158 | -0.107 |
| 3 | 113 | 1502 | 2173 | 7.5 | 353 | 5481004Y | Lower Colo River | 4.430 | -0.460 | 4.424 | -0.545 | 0.222 | -0.104 |
| 4 | 114 | 2174 | 2813 | 5 | 322 | 45853JBC | Intercommunity H | 5.520 | -0.480 | 5.512 | -0.439 | 0.276 | -0.108 |
| 5 | 115 | 2814 | 3405 | 8.5 | 297 | 372480BE | George L Smith I | 6.460 | -0.560 | 6.473 | -0.534 | 0.323 | -0.124 |
| 6 | 116 | 3406 | 3932 | 10.5 | 287 | 575930T8 | Massachusetts St | 7.430 | -0.340 | 7.419 | -0.458 | 0.372 | -0.086 |
| 7 | 117 | 3933 | 4459 | 23 | 266 | 4521507J | Illinois St | 8.390 | -0.300 | 8.400 | -0.200 | 0.420 | -0.068 |
| 8 | 118 | 4460 | 4959 | 12 | 261 | 592646LB | Metropolitan was | 9.330 | -0.090 | 9.329 | -0.139 | 0.467 | -0.020 |
| 9 | 119 | 4960 | 5421 | 14 | 245 | 161036DA | Charlotte N C Ar | 10.260 | -0.110 | 10.232 | -0.121 | 0.513 | -0.025 |
| 10 | 1110 | 5422 | 5905 | 7.5 | 311 | 576049K5 | Massachusetts St | 12.000 | 0.660 | 11.929 | 0.816 | 0.600 | 0.149 |
| 11 | 1111 | 0 | 0 | 0 | 0 | 0 | 0 | 0.000 | 0.000 | 0.000 | 0.000 | 0.000 | 0.000 |
| 12 | 1112 | 0 | 0 | 0 | 0 | 0 | 0 | 0.000 | 0.000 | 0.000 | 0.000 | 0.000 | 0.000 |
| | 1113 | 0 | 0 | 0 | 0 | 0 | 0 | 0.000 | 0.000 | 0.000 | 0.000 | 0.000 | 0.000 |
| | 1114 | 0 | 0 | 0 | 0 | 0 | 0 | 0.000 | 0.000 | 0.000 | 0.000 | 0.000 | 0.000 |
| | 1115 | 0 | 0 | 0 | 0 | 0 | 0 | 0.000 | 0.000 | 0.000 | 0.000 | 0.000 | 0.000 |
| | 121 | 5906 | 6632 | 15.5 | 290 | 64971KL2 | New York N Y Cit | 1.480 | -0.420 | 1.519 | -0.302 | 0.074 | -0.095 |
| | 122 | 6633 | 7328 | 23 | 319 | 8827193A | Texas St | 3.300 | 0.280 | 3.326 | 0.116 | 0.165 | 0.063 |
| | 123 | 7329 | 7962 | 11 | 346 | 57583PDH | Massachusetts St | 5.190 | -0.020 | 5.151 | -0.114 | 0.260 | -0.005 |
| | 124 | 7963 | 8460 | 14.5 | 250 | 130658HV | California St De | 6.820 | -0.030 | 6.785 | -0.164 | 0.341 | -0.007 |
| | 125 | 8461 | 8979 | 2.5 | 281 | 79575DPE | Salt River Proj | 8.530 | 0.040 | 8.524 | 0.034 | 0.427 | 0.009 |
| | 126 | 8980 | 9383 | 8.5 | 279 | 57586CFW | Massachusetts St | 11.150 | 0.260 | 11.170 | 0.354 | 0.558 | 0.059 |
| | 127 | 0 | 0 | 0 | 0 | 0 | 0 | 0.000 | 0.000 | 0.000 | 0.000 | 0.000 | 0.000 |
| | 128 | 0 | 0 | 0 | 0 | 0 | 0 | 0.000 | 0.000 | 0.000 | 0.000 | 0.000 | 0.000 |
| | 129 | 0 | 0 | 0 | 0 | 0 | 0 | 0.000 | 0.000 | 0.000 | 0.000 | 0.000 | 0.000 |
| | 1210 | 0 | 0 | 0 | 0 | 0 | 0 | 0.000 | 0.000 | 0.000 | 0.000 | 0.000 | 0.000 |
| | 1211 | 0 | 0 | 0 | 0 | 0 | 0 | 0.000 | 0.000 | 0.000 | 0.000 | 0.000 | 0.000 |
| | 1212 | 0 | 0 | 0 | 0 | 0 | 0 | 0.000 | 0.000 | 0.000 | 0.000 | 0.000 | 0.000 |
| | 1213 | 0 | 0 | 0 | 0 | 0 | 0 | 0.000 | 0.000 | 0.000 | 0.000 | 0.000 | 0.000 |
| | 1214 | 0 | 0 | 0 | 0 | 0 | 0 | 0.000 | 0.000 | 0.000 | 0.000 | 0.000 | 0.000 |
| | 1215 | 0 | 0 | 0 | 0 | 0 | 0 | 0.000 | 0.000 | 0.000 | 0.000 | 0.000 | 0.000 |
| | 131 | 9384 | 10090 | 20.5 | 331 | 64966DDB | New York N Y | 2.520 | -0.430 | 2.613 | -0.495 | 0.126 | -0.097 |
| | 132 | 10091 | 10617 | 11 | 261 | 64579EM6 | New Jersey Healt | 6.190 | -0.430 | 6.185 | -0.323 | 0.310 | -0.097 |
| | 133 | 10618 | 10990 | 5 | 173 | 13062NM6 | California St | 8.320 | -0.190 | 8.338 | -0.200 | 0.416 | -0.043 |
| | 134 | 10991 | 11382 | 11 | 268 | 64966DQS | New York N Y | 10.450 | -0.060 | 10.363 | -0.060 | 0.523 | -0.014 |
| | 135 | 0 | 0 | 0 | 0 | 0 | 0 | 0.000 | 0.000 | 0.000 | 0.000 | 0.000 | 0.000 |
| | 136 | 0 | 0 | 0 | 0 | 0 | 0 | 0.000 | 0.000 | 0.000 | 0.000 | 0.000 | 0.000 |
| | 137 | 0 | 0 | 0 | 0 | 0 | 0 | 0.000 | 0.000 | 0.000 | 0.000 | 0.000 | 0.000 |
| | 138 | 0 | 0 | 0 | 0 | 0 | 0 | 0.000 | 0.000 | 0.000 | 0.000 | 0.000 | 0.000 |
| | 139 | 0 | 0 | 0 | 0 | 0 | 0 | 0.000 | 0.000 | 0.000 | 0.000 | 0.000 | 0.000 |
| | 1310 | 0 | 0 | 0 | 0 | 0 | 0 | 0.000 | 0.000 | 0.000 | 0.000 | 0.000 | 0.000 |

Matrix 1

Matrix 2

| GroupCells | 1Row | 2Row | BEDur | EEDur | AEDur | BEConvx | EEConvx | AEConvx |
|---|---|---|---|---|---|---|---|---|
| 111 | 12 | 756 | 0.010 | 2.290 | 1.301 | 0.000 | -2.670 | -0.732 |
| 112 | 757 | 1501 | 2.290 | 3.780 | 3.145 | 0.070 | 0.170 | -0.536 |
| 113 | 1502 | 2173 | 3.780 | 4.990 | 4.424 | 0.170 | -0.930 | -0.545 |
| 114 | 2174 | 2813 | 4.990 | 6.000 | 5.512 | 0.290 | 0.320 | -0.439 |
| 115 | 2814 | 3405 | 6.000 | 6.930 | 6.473 | 0.440 | 0.190 | -0.534 |
| 116 | 3406 | 3932 | 6.940 | 7.930 | 7.419 | -2.390 | -2.330 | -0.458 |
| 117 | 3933 | 4459 | 7.930 | 8.860 | 8.400 | -1.260 | -0.420 | -0.200 |
| 118 | 4460 | 4959 | 8.860 | 9.790 | 9.329 | 0.160 | 0.380 | -0.139 |
| 119 | 4960 | 5421 | 9.800 | 10.680 | 10.232 | -0.530 | 1.490 | -0.121 |
| 1110 | 5422 | 5905 | 10.690 | 16.180 | 11.929 | 0.340 | 3.100 | 0.816 |
| 1111 | 0 | 0 | 0.000 | 0.000 | 0.000 | 0.000 | 0.000 | 0.000 |
| 1112 | 0 | 0 | 0.000 | 0.000 | 0.000 | 0.000 | 0.000 | 0.000 |
| 1113 | 0 | 0 | 0.000 | 0.000 | 0.000 | 0.000 | 0.000 | 0.000 |
| 1114 | 0 | 0 | 0.000 | 0.000 | 0.000 | 0.000 | 0.000 | 0.000 |
| 1115 | 0 | 0 | 0.000 | 0.000 | 0.000 | 0.000 | 0.000 | 0.000 |
| 121 | 5906 | 6632 | 0.040 | 2.450 | 1.519 | 0.000 | 0.080 | -0.302 |
| 122 | 6633 | 7328 | 2.450 | 4.180 | 3.326 | 0.080 | 0.210 | -0.116 |
| 123 | 7329 | 7962 | 4.190 | 6.090 | 5.151 | 0.210 | 0.440 | -0.114 |
| 124 | 7963 | 8460 | 6.100 | 7.560 | 6.785 | 0.460 | 0.690 | -0.164 |
| 125 | 8461 | 8979 | 7.570 | 9.530 | 8.524 | -2.660 | -0.450 | 0.034 |
| 126 | 8980 | 9383 | 9.540 | 15.980 | 11.170 | -0.790 | 4.020 | 0.354 |
| 127 | 0 | 0 | 0.000 | 0.000 | 0.000 | 0.000 | 0.000 | 0.000 |
| 128 | 0 | 0 | 0.000 | 0.000 | 0.000 | 0.000 | 0.000 | 0.000 |
| 129 | 0 | 0 | 0.000 | 0.000 | 0.000 | 0.000 | 0.000 | 0.000 |
| 1210 | 0 | 0 | 0.000 | 0.000 | 0.000 | 0.000 | 0.000 | 0.000 |
| 1211 | 0 | 0 | 0.000 | 0.000 | 0.000 | 0.000 | 0.000 | 0.000 |
| 1212 | 0 | 0 | 0.000 | 0.000 | 0.000 | 0.000 | 0.000 | 0.000 |
| 1213 | 0 | 0 | 0.000 | 0.000 | 0.000 | 0.000 | 0.000 | 0.000 |
| 1214 | 0 | 0 | 0.000 | 0.000 | 0.000 | 0.000 | 0.000 | 0.000 |
| 1215 | 0 | 0 | 0.000 | 0.000 | 0.000 | 0.000 | 0.000 | 0.000 |
| 131 | 9384 | 10090 | 0.000 | 4.580 | 2.613 | 0.000 | 0.250 | -0.495 |
| 132 | 10091 | 10617 | 4.590 | 7.570 | 6.185 | -1.470 | 0.580 | -0.323 |
| 133 | 10618 | 10990 | 7.570 | 9.080 | 8.338 | -0.080 | 0.560 | -0.200 |
| 134 | 10991 | 11382 | 9.090 | 15.650 | 10.363 | -0.370 | 3.430 | -0.060 |
| 135 | 0 | 0 | 0.000 | 0.000 | 0.000 | 0.000 | 0.000 | 0.000 |
| 136 | 0 | 0 | 0.000 | 0.000 | 0.000 | 0.000 | 0.000 | 0.000 |
| 137 | 0 | 0 | 0.000 | 0.000 | 0.000 | 0.000 | 0.000 | 0.000 |
| 138 | 0 | 0 | 0.000 | 0.000 | 0.000 | 0.000 | 0.000 | 0.000 |
| 139 | 0 | 0 | 0.000 | 0.000 | 0.000 | 0.000 | 0.000 | 0.000 |
| 1310 | 0 | 0 | 0.000 | 0.000 | 0.000 | 0.000 | 0.000 | 0.000 |

Appendix 7

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|
| Cusip | Group1 | Cell | Dur Diff | Dur Rank | Convx Diff | Convx Rank | Cell Offer | Rank | Cusip | State | Description | Coup | Mat | PreRe | Rating | Insured | Price | YTW | [illegible] | YTM | Face | Accr | Market | OAS | EDur | ModDurW | MacDur | EConvx | ConvxW | Convx |
| 59259NJF | 1 | 111 | 0.051 | 30 | 0.082 | 8 | 19 | 1 | '59259NJF' | NY | METROPOLITAN TRA | 3.000 | 11/15/06 | Not Prerefunded | AAA | Insured | 100.15 | 2.87 | 2.87 | 2.87 | 10.3 | 1.13 | 10.431 | -5 | 1.25 | 1.09 | 1.1 | -0.65 | 0.02 | 0.02 |
| 626240DT | 1 | 111 | 0.011 | 4 | 0.342 | 35 | 20 | 2 | '626240DT' | CO | MUNICIPAL SUBDIS | 6.500 | 12/1/12 | Not Prerefunded | AAA | Insured | 105.9 | 3.02 | 4.14 | 5.49 | 30.6 | 2.15 | 33.063 | 6 | 1.29 | 1.12 | 5.77 | -0.39 | 0.02 | 0.39 |
| 939828XH | 1 | 111 | 0.011 | 4 | 0.378 | 42 | 23 | 3 | '939828XH' | WA | WASHINGTON ST PU | 5.700 | 7/1/12 | Not Prerefunded | AAA | Insured | 103.9 | 3.06 | 3.51 | 5.01 | 54 | 1.41 | 56.865 | -2 | 1.29 | 0.74 | 5.65 | -1.11 | 0.01 | 0.37 |
| 13033AQJ | 1 | 111 | 0.009 | 2 | 0.408 | 47 | 25 | 4 | '13033AQJ' | CA | CALIFORNIA HLTH | 6.000 | 7/1/17 | Not Prerefunded | AAA | Insured | 104.14 | 3.04 | 4.18 | 5.52 | 50.3 | 1.48 | 53.127 | -5 | 1.31 | 0.74 | 8.55 | -1.14 | 0.01 | 0.89 |
| 544648MG | 1 | 111 | 0.059 | 33 | 0.342 | 35 | 34 | 5 | '544648MG' | CA | LOS ANGELES CALI | 2.500 | 10/1/06 | Not Prerefunded | AAA | Insured | 99.57 | 2.94 | 2.94 | 2.94 | 10.6 | 1.24 | 10.686 | -10 | 1.36 | 0.97 | 0.98 | -0.39 | 0.01 | 0.01 |
| 575827EC | 1 | 111 | 0.091 | 50 | 0.412 | 50 | 50 | 6 | '575827EC' | MA | MASSACHUSETTS ST | 5.000 | 11/1/07 | Not Prerefunded | AAA | Insured | 103.06 | 3.02 | 3.09 | 3.46 | 54.4 | 2.07 | 57.192 | 7 | 1.21 | 1.04 | 1.97 | -0.32 | 0.02 | 0.05 |
| 575827EE | 1 | 111 | 0.109 | 93 | 0.102 | 13 | 53 | 7 | '575827EE' | MA | MASSACHUSETTS ST | 5.000 | 11/1/09 | Not Prerefunded | AAA | Insured | 103.12 | 2.97 | 3.16 | 4.16 | 33.1 | 2.07 | 34.817 | -5 | 1.41 | 1.04 | 3.68 | -0.63 | 0.02 | 0.16 |
| 130657AF | 1 | 111 | 0.011 | 4 | 0.752 | 173 | 89 | 8 | '130657AF' | CA | CALIFORNIA ST DE | 4.000 | 2/1/07 | Not Prerefunded | AAA | Insured | 101.61 | 2.76 | 2.76 | 2.76 | 37 | 0.66 | 37.839 | -19 | 1.29 | 1.29 | 1.31 | 0.02 | 0.02 | 0.02 |
| 13062NF7 | 1 | 111 | 0.011 | 4 | 0.752 | 173 | 89 | 8 | '13062NF7' | CA | CALIFORNIA ST | 4.000 | 2/1/07 | Not Prerefunded | AAA | Insured | 101.57 | 2.79 | 2.79 | 2.79 | 26.9 | 0.66 | 27.499 | -16 | 1.29 | 1.29 | 1.31 | 0.02 | 0.02 | 0.02 |
| 83712DED | 1 | 111 | 0.119 | 114 | 0.652 | 66 | 90 | 10 | '83712DED' | SC | SOUTH CAROLINA H | 5.125 | 7/1/08 | Not Prerefunded | AAA | Insured | 100.34 | 4.99 | 4.99 | 4.99 | 22.6 | 1.27 | 22.963 | 188 | 1.42 | 2.51 | 2.57 | -0.08 | 0.08 | 0.08 |
| 684273EV | 1 | 111 | 0.019 | 11 | 0.752 | 173 | 92 | 11 | '684273EV' | CA | ORANGE CNTY CALI | 5.500 | 2/15/07 | Not Prerefunded | AAA | Insured | 103.63 | 2.79 | 2.79 | 2.79 | 16.4 | 0.69 | 17.109 | -17 | 1.32 | 1.32 | 1.34 | 0.02 | 0.02 | 0.02 |
| 472682FB | 1 | 111 | 0.021 | 14 | 0.752 | 173 | 94 | 12 | '472682FB' | AL | JEFFERSON CNTY A | 5.750 | 2/1/07 | Prerefunded | AAA | Insured | 104.57 | 2.97 | 2.97 | 2.97 | 152.7 | 0.94 | 161.12 | 2 | 1.28 | 1.28 | 1.3 | 0.02 | 0.02 | 0.02 |
| 472682LV | 1 | 111 | 0.021 | 14 | 0.752 | 173 | 94 | 12 | '472682LV' | AL | JEFFERSON CNTY A | 5.375 | 2/1/07 | Prerefunded | AAA | Insured | 103.07 | 3.01 | 3.01 | 3.01 | 98.9 | 0.88 | 102.807 | 6 | 1.28 | 1.28 | 1.3 | 0.02 | 0.02 | 0.02 |
| 57582NDB | 1 | 111 | 0.021 | 14 | 0.752 | 173 | 94 | 12 | '57582NDB' | MA | MASSACHUSETTS ST | 5.500 | 2/1/07 | Not Prerefunded | AAA | Insured | 103.28 | 2.98 | 2.98 | 2.98 | 76.9 | 0.9 | 80.112 | 3 | 1.28 | 1.28 | 1.3 | 0.02 | 0.02 | 0.02 |
| 646131AZ | 1 | 111 | 0.021 | 14 | 0.752 | 173 | 94 | 12 | '646131AZ' | NJ | NEW JERSEY ST TR | 5.750 | 2/1/07 | Not Prerefunded | AAA | Insured | 103.59 | 2.99 | 2.99 | 2.99 | 51.3 | 0.94 | 53.624 | 4 | 1.28 | 1.28 | 1.3 | 0.02 | 0.02 | 0.02 |
| 472682LU | 1 | 111 | 0.021 | 14 | 0.752 | 173 | 94 | 12 | '472682LU' | AL | JEFFERSON CNTY A | 5.625 | 2/1/07 | Prerefunded | AAA | Insured | 104.36 | 3.01 | 3.01 | 3.01 | 29.9 | 0.92 | 31.478 | 6 | 1.28 | 1.28 | 1.3 | 0.02 | 0.02 | 0.02 |
| 472682KV | 1 | 111 | 0.021 | 14 | 0.752 | 173 | 94 | 12 | '472682KV' | AL | JEFFERSON CNTY A | 5.750 | 2/1/07 | Prerefunded | AAA | Insured | 104.57 | 2.97 | 2.97 | 2.97 | 28 | 0.94 | 29.544 | 2 | 1.28 | 1.28 | 1.3 | 0.02 | 0.02 | 0.02 |
| 472682EY | 1 | 111 | 0.021 | 14 | 0.752 | 173 | 94 | 12 | '472682EY' | AL | JEFFERSON CNTY A | 5.700 | 2/1/07 | Prerefunded | AAA | Insured | 104.45 | 3.01 | 3.01 | 3.01 | 25.2 | 0.93 | 26.558 | 6 | 1.28 | 1.28 | 1.3 | 0.02 | 0.02 | 0.02 |
| 419780WN | 1 | 111 | 0.021 | 14 | 0.752 | 173 | 94 | 12 | '419780WN' | HI | HAWAII ST | 5.250 | 2/1/07 | Not Prerefunded | AAA | Insured | 102.96 | 2.97 | 2.97 | 2.97 | 17.8 | 0.86 | 18.481 | 2 | 1.28 | 1.28 | 1.3 | 0.02 | 0.02 | 0.02 |
| 649836TZ | 1 | 111 | 0.021 | 14 | 0.752 | 173 | 94 | 12 | '649836TZ' | NY | NEW YORK ST DORM | 5.250 | 2/1/07 | Prerefunded | AAA | Insured | 104.95 | 2.92 | 2.92 | 2.92 | 112.7 | 0.86 | 119.249 | -3 | 1.28 | 1.28 | 1.3 | 0.02 | 0.02 | 0.02 |
| 303822BJ | 1 | 111 | 0.021 | 14 | 0.752 | 173 | 94 | 12 | '303822BJ' | VA | FAIRFAX CNTY VA | 5.950 | 2/1/07 | Not Prerefunded | AAA | Insured | 103.61 | 3.17 | 3.17 | 3.17 | 15.6 | 0.98 | 16.315 | 22 | 1.28 | 1.27 | 1.29 | 0.02 | 0.02 | 0.02 |
| 485093AX | 1 | 111 | 0.021 | 14 | 0.752 | 173 | 94 | 12 | '485093AX' | MO | KANSAS CITY MO S | 5.000 | 2/1/07 | Not Prerefunded | AAA | Insured | 102.64 | 2.97 | 2.97 | 2.97 | 12.5 | 0.82 | 12.932 | 2 | 1.28 | 1.28 | 1.3 | 0.02 | 0.02 | 0.02 |
| 939827WG | 1 | 111 | 0.201 | 186 | 0.098 | 11 | 99 | 23 | '939827WG' | WA | WASHINGTON ST PU | 5.750 | 7/1/11 | Not Prerefunded | AAA | Insured | 103.96 | 3.03 | 3.44 | 4.95 | 66.9 | 1.42 | 70.5 | 3 | 1.1 | 0.74 | 4.93 | -0.83 | 0.01 | 0.28 |
| 649674BW | 1 | 111 | 0.029 | 26 | 0.752 | 173 | 100 | 24 | '649674BW' | NY | NEW YORK N Y CIT | 4.200 | 2/15/07 | Not Prerefunded | AAA | Insured | 101.63 | 2.98 | 2.98 | 2.98 | 15.7 | 0.52 | 16.038 | 3 | 1.33 | 1.32 | 1.34 | 0.02 | 0.02 | 0.02 |
| 650013XN | 1 | 111 | 0.149 | 128 | 0.702 | 76 | 102 | 25 | '650013XN' | NY | NEW YORK ST TWY | 3.300 | 4/1/07 | Not Prerefunded | AAA | Insured | 100.53 | 2.94 | 2.94 | 2.94 | 27 | 1.64 | 27.585 | -1 | 1.45 | 1.43 | 1.45 | -0.03 | 0.03 | 0.03 |
| 59259NKK | 1 | 111 | 0.209 | 189 | 0.202 | 23 | 106 | 26 | '59259NKK' | NY | METROPOLITAN TRA | 2.600 | 11/15/06 | Not Prerefunded | AAA | Insured | 99.56 | 3 | 3 | 3 | 14.2 | 0.98 | 14.276 | -5 | 1.51 | 1.09 | 1.11 | -0.53 | 0.02 | 0.02 |
| 804875CZ | 1 | 111 | 0.161 | 136 | 0.712 | 77 | 107 | 27 | '804875CZ' | GA | SAVANNAH GA RES | 3.400 | 12/1/06 | Not Prerefunded | AAA | Insured | 100.52 | 2.94 | 2.94 | 2.94 | 15.3 | 1.12 | 15.551 | 2 | 1.14 | 1.13 | 1.14 | -0.02 | 0.02 | 0.02 |
| 345105EE | 1 | 111 | 0.061 | 42 | 0.752 | 173 | 108 | 28 | '345105EE' | CA | FOOTHILL/EASTERN | 4.375 | 1/15/07 | Not Prerefunded | AAA | Insured | 101.95 | 2.83 | 2.83 | 2.83 | 19.3 | 0.91 | 19.852 | -11 | 1.24 | 1.24 | 1.26 | 0.02 | 0.02 | 0.02 |
| 592247A4 | 1 | 111 | 0.161 | 136 | 0.722 | 80 | 108 | 29 | '592247A4' | IL | METROPOLITAN PIE | 6.000 | 12/15/06 | Not Prerefunded | AAA | Insured | 103.63 | 2.92 | 2.92 | 2.92 | 34.3 | 1.75 | 36.145 | -1 | 1.14 | 1.15 | 1.17 | -0.01 | 0.02 | 0.02 |
| | | | | | | | | | | | | | ... | | | | | | | | | | | | | | | | | |
| 64577HMH | 3 | 134 | 3.017 | 382 | 2.670 | 383 | 383 | 383 | '64577HMH' | NJ | NEW JERSEY ECONO | 5.75 | 47939 | Not Prerefunded | BBB3 | NotInsured | 109.13 | 5.11 | 5.11 | 5.11 | 30.5 | 2.86 | 34.155 | 101 | 13.38 | 13.48 | 13.82 | 2.61 | 2.68 | 2.68 |
| 2322653C | 3 | 134 | 3.417 | 386 | 2.410 | 379 | 383 | 383 | '2322653C' | OH | CUYAHOGA CNTY OH | 5.125 | 47119 | Prerefunded | A1 | NotInsured | 103.18 | 4.38 | 4.89 | 4.89 | 26 | 1.27 | 27.156 | 80 | 13.78 | 4.15 | 13.83 | 2.35 | 0.21 | 2.55 |
| 745145XZ | 3 | 134 | 3.387 | 385 | 2.690 | 384 | 385 | 385 | '745145XZ' | PR | PUERTO RICO COMW | 5.500 | 7/1/29 | Not Prerefunded | BBB2 | NotInsured | 113.23 | 4.58 | 4.58 | 4.58 | 100.4 | 1.36 | 115.046 | 48 | 13.75 | 13.69 | 14 | 2.63 | 2.63 | 2.63 |
| 254842AJ | 3 | 134 | 3.357 | 384 | 2.910 | 387 | 386 | 386 | '254842AJ' | DC | DISTRICT COLUMBI | 6.500 | 5/15/33 | Not Prerefunded | BBB2 | NotInsured | 117.62 | 5.28 | 5.28 | 5.28 | 169.1 | 2.44 | 203.021 | 120 | 13.72 | 13.59 | 13.95 | 2.85 | 2.8 | 2.8 |
| 62947NBX | 3 | 134 | 3.567 | 387 | 3.070 | 389 | 388 | 387 | '62947NBX' | NY | N Y CNTYS TOB TR | 6.5 | 40330 | Prerefunded | BBB3 | NotInsured | 114.14 | 3.4 | 5.54 | 5.52 | 40.8 | 2.15 | 47.447 | 147 | 13.93 | 4.01 | 14.19 | 3.01 | 0.2 | 2.96 |
| 13062RXS | 3 | 134 | 3.907 | 388 | 2.960 | 388 | 388 | 387 | '13062RXS' | CA | CALIFORNIA ST | 5.375 | 12/1/10 | Prerefunded | A2 | NotInsured | 110.32 | 3.19 | 4.67 | 4.67 | 56.6 | 1.78 | 63.446 | 57 | 14.27 | 4.47 | 14.39 | 2.9 | 0.24 | 2.82 |
| 57583FFY | 3 | 134 | 4.717 | 391 | 2.870 | 386 | 389 | 389 | '57583FFY' | MA | MASSACHUSETTS ST | 6.000 | 5/15/59 | Not Prerefunded | BBB1 | NotInsured | 119.44 | 4.74 | 4.55 | 4.96 | 30 | 2.25 | 36.507 | 44 | 15.08 | 13.28 | 18.39 | 2.81 | 2.51 | 5.64 |
| 765639AB | 3 | 134 | 4.087 | 389 | 3.070 | 389 | 389 | 390 | '765639AB' | OH | RICKENBACKER OHI | 5.375 | 48214 | Not Prerefunded | A2 | NotInsured | 107.58 | 4.86 | 4.86 | 4.86 | 105.3 | 1.33 | 114.686 | 76 | 14.45 | 14.27 | 14.61 | 3.01 | 2.94 | 2.94 |
| 62947NBY | 3 | 134 | 4.437 | 390 | 3.660 | 392 | 391 | 391 | '62947NBY' | NY | N Y CNTYS TOB TR | 6.625 | 40330 | Prerefunded | BBB3 | NotInsured | 114.68 | 3.4 | 5.68 | 5.67 | 48.5 | 2.19 | 56.681 | 161 | 14.8 | 4 | 15.12 | 3.6 | 0.19 | 3.56 |
| 57583FFZ | 3 | 134 | 5.287 | 392 | 3.490 | 391 | 392 | 392 | '57583FFZ' | MA | MASSACHUSETTS ST | 5.450 | 5/15/59 | Not Prerefunded | BBB1 | NotInsured | 108.96 | 4.87 | 4.64 | 4.97 | 52.2 | 2.04 | 57.947 | 54 | 15.65 | 14.74 | 18.57 | 3.43 | 3.23 | 5.76 |

Offers

Appendix 8

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| 111 | 1 | 59259NJF | 10.3 | NY | METROPOLITAN TRA | 5.000 | 11/15/05 | AAA | FGIC | | 100.150 | 2.870 | 5 | 1.250 | -0.650 | 0.051 | 0.092 | 20 | 8 |
| 111 | 2 | 626240DT | 30.6 | CO | MUNICIPAL SUBDIS | 6.500 | 12/1/12 | AAA | AMBAC | | 105.900 | 3.020 | 6 | 1.290 | -0.590 | 0.011 | 0.342 | 4 | 35 |
| 111 | 3 | 939828XH | 54.0 | WA | WASHINGTON ST PU | 5.700 | 7/1/12 | AAA | MBIA | | 103.900 | 3.060 | -2 | 1.290 | -1.110 | 0.011 | 0.378 | 4 | 42 |
| 111 | 4 | 13033AQJ | 50.3 | CA | CALIFORNIA HLTH | 6.000 | 7/1/17 | AAA | MBIA | | 104.140 | 3.040 | -5 | 1.310 | -1.140 | 0.009 | 0.408 | 2 | 47 |
| 111 | 5 | 544646MG | 10.6 | CA | LOS ANGELES CALI | 2.500 | 10/1/06 | AAA | FSA | | 99.570 | 2.940 | -10 | 1.360 | -0.590 | 0.059 | 0.342 | 33 | 35 |
| 111 | 6 | 575827EC | 54.4 | MA | MASSACHUSETTS ST | 5.000 | 11/1/07 | AAA | FGIC | | 103.060 | 3.020 | 7 | 1.210 | -0.320 | 0.091 | 0.412 | 50 | 50 |
| 111 | 7 | 575827EE | 33.1 | MA | MASSACHUSETTS ST | 5.000 | 11/1/09 | AAA | MBIA | | 103.120 | 2.970 | -5 | 1.410 | -0.530 | 0.109 | 0.102 | 93 | 13 |
| 111 | 8 | 130657AF | 37.0 | CA | CALIFORNIA ST DE | 4.000 | 2/1/07 | AAA | AMBAC | | 101.610 | 2.760 | -19 | 1.290 | 0.020 | 0.011 | 0.752 | 4 | 173 |
| 111 | 8 | 13062NF7 | 26.9 | CA | CALIFORNIA ST | 4.000 | 2/1/07 | AAA | FSA | | 101.570 | 2.790 | -16 | 1.290 | 0.020 | 0.011 | 0.752 | 4 | 173 |
| 111 | 10 | 83712DED | 22.6 | SC | SOUTH CAROLINA H | 5.125 | 7/1/08 | AAA | FSA | AMT | 100.340 | 4.990 | 188 | 1.420 | -0.030 | 0.119 | 0.652 | 114 | 66 |
| 111 | 11 | 684273EV | 16.4 | CA | ORANGE CNTY CALI | 5.500 | 2/15/07 | AAA | MBIA | | 103.630 | 2.790 | -17 | 1.320 | 0.020 | 0.019 | 0.752 | 11 | 173 |
| 111 | 12 | 472682FB | 152.7 | AL | JEFFERSON CNTY A | 5.750 | 2/1/07 | AAA | FGIC | Pre-re | 104.570 | 2.970 | 2 | 1.280 | 0.020 | 0.021 | 0.752 | 14 | 173 |
| 111 | 12 | 472682LV | 98.9 | AL | JEFFERSON CNTY A | 5.375 | 2/1/07 | AAA | FGIC | Pre-re | 103.070 | 3.010 | 6 | 1.280 | 0.020 | 0.021 | 0.752 | 14 | 173 |
| 111 | 12 | 57582NDB | 76.9 | MA | MASSACHUSETTS ST | 5.500 | 2/1/07 | AAA | MBIA | | 103.280 | 2.980 | 3 | 1.280 | 0.020 | 0.021 | 0.752 | 14 | 173 |
| 111 | 12 | 646131AZ | 51.3 | NJ | NEW JERSEY ST TR | 5.750 | 2/1/07 | AAA | AMBAC | | 103.590 | 2.990 | 4 | 1.280 | 0.020 | 0.021 | 0.752 | 14 | 173 |
| 111 | 12 | 472682LU | 29.9 | AL | JEFFERSON CNTY A | 5.625 | 2/1/07 | AAA | FGIC | Pre-re | 104.360 | 3.010 | 6 | 1.280 | 0.020 | 0.021 | 0.752 | 14 | 173 |
| 111 | 12 | 472682KV | 28.0 | AL | JEFFERSON CNTY A | 5.750 | 2/1/07 | AAA | FGIC | Pre-re | 104.570 | 2.970 | 2 | 1.280 | 0.020 | 0.021 | 0.752 | 14 | 173 |
| 111 | 12 | 472682EY | 25.2 | AL | JEFFERSON CNTY A | 5.700 | 2/1/07 | AAA | FGIC | Pre-re | 104.450 | 3.010 | 6 | 1.280 | 0.020 | 0.021 | 0.752 | 14 | 173 |
| 111 | 12 | 419780WN | 17.8 | HI | HAWAII ST | 5.250 | 2/1/07 | AAA | FSA | | 102.960 | 2.970 | 2 | 1.280 | 0.020 | 0.021 | 0.752 | 14 | 173 |
| 111 | 12 | 649036TZ | 112.7 | NY | NEW YORK ST DORM | 5.250 | 2/1/07 | AAA | AMBAC | Pre-re | 104.950 | 2.920 | -3 | 1.280 | 0.020 | 0.021 | 0.752 | 14 | 173 |
| 111 | 12 | 303822BJ | 15.6 | VA | FAIRFAX CNTY VA | 5.950 | 2/1/07 | AAA | AMBAC | AMT | 103.610 | 3.170 | 22 | 1.280 | 0.020 | 0.021 | 0.752 | 14 | 173 |
| 111 | 12 | 485093AX | 12.5 | MO | KANSAS CITY MO S | 5.000 | 2/1/07 | AAA | FGIC | | 102.640 | 2.970 | 2 | 1.280 | 0.020 | 0.021 | 0.752 | 14 | 173 |
| 112 | 1 | 546415JZ | 31.5 | LA | LOUISIANA ST | 5.250 | 4/15/11 | AAA | AMBAC | | 105.080 | 3.520 | 20 | 3.150 | -0.530 | 0.005 | 0.016 | 8 | 2 |
| 112 | 2 | 650017JV | 30.6 | NY | NEW YORK ST TWY | 5.375 | 4/1/12 | AAA | MBIA | | 106.210 | 3.160 | -18 | 3.160 | -0.830 | 0.015 | 0.094 | 25 | 11 |
| 112 | 3 | 575915N2 | 32.6 | MA | MASSACHUSETTS ST | 6.050 | 6/1/14 | AAA | AMBAC | | 102.290 | 5.470 | 174 | 3.100 | -0.510 | 0.045 | 0.026 | 45 | 4 |
| 112 | 4 | 882555WD | 41.2 | TX | TEXAS MUN PWR AG | 4.400 | 9/1/11 | AAA | FGIC | | 101.640 | 3.510 | 1 | 3.130 | -0.520 | 0.015 | 0.384 | 18 | 37 |
| 112 | 5 | 542690JH | 81.1 | NY | LONG ISLAND PWR | 5.125 | 4/1/11 | AAA | MBIA | | 105.220 | 3.320 | 2 | 3.080 | -0.530 | 0.065 | 0.006 | 59 | 1 |
| 112 | 6 | 649668R6 | 25.5 | NY | NEW YORK N Y | 4.625 | 8/1/09 | AAA | MBIA | | 104.650 | 3.230 | -1 | 3.110 | -0.180 | 0.035 | 0.356 | 36 | 32 |
| 112 | 7 | 45884AJY | 38.8 | UT | INTERMOUNTAIN PW | 5.250 | 7/1/10 | AAA | MBIA | | 106.000 | 3.300 | 6 | 3.090 | -0.510 | 0.055 | 0.226 | 54 | 22 |
| 112 | 7 | 803300AC | 28.9 | FL | SARASOTA CNTY FL | 5.750 | 10/1/17 | AAA | MBIA | | 106.130 | 3.290 | -17 | 3.150 | -1.130 | 0.005 | 0.594 | 9 | 67 |
| 112 | 9 | 649876VJ | 26.2 | NY | NEW YORK ST LOC | 5.000 | 4/1/10 | AAA | FGIC | | 105.900 | 3.240 | 0 | 3.210 | -0.230 | 0.065 | 0.316 | 63 | 28 |
| 112 | 10 | 745220BN | 25.6 | PR | PUERTO RICO COMW | 5.250 | 7/1/10 | AAA | AMBAC | | 106.300 | 3.190 | -2 | 3.040 | -0.110 | 0.105 | 0.226 | 91 | 22 |
| 112 | 10 | 650014EA | 19.0 | NY | NEW YORK ST TWY | 2.700 | 4/1/08 | AAA | AMBAC | | 99.160 | 3.050 | -12 | 3.190 | -1.100 | 0.045 | 0.564 | 49 | 64 |
| 112 | 12 | 650013HV | 27.0 | NY | NEW YORK ST TWY | 5.250 | 4/1/12 | AAA | FGIC | | 105.640 | 3.270 | -10 | 3.270 | -0.870 | 0.125 | 0.114 | 105 | 12 |
| 112 | 13 | 234839JN | 41.2 | TX | DALLAS CNTY TEX | 6.700 | 2/15/25 | AAA | AMBAC | | 108.990 | 2.760 | -56 | 3.240 | -0.940 | 0.095 | 0.404 | 88 | 41 |
| 112 | 14 | 052474RG | 41.6 | TX | AUSTIN TEX UTIL | 5.125 | 11/15/13 | AAA | FSA | | 103.870 | 3.220 | -24 | 3.270 | -1.020 | 0.125 | 0.484 | 105 | 51 |
| 112 | 15 | 45884AJZ | 38.7 | UT | INTERMOUNTAIN PW | 5.250 | 7/1/11 | AAA | MBIA | | 106.000 | 3.300 | -2 | 3.340 | -0.470 | 0.195 | 0.066 | 174 | 9 |
| 113 | 1 | 5481004Y | 48.3 | TX | LOWER COLO RIVER | 5.875 | 5/15/14 | AAA | FSA | | 109.150 | 3.430 | -8 | 4.430 | -0.450 | 0.306 | 0.085 | 3 | 12 |
| 113 | 1 | 5481005P | 30.3 | TX | LOWER COLO RIVER | 5.875 | 5/15/14 | AAA | FSA | | 109.150 | 3.430 | -8 | 4.430 | -0.450 | 0.306 | 0.085 | 3 | 12 |
| 113 | 3 | 708840GB | 25.5 | PA | PENNSYLVANIA INT | 5.250 | 6/15/13 | AAA | FGIC | | 106.440 | 3.390 | -11 | 4.460 | -0.570 | 0.036 | 0.175 | 21 | 23 |
| 113 | 4 | 745277FQ | 40.5 | PR | PUERTO RICO MUN | 5.750 | 8/1/13 | AAA | FSA | | 109.720 | 3.280 | -15 | 4.460 | -0.160 | 0.036 | 0.185 | 21 | 25 |
| 113 | 5 | 25476AM4 | 44.4 | DC | DISTRICT COLUMBI | 5.500 | 6/1/13 | AAA | FSA | | 107.620 | 3.520 | 0 | 4.470 | -0.190 | 0.046 | 0.155 | 26 | 21 |
| 113 | 6 | 45884AKC | 84.4 | UT | INTERMOUNTAIN PW | 5.250 | 7/1/15 | AAA | MBIA | | 105.700 | 3.410 | -31 | 4.410 | -1.030 | 0.014 | 0.485 | 8 | 55 |
| 113 | 7 | 542690BC | 101.0 | NY | LONG ISLAND PWR | 5.000 | 12/1/15 | AAA | FSA | | 105.410 | 3.230 | -53 | 4.440 | -1.020 | 0.016 | 0.475 | 12 | 54 |
| 113 | 8 | 64983WYT | 29.9 | NY | NEW YORK ST DORM | 6.125 | 7/1/11 | AAA | AMBAC | | 112.740 | 3.390 | 3 | 4.440 | 0.090 | 0.016 | 0.635 | 12 | 67 |
| 113 | 9 | 34281252 | 26.5 | FL | FLORIDA ST DIV B | 5.250 | 7/1/12 | AAA | FGIC | | 107.380 | 3.390 | -7 | 4.360 | -0.290 | 0.064 | 0.255 | 55 | 32 |
| 113 | 10 | 010608SU | 27.1 | AL | ALABAMA ST PUB S | 5.125 | 11/1/13 | AAA | FSA | | 106.600 | 3.320 | -30 | 4.330 | -0.520 | 0.094 | 0.075 | 87 | 8 |
| 113 | 11 | 717825HK | 53.8 | PA | PHILADELPHIA PA | 5.125 | 5/15/18 | AAA | AMBAC | | 104.770 | 3.570 | -28 | 4.490 | -1.030 | 0.066 | 0.485 | 61 | 55 |
| 113 | 12 | 977109BL | 18.3 | WI | WISCONSIN ST PET | 5.000 | 7/1/11 | AAA | FSA | | 106.980 | 3.500 | 2 | 4.340 | -0.190 | 0.084 | 0.355 | 78 | 42 |
| 113 | 13 | 5604245T | 28.3 | ME | MAINE HEALTH & H | 4.875 | 7/1/17 | AAA | FSA | | 104.470 | 3.510 | -27 | 4.510 | -0.580 | 0.086 | 0.435 | 82 | 50 |
| 113 | 14 | 167592QB | 30.1 | IL | CHICAGO ILL O HA | 5.500 | 1/1/12 | AAA | AMBAC | AMT | 107.420 | 3.610 | 36 | 4.510 | -0.080 | 0.086 | 0.465 | 82 | 53 |
| 113 | 15 | 010608SV | 28.4 | AL | ALABAMA ST PUB S | 5.125 | 11/1/14 | AAA | FSA | | 106.600 | 3.320 | -36 | 4.560 | -0.730 | 0.136 | 0.185 | 136 | 24 |
| 114 | 1 | 45853JEC | 37.8 | CA | INTERCOMMUNITY H | 5.250 | 11/1/19 | A2 | ACA | | 103.378 | 4.500 | 45 | 5.520 | -0.480 | 0.008 | 0.041 | 6 | 4 |
| 114 | 2 | 254839WN | 37.8 | DC | DISTRICT COLUMBI | 5.750 | 9/15/20 | AAA | MBIA | | 108.850 | 3.570 | -21 | 5.530 | -0.630 | 0.018 | 0.191 | 13 | 22 |
| ... | | | | | | | | | | | | | | | | | | | |
| 133 | 15 | 888808BK | 554.2 | NJ | TOBACCO SETTLEME | 6.750 | 6/1/39 | BBB2 | | | 115.860 | 4.300 | 26 | 8.130 | -0.150 | 0.208 | 0.010 | 99 | 4 |
| 134 | 1 | 64966DQS | 32.9 | NY | NEW YORK N Y | 5.000 | 11/1/27 | A1 | | | 103.920 | 4.470 | 8 | 10.450 | -0.040 | 0.087 | 0.000 | 21 | 1 |
| 134 | 2 | 64966DQQ | 32.5 | NY | NEW YORK N Y | 5.000 | 11/1/26 | A1 | | | 103.990 | 4.460 | 10 | 10.280 | -0.040 | 0.083 | 0.020 | 19 | 7 |
| 134 | 3 | 645916S6 | 102.1 | NJ | NEW JERSEY ECONO | 5.500 | 6/15/31 | BBB2 | | | 104.060 | 4.920 | 52 | 10.200 | -0.050 | 0.163 | 0.010 | 35 | 3 |
| 134 | 4 | 258174AQ | 51.9 | SC | DORCHESTER CNTY | 5.250 | 12/1/29 | A3 | | | 103.680 | 4.750 | 40 | 10.290 | -0.120 | 0.073 | 0.070 | 12 | 36 |
| 134 | 5 | 64966DSM | 30.4 | NY | NEW YORK N Y | 5.000 | 11/1/25 | A1 | | | 103.990 | 4.460 | 14 | 10.110 | -0.040 | 0.253 | 0.020 | 60 | 7 |
| 134 | 5 | 64966DQN | 26.8 | NY | NEW YORK N Y | 5.000 | 11/1/25 | A1 | | | 103.990 | 4.460 | 14 | 10.110 | -0.040 | 0.253 | 0.020 | 60 | 7 |
| 134 | 7 | 17131HAU | 45.0 | CA | CHULA VISTA CALI | 5.250 | 12/1/27 | A1 | | AMT | 102.930 | 4.880 | 44 | 10.440 | -0.170 | 0.077 | 0.110 | 16 | 64 |
| 134 | 7 | 64966DQU | 30.4 | NY | NEW YORK N Y | 5.000 | 11/1/28 | A1 | | | 103.770 | 4.490 | 6 | 10.610 | -0.110 | 0.247 | 0.050 | 58 | 22 |
| 134 | 9 | 75212YAE | 38.4 | CA | RANCHO MIRAGE CA | 5.625 | 7/1/34 | A3 | | | 104.720 | 4.950 | 57 | 10.190 | 0.030 | 0.173 | 0.090 | 39 | 42 |
| 134 | 10 | 791748DN | 31.2 | MN | ST LOUIS PARK MI | 5.250 | 7/1/30 | A2 | | | 103.540 | 4.750 | 37 | 10.270 | -0.170 | 0.093 | 0.110 | 22 | 64 |
| 134 | 10 | 13062PJ9 | 35.3 | CA | CALIFORNIA ST | 5.000 | 6/1/28 | A2 | | | 104.100 | 4.450 | 5 | 10.590 | 0.010 | 0.227 | 0.070 | 53 | 33 |
| 134 | 12 | 162033GD | 28.4 | GA | CHATHAM CNTY GA | 5.500 | 1/1/34 | A3 | | | 104.790 | 4.790 | 39 | 10.020 | -0.040 | 0.343 | 0.020 | 80 | 7 |
| 134 | 13 | 345105AH | 180.0 | CA | FOOTHILL/EASTERN | 5.000 | 1/1/35 | BBB3 | | | 94.560 | 5.370 | 70 | 10.650 | 0.000 | 0.287 | 0.060 | 70 | 27 |
| 134 | 14 | 13078RDB | 42.9 | CA | CALIFORNIA STATE | 5.625 | 5/15/34 | BBB3 | | | 102.500 | 5.290 | 90 | 10.520 | -0.170 | 0.157 | 0.110 | 34 | 64 |
| 134 | 15 | 13062PPR | 93.1 | CA | CALIFORNIA ST | 5.125 | 2/1/28 | A2 | | | 104.790 | 4.430 | 5 | 10.080 | 0.010 | 0.283 | 0.070 | 66 | 33 |

Good Offers

Matrix 3

| 1 | 2 | 3 | 4 | 5 | 6 | 7 | 8 | 9 | 10 | 11 | 12 |
|---|---|---|---|---|---|---|---|---|---|---|---|
| 111 | 12 | 756 | 0.010 | 2.290 | 1.301 | 0.000 | -2.670 | -0.732 | 744 | 5 | 748 |
| 112 | 757 | 1501 | 2.290 | 3.780 | 3.145 | 0.070 | 0.170 | -0.536 | 743 | 749 | 1491 |
| 113 | 1502 | 2173 | 3.780 | 4.990 | 4.424 | 0.170 | -0.930 | -0.545 | 666 | 1492 | 2157 |
| 114 | 2174 | 2813 | 4.990 | 6.000 | 5.512 | 0.290 | 0.320 | -0.439 | 645 | 2158 | 2802 |
| 115 | 2814 | 3405 | 6.000 | 6.930 | 6.473 | 0.440 | 0.190 | -0.534 | 596 | 2803 | 3398 |
| 116 | 3406 | 3932 | 6.940 | 7.930 | 7.419 | -2.390 | -2.330 | -0.458 | 525 | 3399 | 3923 |
| 117 | 3933 | 4459 | 7.930 | 8.860 | 8.400 | -1.260 | -0.420 | -0.200 | 524 | 3924 | 4447 |
| 118 | 4460 | 4959 | 8.860 | 9.790 | 9.329 | 0.160 | 0.380 | -0.139 | 505 | 4448 | 4952 |
| 119 | 4960 | 5421 | 9.800 | 10.680 | 10.232 | -0.530 | 1.490 | -0.121 | 462 | 4953 | 5414 |
| 1110 | 5422 | 5905 | 10.690 | 16.180 | 11.929 | 0.340 | 3.100 | 0.816 | 484 | 5415 | 5898 |
| 1111 | 0 | 0 | 0.000 | 0.000 | 0.000 | 0.000 | 0.000 | 0.000 | 0 | 5899 | 5898 |
| 1112 | 0 | 0 | 0.000 | 0.000 | 0.000 | 0.000 | 0.000 | 0.000 | 0 | 5899 | 5898 |
| 1113 | 0 | 0 | 0.000 | 0.000 | 0.000 | 0.000 | 0.000 | 0.000 | 0 | 5899 | 5898 |
| 1114 | 0 | 0 | 0.000 | 0.000 | 0.000 | 0.000 | 0.000 | 0.000 | 0 | 5899 | 5898 |
| 1115 | 0 | 0 | 0.000 | 0.000 | 0.000 | 0.000 | 0.000 | 0.000 | 0 | 5899 | 5898 |
| 121 | 5906 | 6632 | 0.040 | 2.450 | 1.519 | 0.000 | 0.080 | -0.302 | 725 | 5899 | 6623 |
| 122 | 6633 | 7328 | 2.450 | 4.180 | 3.326 | 0.080 | 0.210 | -0.116 | 698 | 6624 | 7321 |
| 123 | 7329 | 7962 | 4.190 | 6.090 | 5.151 | 0.210 | 0.440 | -0.114 | 634 | 7322 | 7955 |
| 124 | 7963 | 8460 | 6.100 | 7.560 | 6.785 | 0.460 | 0.690 | -0.164 | 498 | 7956 | 8453 |
| 125 | 8461 | 8979 | 7.570 | 9.530 | 8.524 | -2.660 | -0.450 | 0.034 | 519 | 8454 | 8972 |
| 126 | 8980 | 9383 | 9.540 | 15.980 | 11.170 | -0.790 | 4.020 | 0.354 | 404 | 8973 | 9376 |
| 127 | 0 | 0 | 0.000 | 0.000 | 0.000 | 0.000 | 0.000 | 0.000 | 0 | 9377 | 9376 |
| 128 | 0 | 0 | 0.000 | 0.000 | 0.000 | 0.000 | 0.000 | 0.000 | 0 | 9377 | 9376 |
| 129 | 0 | 0 | 0.000 | 0.000 | 0.000 | 0.000 | 0.000 | 0.000 | 0 | 9377 | 9376 |
| 1210 | 0 | 0 | 0.000 | 0.000 | 0.000 | 0.000 | 0.000 | 0.000 | 0 | 9377 | 9376 |
| 1211 | 0 | 0 | 0.000 | 0.000 | 0.000 | 0.000 | 0.000 | 0.000 | 0 | 9377 | 9376 |
| 1212 | 0 | 0 | 0.000 | 0.000 | 0.000 | 0.000 | 0.000 | 0.000 | 0 | 9377 | 9376 |
| 1213 | 0 | 0 | 0.000 | 0.000 | 0.000 | 0.000 | 0.000 | 0.000 | 0 | 9377 | 9376 |
| 1214 | 0 | 0 | 0.000 | 0.000 | 0.000 | 0.000 | 0.000 | 0.000 | 0 | 9377 | 9376 |
| 1215 | 0 | 0 | 0.000 | 0.000 | 0.000 | 0.000 | 0.000 | 0.000 | 0 | 9377 | 9376 |
| 131 | 9384 | 10090 | 0.000 | 4.580 | 2.613 | 0.000 | 0.250 | -0.495 | 707 | 9377 | 10083 |
| 132 | 10091 | 10617 | 4.590 | 7.570 | 6.185 | -1.470 | 0.580 | -0.323 | 524 | 10084 | 10607 |
| 133 | 10618 | 10990 | 7.570 | 9.080 | 8.338 | -0.080 | 0.560 | -0.200 | 376 | 10608 | 10983 |
| 134 | 10991 | 11382 | 9.090 | 15.650 | 10.363 | -0.370 | 3.430 | -0.060 | 392 | 10984 | 11375 |
| 135 | 0 | 0 | 0.000 | 0.000 | 0.000 | 0.000 | 0.000 | 0.000 | 0 | 11376 | 11375 |
| 136 | 0 | 0 | 0.000 | 0.000 | 0.000 | 0.000 | 0.000 | 0.000 | 0 | 11376 | 11375 |
| 137 | 0 | 0 | 0.000 | 0.000 | 0.000 | 0.000 | 0.000 | 0.000 | 0 | 11376 | 11375 |
| 138 | 0 | 0 | 0.000 | 0.000 | 0.000 | 0.000 | 0.000 | 0.000 | 0 | 11376 | 11375 |
| 139 | 0 | 0 | 0.000 | 0.000 | 0.000 | 0.000 | 0.000 | 0.000 | 0 | 11376 | 11375 |
| 1310 | 0 | 0 | 0.000 | 0.000 | 0.000 | 0.000 | 0.000 | 0.000 | 0 | 11376 | 11375 |

Table

| Rating | Group | RatTab | Lower | Composite |
|---|---|---|---|---|
| AAA | 2 | 864 | 1 | NR |
| AA1 | 2 | 840 | 14 | D |
| AA2 | 2 | 816 | 61 | D |
| AA3 | 2 | 792 | 85 | D |
| A1 | 3 | 768 | 109 | D |
| A2 | 3 | 744 | 133 | D |
| A3 | 3 | 720 | 157 | D |
| BBB1 | 3 | 696 | 181 | D |
| BBB2 | 3 | 672 | 205 | D |
| BBB3 | 3 | 648 | 229 | D |
| BB1 | NA | 624 | 253 | C |
| BB2 | NA | 600 | 277 | C |
| BB3 | NA | 576 | 301 | C |
| B1 | NA | 552 | 325 | CC |
| B2 | NA | 528 | 349 | CC |
| B3 | NA | 504 | 373 | CC |
| CCC1 | NA | 480 | 397 | CCC3 |
| CCC2 | NA | 456 | 421 | CCC2 |
| CCC3 | NA | 432 | 445 | CCC1 |
| CC1 | NA | 408 | 469 | B3 |
| CC2 | NA | 384 | 493 | B2 |
| CC3 | NA | 360 | 517 | B1 |
| C1 | NA | 336 | 541 | BB3 |
| C2 | NA | 312 | 565 | BB2 |
| C3 | NA | 288 | 589 | Ba1 |
| DDD1 | NA | 264 | 613 | Baa3 |
| DDD2 | NA | 240 | 637 | Baa2 |
| DDD3 | NA | 216 | 661 | Baa1 |
| DD1 | NA | 192 | 685 | A3 |
| DD2 | NA | 168 | 709 | A2 |
| DD3 | NA | 144 | 733 | A1 |
| D1 | NA | 120 | 757 | Aa3 |
| D2 | NA | 96 | 781 | Aa2 |
| D3 | NA | 72 | 805 | Aa1 |
| NR | NA | 48 | 829 | Aaa |

Appendix 9

METHODS FOR ASSET INDEX TRACKING

RELATED APPLICATIONS

Applicants hereby claim priority under 35 USC §119 for U.S. provisional patent application No. 60/737,535 filed Nov. 15, 2005 and titled "APPARATUSES, METHODS AND SYSTEMS FOR ASSET INDEX TRACKING".

The entire contents of the aforementioned application(s) are herein expressly incorporated by reference.

FIELD

The present invention is directed generally to apparatuses, methods, and systems for an electronic marketplace, and more particularly, to an apparatus, method and system for asset index tracking.

BACKGROUND

Computerized marketplaces of all kinds range from simple classified ad bulletin boards to complex mainframe-based market systems such as NASDAQ, which offers a real-time market-making system for tens of thousands of securities brokers. These marketplace systems centralize interactions between its constituent providers and seekers of assets, goods, opportunities and services. All modern stock, bond and commodity exchanges are supported by underlying computerized databases and related systems, which enable them to function.

Trading systems for items having substantial value generally are an automated version of a manual trading process. For example, securities trading systems are based on a model wherein a customer contacts a so-called retail broker to place an order. The broker, in turn, submits the order to a dealer who executes the order and returns an order confirmation to the broker. Other known systems automate the open outcry process used in trading pits. Importantly, securities trading is heavily regulated. Many of the terms and conditions prevalent in securities trades are limited by convention and regulation. Automated securities trading systems necessarily reflect these constraints. Such financial systems typically rely on underlying information technology systems, user interfaces, networks, and/or other core technologies.

SUMMARY

The disclosure details the implementation of apparatuses, methods, and systems for asset index tracking Prior to the inventive aspects of the present disclosure, it was not possible to easily moderate an asset portfolio so that it maintains characteristics similar to that of asset indices. The disclosure details how an asset index tracker aligns investor asset portfolios to a selected asset index. The asset index tracker enables investors to automatically match their portfolio to a predefined index. The asset index tracker compares the investor's portfolio to the selected index and provides recommendations to rebalance the portfolio at specified intervals. This is achieved by comparing the investor's portfolio to the index to determine the trades necessary to align the portfolio to the index. A correlation and estimated tracking error of the portfolio to the index may be calculated to validate how the portfolio matches the index. The resulting trade recommendations may be executed upon the investor's approval or automatically. The execution of the trades achieves the rebalancing of the investor's portfolio to more closely track a selected target index.

In accordance with certain aspects of the disclosure, the above-identified problems are overcome and a technical advance is achieved in the art of asset index tracking Δn exemplary network selector to adjust a portfolio includes a method to select an index of assets, select a portfolio of asset holdings and adjust the portfolio of asset holdings to match the index.

BRIEF DESCRIPTION OF THE DRAWINGS

The accompanying appendices and/or drawings illustrate various non-limiting, example, inventive aspects in accordance with the present disclosure.

APPENDICES 1-3 of the present disclosure illustrate inventive aspects of a asset portfolio report;

APPENDICES 4-9 of the present disclosure represent matrices used for computation by the alignment heuristic.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Asset Index Tracking Data Flows

Figure 1:
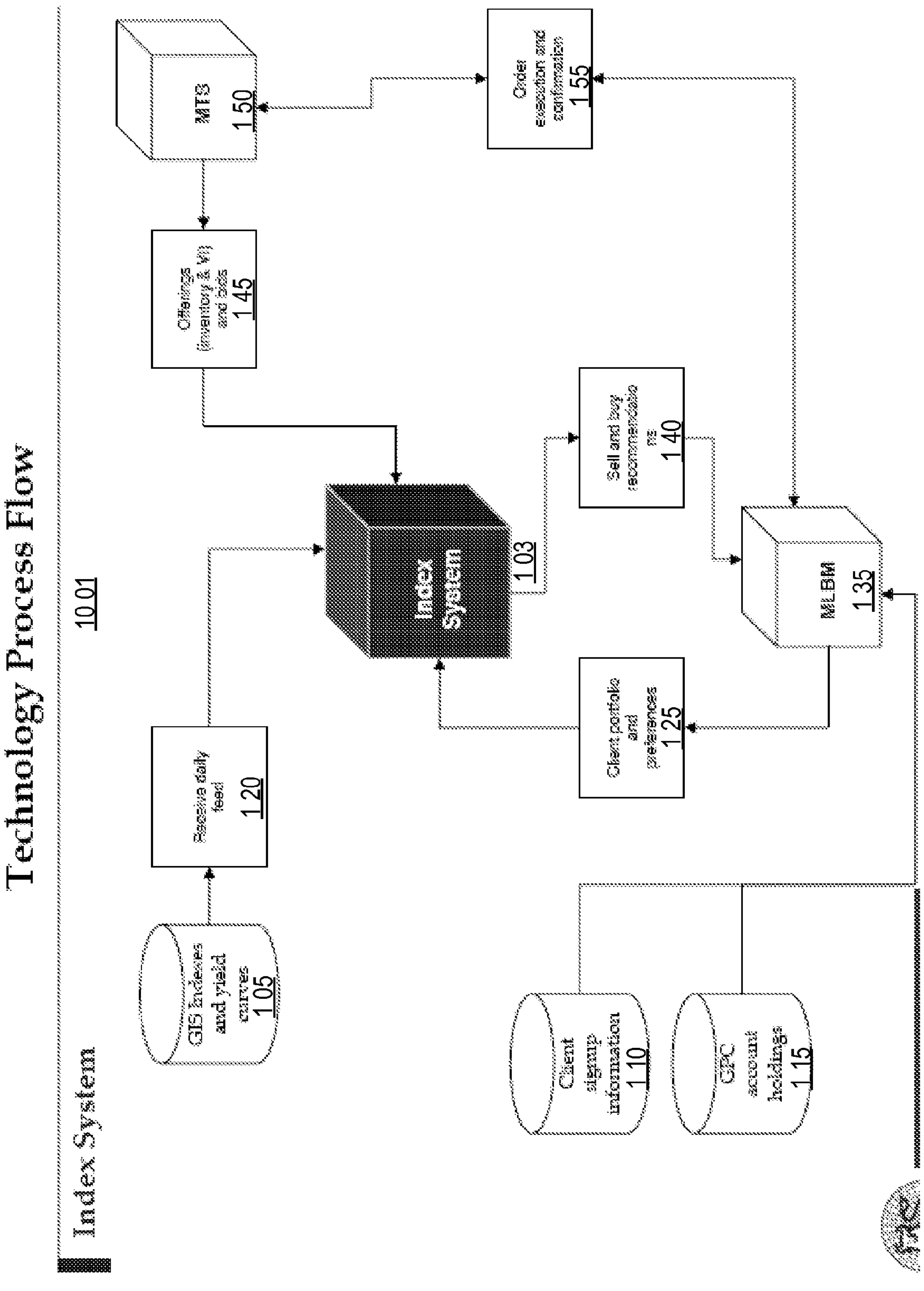
FIG. 1 of the present disclosure illustrates inventive aspects of an asset index tracker in a data flow diagram.

FIG. 1 of the present disclosure illustrates inventive aspects of an asset index tracker in a data flow diagram. The asset index tracker 1001 enables the analysis, adjusting, matching and tracking of any types of assets to indices of assets. Although the following disclosure will generally use bond portfolios and bond indices as an example asset type for eased discussion, it should be noted that the asset index tracker may be used to track any kind of asset portfolio to any kind of asset index. As such, the types of assets used may include any kinds of securities/equities such as bonds, currencies, stocks, and/or the like. For example, the asset index tracker analyzes investors' portfolios relative to one or more selected bond indices and adjusts the portfolios to more closely track the indices.

In one embodiment, the asset index tracker includes a database 105, 110, 115, that includes client account information (e.g., their sign up information such as their name, address, holding preferences, etc.) 110, (e.g., their account holdings, asset portfolios, etc.) 115 and market asset information (e.g., indices, yield curves, etc.). The asset index tracker database may take on numerous forms depending on the deployment requirements, such as: a single database having numerous tables, a distributed database, a number of separate and integrated databases, and/or the like (see 1019 of FIG. 10 for more details). The asset index tracker database uses market asset information to provide a number of indices to which investors may align their asset portfolios. The asset index tracker may use investors' account information 110, 115 to provide an asset portfolio that will be aligned to a selected asset index.

In one embodiment, the asset index tracker 1001 may obtain a daily feed 120 at an asset index matcher 103. The asset index matcher 103 may generate a request for the asset index tracker database; in response, the asset index tracker database would select records satisfying the request, format them for transport, and then provide a response to the request. In one embodiment, the request may be an SQL query to select indices, yield curves, etc. In one embodiment, the feed is an XML tagged list of fields and values such as indices, index components, yield curve values, yield curve value components, and/or the like. These various feed components may be obtained from the asset index tracker database as delineated fields and values. An example feed follows:

<Index 1>
<Index Component Name 1>Asset Name 1</Index Component Name 1>
<Index Component Value 1>12345.12</Index Component Value 1>
<Index Component Name 2>Asset Name 2</Index Component Name 2>
<Index Component Value 2>67890.34</Index Component Value 2>
. . .
<Index Component Value N>33333.33</Index Component Value N>
<Index Description>This index is comprised of components 1-N in a weighted average that represents the Y market . . . </Index Description>
<Index 1 Name>Name of Index 1</Index 1 Name>
<Current Index Value>23467.25</Current Index Value>
. . .
</Index 1>

In another embodiment, the data feed may be obtained at different intervals. For example, using a unix cron job to initiate the retrieval of information, the asset index tracker may use any specified interval for such retrievals, e.g., every day, every hour, every minute, etc. In one embodiment, rather than basing retrieval on regular intervals, the intervals may be based on a specified function or even on demand. For example, when sell-and-buy recommendations 140 are used for display by the user interface front end 135, the asset index matcher 103 may issue a request to obtain the data feed 120 from the asset index tracker database 105 on demand.

Similarly, the front end 135 may obtain investor information from the asset index tracker database 110, 115. The front end 135 may then provide the index matcher 103 with investor asset portfolios and investment preferences 125. The asset index matcher 103 may generate sell-and-buy recommendations that may be used to align a portfolio to a selected index per an investor's preferences. As such, the front end 135 may obtain sell-and-buy recommendations 140 generated from the asset index matcher 103 and use them to provide recommendations to the investor, the investor's financial advisor, a trader, a trading component 155, 150, and/or the like. In one embodiment, database adaptors are used to pass information between the asset index matcher/front end and the trading component 150. One example of a trading component is the Merrill Lynch trading system.

Further, the asset index matcher 103 is also disposed in communication with a trading component 150 that allows the asset index tracker 1001 to generate trades based on its sell-and-buy recommendations 140. In addition, the trading component 150 may provide the asset index matcher 103 with information regarding various asset offerings 145. For example, the trading component may provide asset inventory, street offerings (i.e., Virtual Inventory (VI)), offer/bid values, and/or the like with which the asset index matcher 103 may comprise its sell-and-buy recommendations. In one embodiment, these offerings 145 may be obtained from market values of assets.

Upon presenting sell-and-buy recommendations 140 to the front end for investors and/or financial advisors' approval (or by automatic execution), the front end may issue a request for an order execution 155 that is obtained by the trading component 150, which in turn provides a confirmation to the front end, which enables the front end to update the investor's account holdings in the asset index tracker database 115.

Investor Profile Generation Logic Flow

Figure 2:
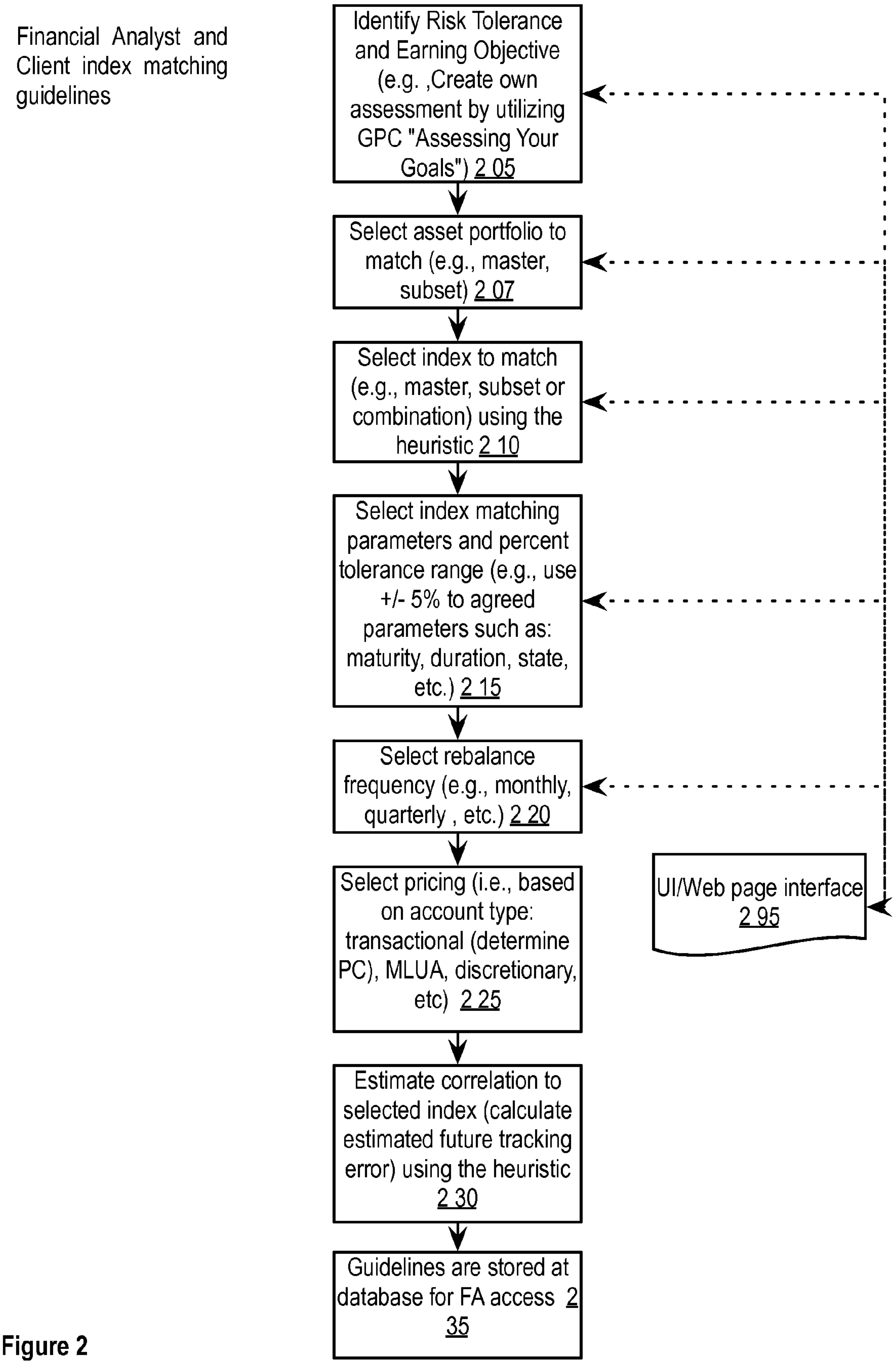
FIG. 2 of the present disclosure illustrates inventive aspects of an asset index tracker investment profile generator in a logic flow diagram.

FIG. 2 of the present disclosure illustrates inventive aspects of an asset index tracker investment profile generator in a logic flow diagram. With regard to the figure, it should be noted that solid lines and arrows represent logic flow, while dashed lines represent data flow and/or associations. The front end 135 of the asset index tracker 1001 provides an interface 295 that allows investors/financial advisors to interact with the asset index tracker. In one embodiment, an interface 295 is provided via HTML web forms as shown in FIG. 7.

In one embodiment, the asset index tracker front end 103 allows an investor/financial advisor to identify the risk tolerance and earning objectives of an investor 205. In one embodiment, this is achieved by having the investor create their own investment preferences profile by assessing the goals of the investor through a series of questions that help generate and categorize investors' investment profile. In one embodiment, a Global Private Client (GPC) component is used to make the assessment and generate the profile 205 (e.g., see 730 of FIG. 7 for an example).

Upon generating an investment profile 205, the front end allows an investor/financial advisor to sign up and/or modify an index tracking account. In one embodiment, the asset index tracker front end allows an investor/financial advisor to select an asset portfolio 207. The investor/financial advisor may select an entire investor portfolio, a subset, several subsets, or any collection of assets held by an investor by using a user interface 295, 705 of FIG. 7 to make the selection. For example, in FIG. 7 an investor selects bonds 707 from their selected account 709; these selections constitute the asset portfolio that is to track a selected asset index. In one embodiment, all assets within an account are selected by default. The list of assets may be retrieved and reference entries from the asset index tracker database. Upon selecting the asset portfolio, a user may create an new index tracking account by engaging a widget, e.g., by engaging a "sign up/modify" button 718 of FIG. 7, which store the assets selected to comprise the asset portfolio that will track a selected asset index. As such, the front end may present a list of assets and/or asset portfolios for selection 207.

Figure 7:
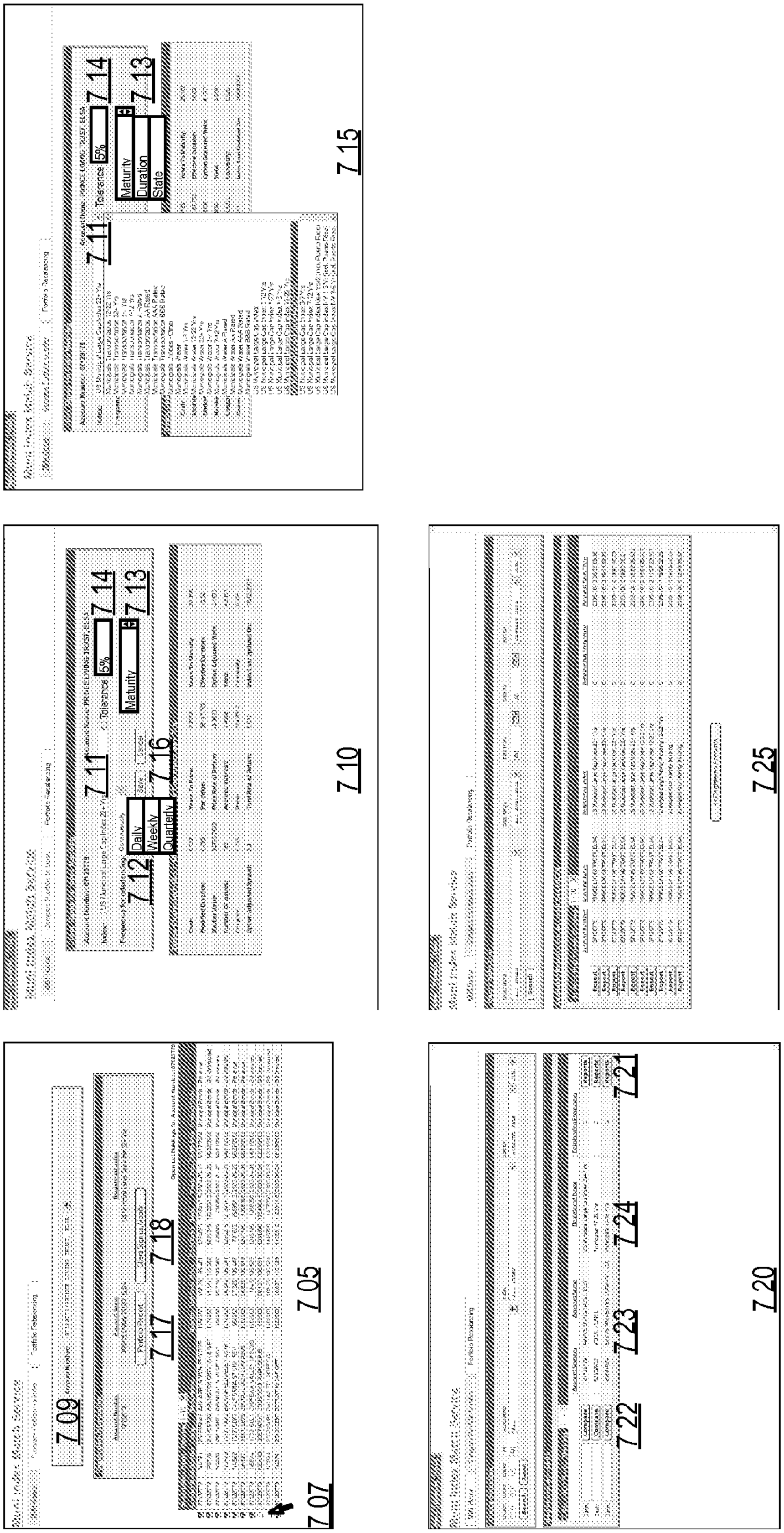
FIG. 7 of the present disclosure illustrates inventive aspects of a user interface front end for the asset index tracker.

Similarly, the investor/financial advisor may select 295, 715 of FIG. 7 a desired asset index 210. For example, in FIG. 7 an investor may choose a desired bond index 715 from a popup list of bond indices 711. The list of indices used to populate the popup may be retrieved and reference entries from the asset index tracker database.

The selected index 210 will be used as a target to which an investor's selected asset portfolio 207 will be aligned. The alignment heuristic employed by the asset index tracker (which will be discussed in greater detail in FIG. 9) may be augmented by various parameters. As such, an investor/financial advisor may select 295 an index matching parameter 215, 295. For example, the degree to which the asset portfolio tracks the selected index may be established with a tolerance range setting. Thus, maturity, duration, state, and/or the like index matching settings may be established, each with its own tolerance setting that affects how closely an investor's portfolio will track a selected asset index. For example, in FIG. 7 an investor may choose 715 an index matching parameter type from a popup box 713 and enter in a tolerance value 714 for each parameter.

In addition, the investor/financial advisor may provide 295 a rebalance frequency value 220, 295. Thus, the investor's portfolio may be aligned to the selected asset index with various frequencies, such as: continuously, every set number of minutes, every set number of hours, every set number of days, every set number of weeks, every set number of months, every set number of quarters, every set number of years, etc. In one embodiment, a unix cron job is set to rebalance the investor's asset portfolio as provided rebalancing frequency setting. For example, in FIG. 7 an investor may choose a desired rebalancing frequency setting via a popup menu 712. In another embodiment, a text box may be used to set any variable frequency. In an alternative embodiment, updates may be performed as defined by a trigger, e.g., every time the investor/financial analyst logs into the investor account, every time a critical economic indicator is updated, and/or any specified function. Upon making the various investor preference selections, a user may engage a save or cancel indicator 716 (e.g., a button), which would cause the invest preference settings to be saved in the asset index tracker's database as part of an investor profile. In one embodiment, the web form values are sent to the asset index matcher 103 via an HTTP post command, and are in turn parsed and stored to respective/matching fields in the asset index tracker database.

In one embodiment, pricing of the assets that are to be updated in the investor's portfolio are set based on their account type 225. For example, institutional investors may obtain pricing on assets that is different from individual investors. Further, any type of investor may have several different account types that will affect the pricing of assets, such as: transactional (e.g., fee based vs. commission accounts), user account, discretionary (e.g., which includes a service fee), and/or the like. In one embodiment, pricing levels are based on the account type, which may be determined based on the user's account login settings.

The asset index tracker may estimate a correlation to the selected asset index using the alignment heuristic (which will be discussed in greater detail in FIG. 9) 230. Once this correlation value is generated it may be displayed to the user via the front end and/or stored in the asset index tracker database. In one embodiment, a correlation value is generated every asset portfolio rebalance as per the rebalance frequency value. The correlation values, the price points, the rebalance frequencies, the index matching parameters, the selected asset portfolio assets and asset indices may all be saved as part of an investor profile in the asset index tracker database 235.

Asset Index Tracker Logic Flow

Figure 3:
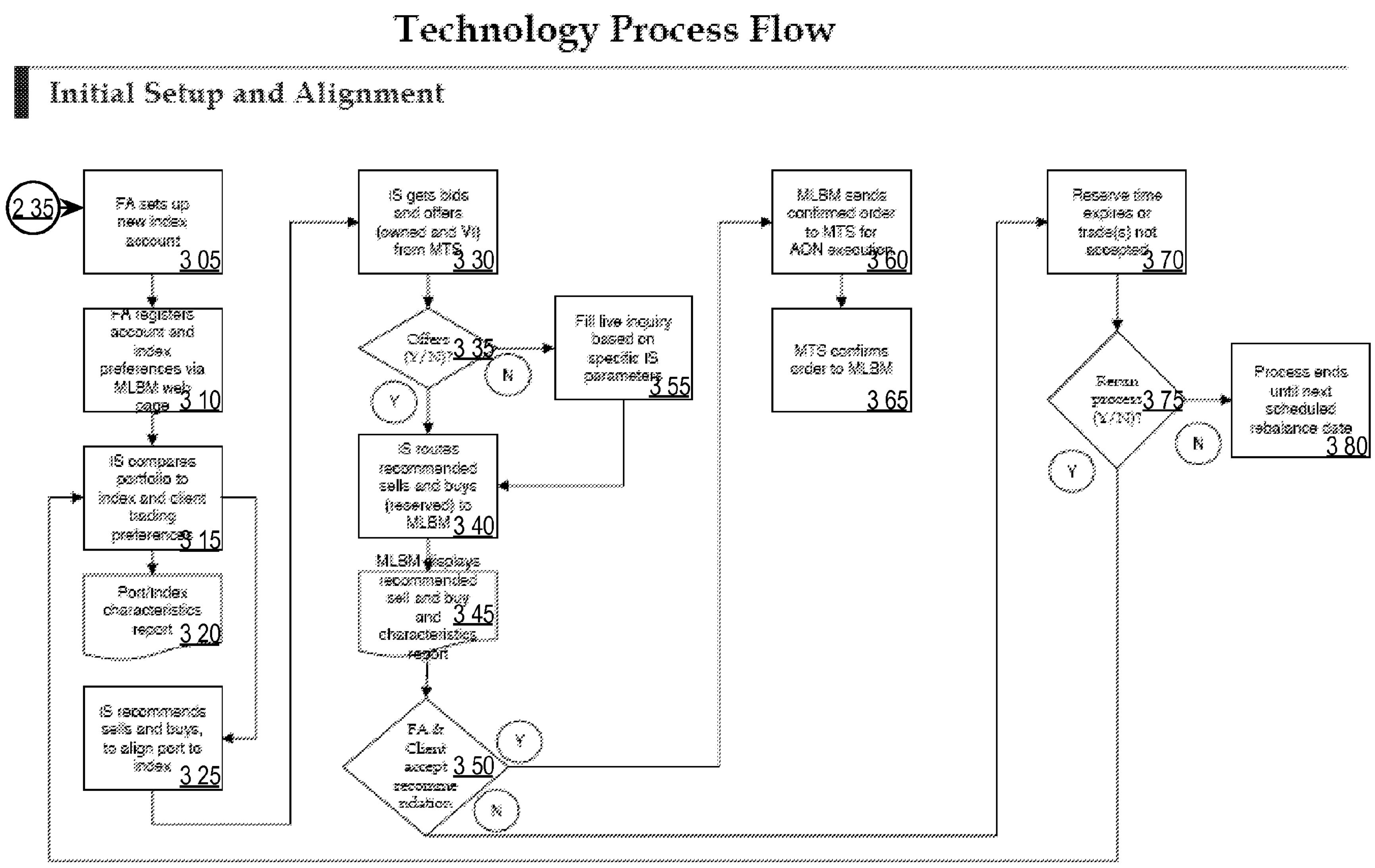
FIG. 3 of the present disclosure illustrates inventive aspects of an initial asset index tracker logic flow diagram.

FIG. 3 of the present disclosure illustrates inventive aspects of an initial asset index tracker logic flow diagram. In one embodiment, a financial advisor set up an index account for an investor 305. As has already been discussed in FIG. 2, 235, the financial advisor (or in an alternative embodiment, the investor himself/herself) sets up the index account 305 by registering their account and index preferences via the asset index tracker's 1001 front end 135, 310. In one embodiment, the asset index matcher 103 compares the investor's asset portfolio to a selected asset index according to preferences stored in the investor profile 315 as has already been discussed in FIG. 2; see FIG. 9 for discussion of the comparison heuristic.

In one embodiment, the front end 103 provides a facility to display a characteristics report for the selected asset portfolio and asset index 320 (e.g., a user may engage a "Portfolio Report" button 717 of FIG. 7 to generate report; see Appendices 1-3 for an example portfolio report). In one embodiment, a user may specify any number of asset portfolios to be compared to any number of asset indices via a user interface. In one example in FIG. 7, a web form interface 720 is used where a user specified the assets 723 relative to specified assets indices 724 and a compare button 722 will generate a new comparison while a report button 721 may be used to view current and/or past comparisons (e.g., see 805 of FIG. 8); the web form interface may be used to list numerous comparison reports 725.

Upon comparing the asset portfolio to the asset index 315, the asset index matcher 103 may make asset trade recommendations (i.e., to buy and sell assets to change the components of the asset portfolio) to update the asset portfolio to track the selected asset index 325 based on the alignment heuristic (which will be discussed in greater detail in FIG. 9).

The asset index matcher 103 may obtain offer and bid prices for the component assets needed to update the asset portfolio 330 from the trading component 150. In one embodiment, the asset index matcher uses the component assets as query tokens to make selections for bid/offer price quotes from the trading component 150, which may in turn return offer/bid market values for the respective component assets.

In the case where there are no offers 335, the asset index matcher 103 will fill a live inquiry to the trading component 150 based on asset index matcher parameters 355, which will be discussed in greater detail in FIG. 9. Otherwise 335, the asset index matcher 103 provides the trade recommendations to the front end 135, 340. In one embodiment, the front end 135 displays the trade recommendations and/or characteristics report 345. Upon obtaining the trade recommendations, the investor/financial advisor may accept, or not accept 350 the trade recommendations. Trade recommendations may be provided for review by the user in any number of ways. Several embodiments may include HTML web forms. For example, whenever the user logs in to their account at the front end, a link and/or web page may be shown with the trade recommendations and buttons to accept or decline each and/or all of the component assets trade recommendations. In another example, such a web page may be emailed to the user. In another embodiment, a plain email with the trade recommendations may be sent to the user, and the user may assent/decline by placing an "agree" or "decline" message in the subject and/or body of the email reply. In the case of the web pages, an HTTP post may be sent back to the front end 135 with an "agree" or "decline" message based on the user's selection. In the case of the email reply, and SMTP message may be sent back to the front end, which in turn may parse the message. In all examples, a user account identifier is provided with the message sent to the user, and is sent back to the front end to ensure authorizations for trades are properly matched to the appropriate index accounts. In yet another embodiment, SMS messages may be sent to a user who may then respond with via instant messenger. Another embodiment may employ a voice and/or telephone system whereby a telephone number stored in the investor's profile is dialed and the trade recommendations are read to the user (e.g., employing text-to-speech conversion) and responses to accept/decline the trade recommendations may be provided by the user through touch-tone responses and/or through voice-to-text conversion at prompts. In all such embodiments, the user may be either the investor or the financial advisor when the financial advisor is authorized to trade on behalf of the investor. Also, in all such trades, users may be required to provide authorization information (e.g., user names, passwords, keys, and/or the like). In one embodiment, a financial advisor and/or other person may call and obtain approval via telephone from the investor and/or financial advisor and then initiate the trade as a proxy if approved.

If the trade recommendations are approved 350, then the front end 135 provides an order confirmation to the trade component 150 so that the trade component will initiate the trade for the approved trade recommendations 360. Upon generating the trade order 360, the trade component 150 will provide confirmation of if the trade order was executed successfully or not 365. Conversely, if the user does not provide acceptance of the trade execution, and if a specified amount of time expires without a trade being accepted 370, then the asset index matcher 103 may 375 re-compare the asset portfolio and asset index anew 315. In one embodiment, the asset index tracker will make a specified number of attempts 350 to obtain approval for executing trade recommendations 360 in which it will continue to cycle 375 and re-evaluate its recommendations. Once that specified number of re-trys has been reached, then the asset index tracker will cease to cycle 375, 315, and instead will reschedule another comparison 380, 405 of FIG. 4 per a specified rebalancing setting.

Figure 4:
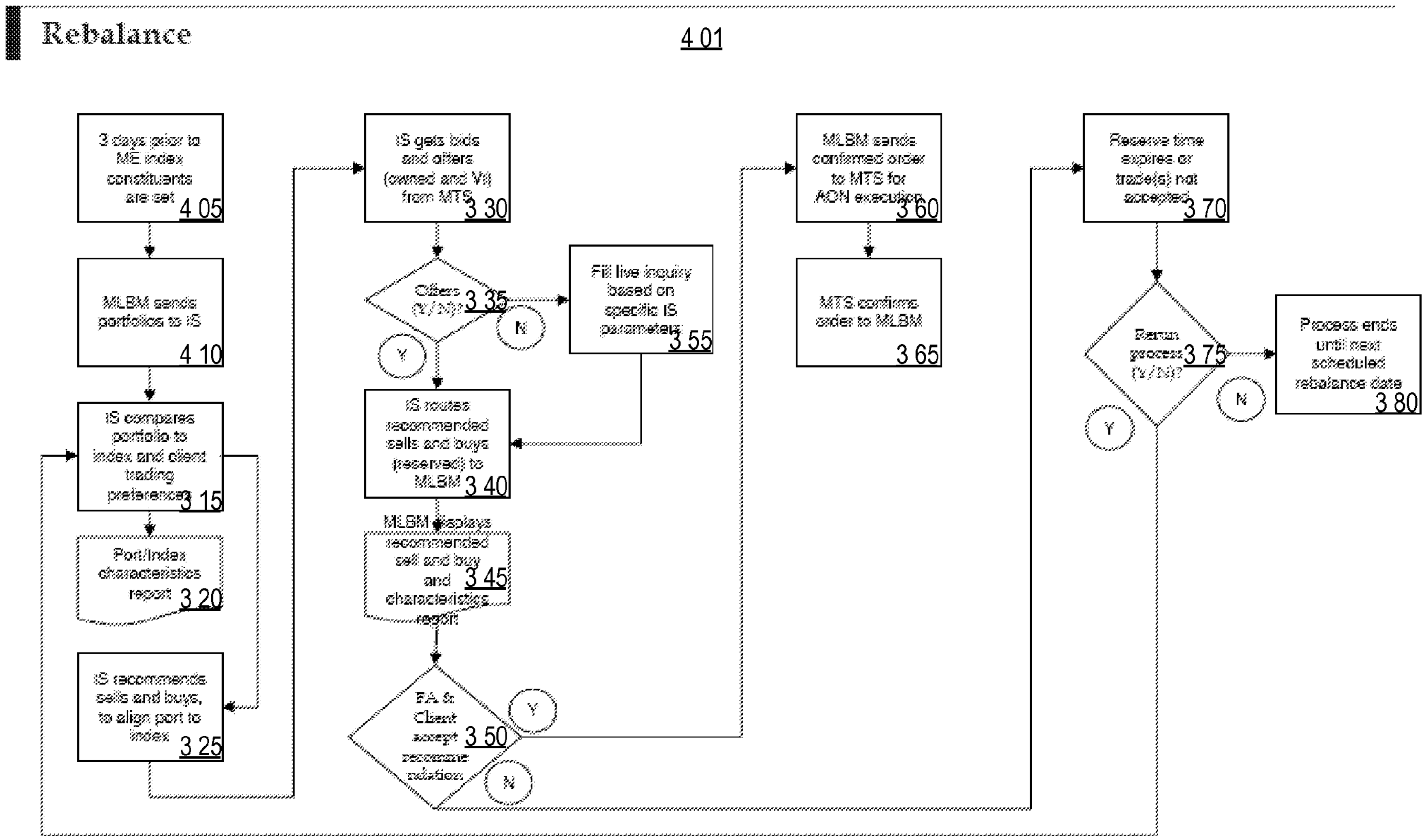
FIG. 4 of the present disclosure illustrates inventive aspects of a rebalance asset index tracker logic flow diagram.

FIG. 4 of the present disclosure illustrates inventive aspects of a rebalance asset index tracker logic flow diagram. FIG. 4 is largely identical to FIG. 3, above, save for there is no account setup 305 and registration 310. Instead, the asset index tracker will establish the composition of asset indices 405 a specified time prior to rebalancing 401. In one embodiment, the composition of the asset indices are established 3 days in advance. Upon obtaining asset indices values (e.g., which are stored in the asset index tracker database 105 and are provided to the asset index matcher 103), the front end 135 may obtain investor profiles from the asset index tracker database 110, 115 for use in comparing the investor asset profiles with the selected asset indices per the investor's profile preference settings 315 as has already been described in FIG. 3.

Figure 5:
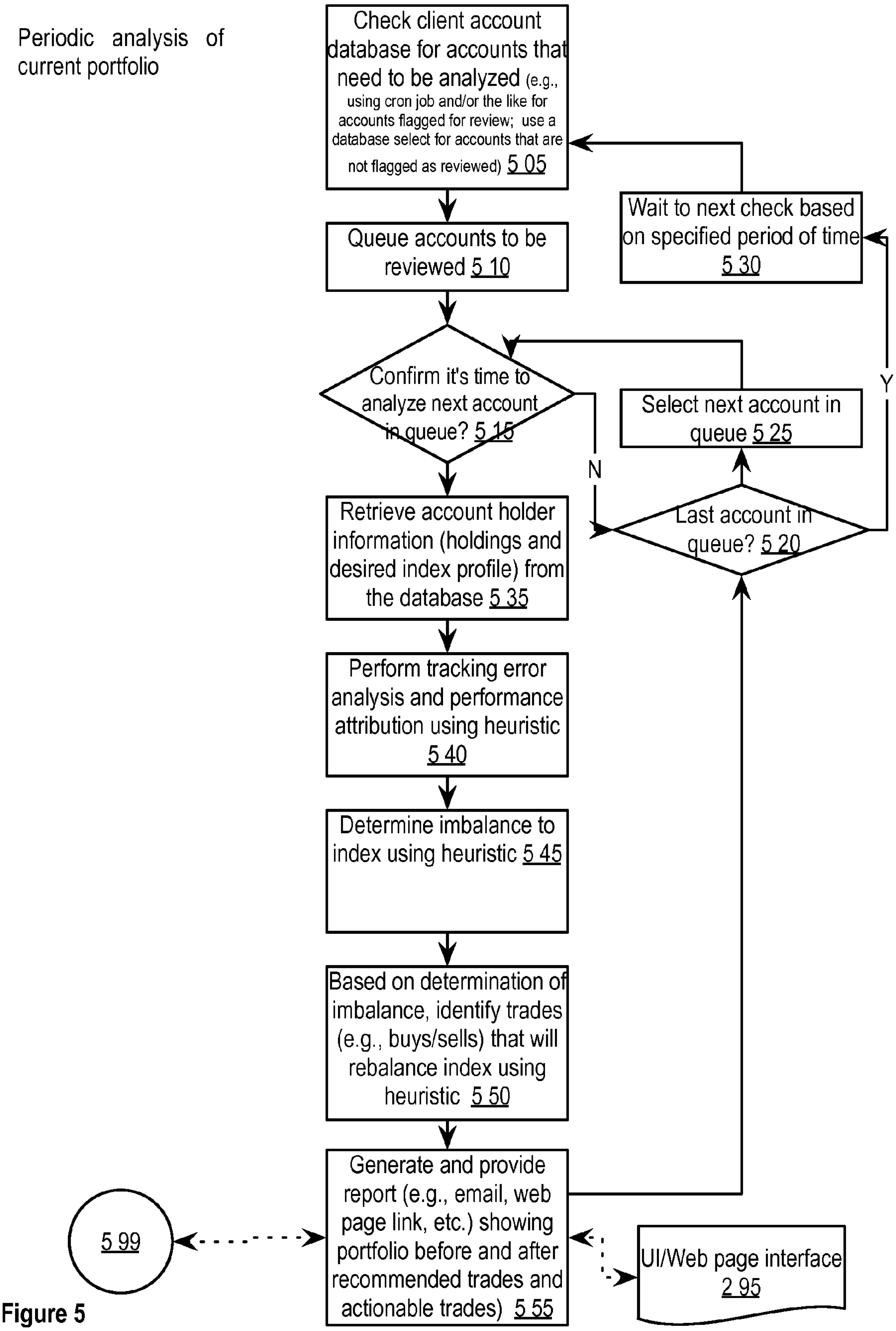
FIGS. 5 and 6 of the present disclosure illustrate alternative inventive aspects of a rebalance asset index tracker logic flow diagram.
Figure 6:
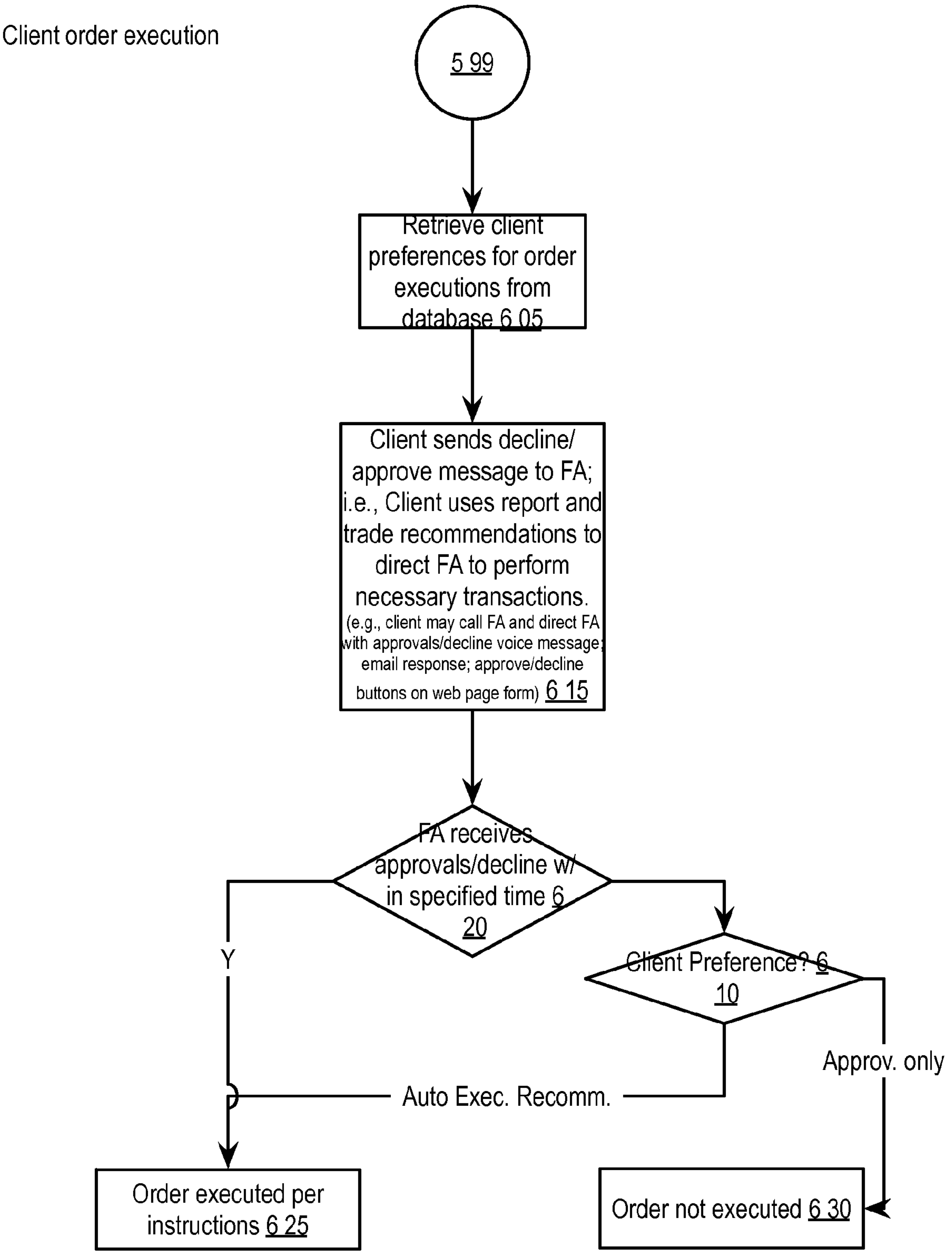

FIGS. 5 and 6 of the present disclosure illustrate alternative inventive aspects of a rebalance asset index tracker logic flow diagram. The asset index tracker may search an asset index tracker database for accounts require rebalancing 505. In one embodiment, a unix cron job and/or the like is employed to trigger period review for flagged accounts. An SQL query to select accounts that are not flagged as having been rebalanced per their rebalancing setting may be used to populate a queue of accounts that are to be reviewed 510 by the asset index tracker. If the next item in the review queue 510 is due to be rebalanced based on its rebalancing setting (e.g., which may be determined by evaluating the rebalancing setting relative to the time of the last rebalancing noted in the account) 515. If the asset index tracker determines that the account is not scheduled for review (e.g., the period specified by the rebalancing setting has been exceeded and the next period has not yet occurred), then the asset index tracker will determine if the instant account in the queue is the last account in the queue 520. If the instant account is the last account in the queue 520, then the asset index tracker will wait until the next time period specified for rebalancing the instant account comes to pass at which point the asset index tracker will rebalance the instant account 530 by cycling through the asset index tracker database 505. If it is not the last account in the queue 520, then the next account in the queue is selected to be the instant account for review 525 and confirmation of review timeliness recurs 515.

Upon confirming timeliness of review 515, the asset index tracker obtains the investor profile information from the asset index tracker database 110, 115, 535. The investor profile information (e.g., asset portfolio and selected asset index) are used to perform tracking error analysis and performance attribution 540. The alignment heuristic, which will be described in greater detail in FIG. 9, may be used to determine the imbalance of the asset portfolio relative to the selected asset index 545. Based on the determination of the imbalance 545, the asset index matcher will identify trades of assets that will rebalance the asset portfolio to track the selected asset index based on the investor's investment preferences and index matching parameters types and tolerances 550. Upon generating asset trade recommendations 550, the front end may generate and provide 555 a report 295 as has already been discussed in 350 of FIGS. 3 and 4, above. At this point the rebalancing and comparison of the asset portfolio to the asset index is complete and the asset index matcher may continue to cycle through the account queue 510 by determining if instant account is the last in the queue 520. Also, the generated trade recommendations 555 may also be used to seek investor/financial advisor approval for actual rebalancing of the asset portfolio 599.

FIG. 6 of the present disclosure continues to illustrate alternative inventive aspects of a rebalance asset index tracker logic flow diagram. Upon generating trade recommendations 555, 599, the asset index tracker may retrieve the investor's profile. The investor's profile may contain preferences for trade recommendation executions 605. For example, the investor may have a preference to have all trade recommendations executed automatically if they do not provide an approval within a specified amount of time. As such, in one embodiment, the user may send a decline or approval message to a financial advisor, whereby the investor uses the generated report of trade recommendations 555 to direct the financial advisor and/or the asset index tracker to perform the necessary asset trades 615 (e.g., the approvals may take on many forms as has already been discussed in 350 of FIG. 3). When the asset index tracker obtains the approval or decline message from the investor within a specified amount of time 620, then the asset trade order is executed (or not) as per the user's response 625. If no response is obtained from the user 620 within a specified time limit, then the investor's execution preferences are used 610. If the investor's trade preferences are to automatically execute trade recommendations, then the recommended trades are executed 625 with the trade component 150. Alternatively, if the investor's trade preferences are to execute trades only upon user approval, then the recommended asset trades are not executed 630.

FIG. 7 of the present disclosure illustrates inventive aspects of a user interface front end for the asset index tracker, as has already been discussed.

Figure 8:
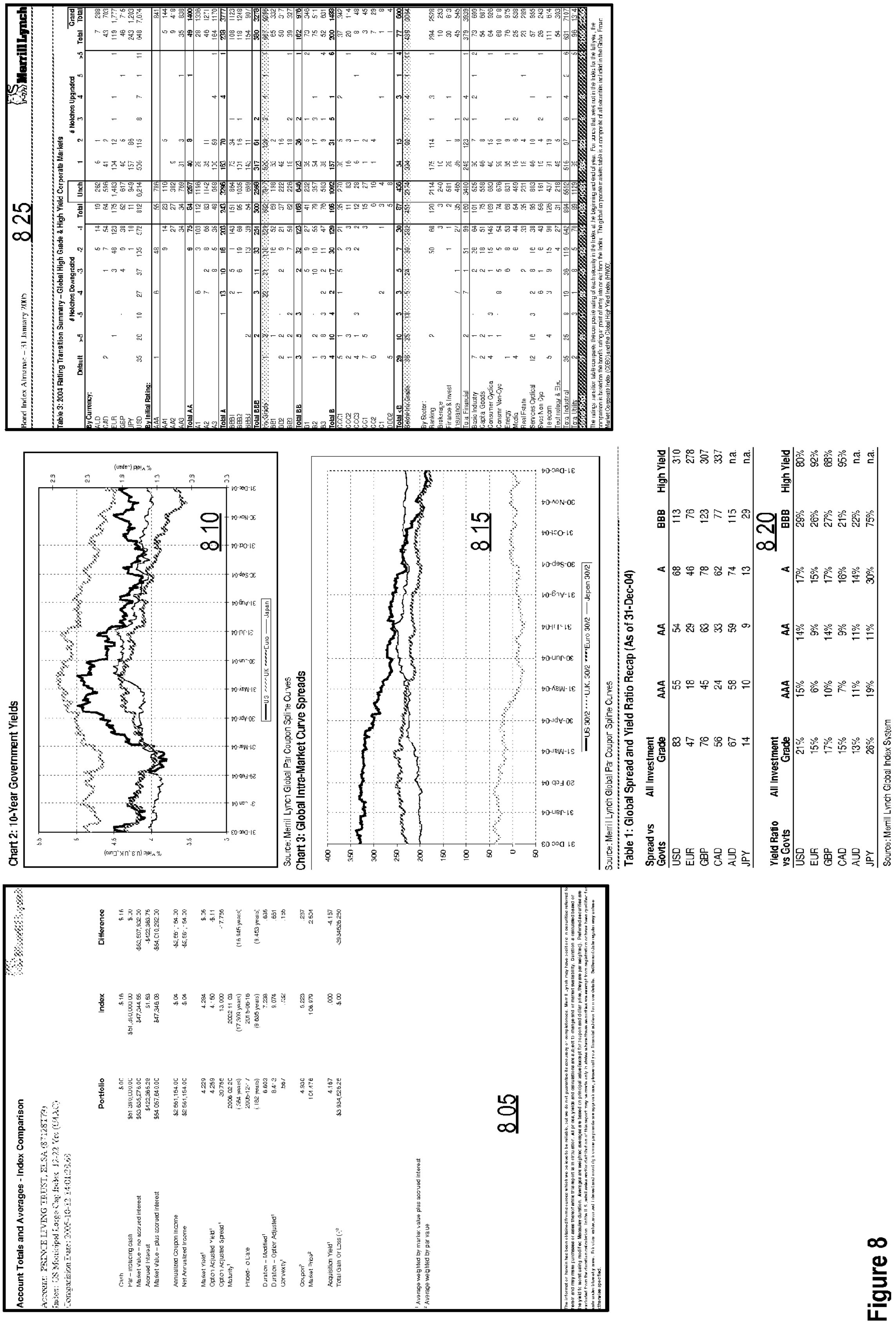
FIG. 8 of the present disclosure illustrates inventive aspects of reports and sources of data for the asset index tracker.

FIG. 8 of the present disclosure illustrates inventive aspects of reports and sources of data for the asset index tracker. In addition to comparison reports 805 already discussed, the figure shows various example sources of data for indices. For example, 10-year government yields 810 and global intra-market curve spread values may be obtained from Par Coupon Spline Curves (e.g., from Merrill Lynch). Global spread and yield ratios may be stored in a global index system (e.g., from Merrill Lynch). For example, rankings of global high grade and high yield corporate markets may be derived from securities from the Global Broad Market Corporate Index (GOBC) and Global High Yield Index (HWOO).

Asset Index Tracking Heuristic

Figure 9:
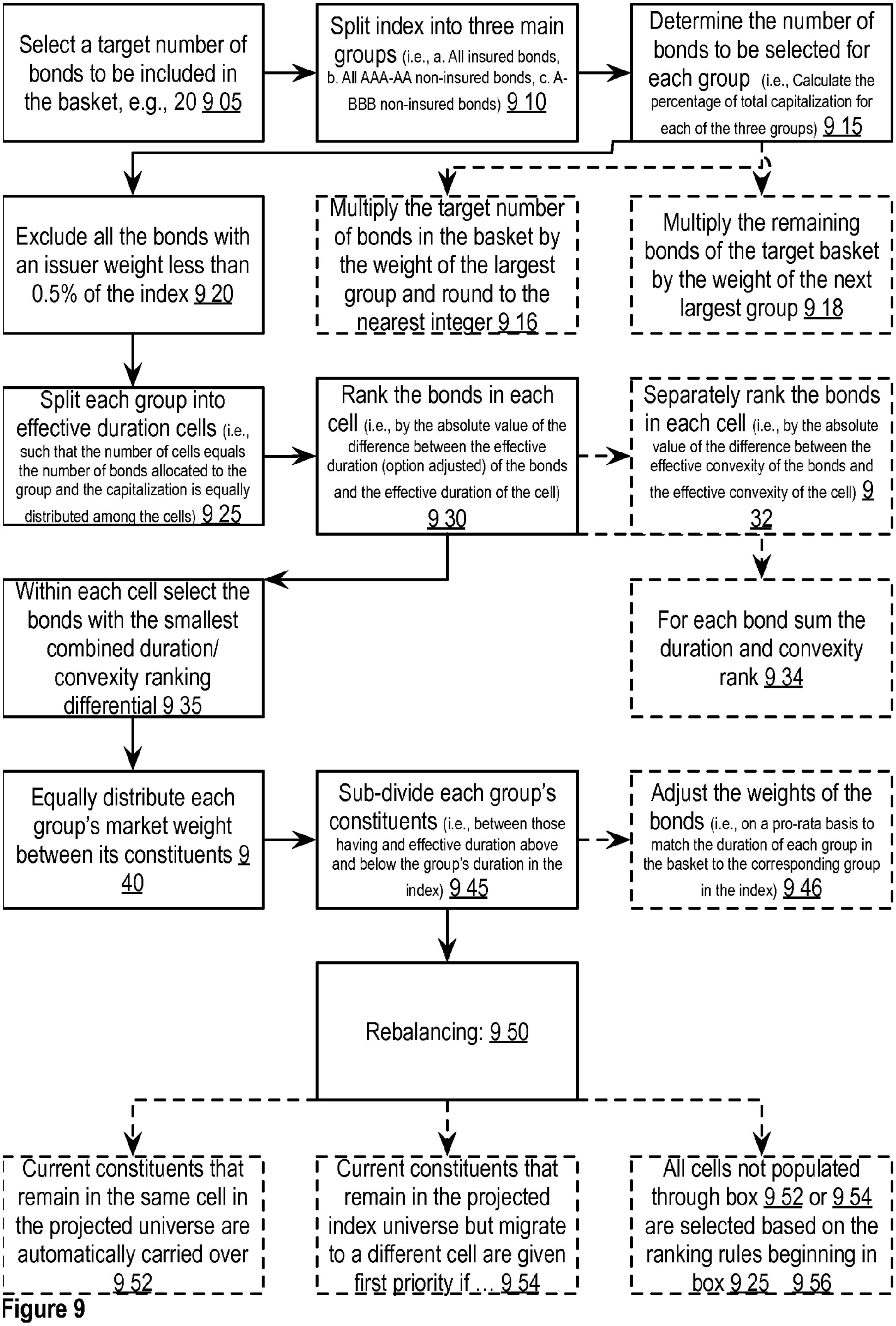
FIG. 9 of the present disclosure illustrates inventive aspects of an alignment heuristic for rebalancing an asset index and/or portfolio to an asset index in a logic flow diagram.

FIG. 9 of the present disclosure illustrates inventive aspects of an alignment heuristic for rebalancing an asset index and/or portfolio to an asset index in a logic flow diagram. The alignment heuristic may both 1) determine representative component assets from an asset index, as discussed in FIG. 8, and 2) match the asset portfolio to the asset index, as discussed in FIG. 9. For example, in some instances where an asset index is comprised of a large number of constituent components (e.g., 2,000 or more), it may be useful to prune down the number of components with the heuristic, which will yield a derived representative asset index, which may then be used as a target for investor's to track their portfolio assets. In this manner, the alignment heuristic shows duality in that it may also be used as an index-component heuristic.

Index-Component Heuristic

FIG. 9 of the present disclosure illustrates inventive aspects of an asset-index-component selection heuristic view of the alignment heuristic in a logic flow diagram. As has already been mentioned, this heuristic may be applied to indices and/or portfolios in a fashion similar to the discussion that follows.

In one embodiment, the index-component selection heuristic is used for assets that are bonds. In this embodiment, the component selection heuristic is used to select bonds in a fixed income index that will replicate the index. Here, the characteristics of identified bonds are used as parameters to: 1) compare an asset portfolio to determine its deviation from a given asset index and trades that must be made to match the index, and 2) identify offerings to purchase and holdings to sell. There are numerous types of characteristics that may describe the assets (e.g., indicatives, risk, tax, etc.). Indicative characteristics may include: call, put, sink schedules; continuously callable; coupon; coupon frequency; first coupon date; interest accrued date; issue date; last coupon date; maturity; original par amount; price; price of option; voluntary sink amounts; yield; and/or the like. Risk characteristics may include: convexity: duration; option adjusted spread (OAS); and/or the like. Tax characteristics may include: fixed rate, variable rate, associated gain caps, holding requirements, and/or the like.

The index-component heuristic may be described in ten parts, where the asset index matcher 103 employs the index-component heuristic to:

1. Select a target number of bonds to be included in the basket (e.g., 20) 905.

2. Then the selected index is split into a number of groups that are each composed of a number of different bonds 910. This split and composition may be based on the investor's investment profile. For example, risk averse institutional investors may choose assets that are more stable (yet provide lower yields) while young individual investors wanting higher yields may choose an asset-mix that enjoys higher yields (albeit with greater commensurate risk). In one embodiment, split and composition of the asset index comprises three main groups; each group having: a) all insured bonds; b) all AAA-AA non-insured bonds; and c) A-BBB non-insured bonds. In another embodiment, a less risk averse investor profile might provide an asset index comprising: a) AA non-insured bonds, b) A-BBB non-insured bonds, c) junk bonds. In yet another embodiment, synthetics may be used.

3. Determine the number of bonds to be selected for each group 915. In one embodiment, the asset index matcher calculates the percentage of total capitalization for each of the three groups. It may do so by a) multiplying the target number of bonds in the basket by the weight of the largest group and round to the nearest integer 916 and b) multiplying the remaining bonds of the target basket by the weight of the next largest group 918.

4. Exclude all the bonds with an issuer weight less than a specified some small percentage of the index. In one embodiment, the small percentage is 0.5% of the index 920.

5. Split each group into effective duration cells such that the number of cells equals the number of bonds allocated to the group and the capitalization is equally distributed among the cells 925. For example, see Appendix 7 to see a matrix of cell characteristics used to identify offerings that match the cell characteristics and thus the index.

6. Rank the bonds in each cell by the absolute value of the difference between the effective duration (e.g., option adjusted) of the bonds and the effective duration of the cell 930. The heuristic achieves the ranking by: a) separately ranking the bonds in each cell by the absolute value of the difference between the effective convexity of the bonds and the effective convexity of the cell 932; and b) for each bond, the heuristic sums the duration and convexity rank 934.

7. Select the bonds with the smallest combined duration/convexity ranking differential within each cell 935.

8. Equally distribute each group's market weight between its constituents 940.

9. Sub-divide each group's constituents between those having and effective duration above and below the group's duration in the index 945. The heuristic achieves the sub-division by adjusting the weights of the bonds on a pro-rata basis to match the duration of each group in the basket to the corresponding group in the index 946.

10. Rebalancing the index and/or portfolio 950. The heuristic achieves rebalancing whereby: a) current constituents that remain in the same cell in the projected universe are automatically carried over from the current month to the next month 952; b) current constituents that remain in the projected index universe but migrate to a different cell are given first priority if 954; c) all cells not populated through a) 952 or b) 954 are selected based on the ranking rules beginning in part 5 925.

Duration and Convexity

As the index-component heuristic employs effective duration, convexity (and optionally tax characteristics), an option adjusted pricing model is employed to calculate the effective duration and convexity. The option adjusted pricing model can be employed for global index calculations and to match calculations on Bloomberg when using the Log Normal method of computation. The pricing model employs 1. non-bond specific inputs, 2. bond specific inputs, and 3. results in several outputs.

1. The non-bond specific inputs for the model include: a) a yield curve (e.g., a AAA rated municipal curve, such as the Merrill Lynch US Muni AAA municipal yield curve that is published at the Merrill Lynch web portal (MLX)); and b) a volatility curve. Yield curves such as those that show up on OAS1 and OAS2 may be used. The volatility curve may be derived from MLX.

2. The bond specific inputs may include: issue date; interest accrued date; first coupon date; last coupon date; maturity date; issue price; coupon; coupon frequency; continuously callable; voluntary sink amounts; original par amount (e.g., not outstanding maturity amount); call, put and sink schedules; and/or the like 3. The outputs may include: a) an option adjusted spread, b) the price of option, c) the effective duration, d) the effective convexity, and/or the like. In one embodiment, the Option Adjusted Spread (OAS) is the flat spread over a AAA muni yield curve of an option (call/put/sink) embedded security with the spread attributable to the options removed. In one embodiment, the Price of Option is the dollar value attributable to the option embedded in the bond. In one embodiment where assuming a parallel slope in the yield curve for a bond with an embedded option, the calculations for effective duration and convexity are as follows:

The Effective Duration is the measure of the responsiveness of an option embedded bond's price that takes into account that the expected cash flow will change based on the changes in interest rates. In one embodiment, the Effective Duration may be calculated as follows:

$$EffectiveDuration = \frac{V_- - V_+}{2V_0(\Delta y)}$$

where:

$\Delta y$=the change in rate used to calculate new values $V_+$=the price if the yield is increased by $\Delta y$ $V_-$=the price if the yield is decreased by $\Delta y$ $V_0$=the initial price (e.g., per $100 of par value)

In one embodiment, the Effective Convexity of a Bond calculated may be calculated using Cash flows that change with yields as follows:

$$EffectiveConvexity = \frac{V_+ + V_- - 2V_0}{2V_0(\Delta y)^2}$$

As such, in one embodiment, the he Option Adjusted Yield can be computed using the Option Value ("Price of Option"). By using the option-adjusted spread, which is the constant spread that may be added to all one-year rates on the binomial interest rate tree that makes the theoretical value equal to the market price. In one example, this would make the OAS a constant spread adequate to every rate.

As such, in one embodiment, we may calculate the value of $V_+$ in the following five parts as follows:

1. Calculate the OAS for the issue;

2. Shift the on-the-run (or any) yield curve up by a small number of basis points (e.g., $\Delta y$), for example a muni yield curve may be used;

3. Construct a binomial interest rate tree based on the new yield curve that was mentioned above in part 2;

4. To each of the short rates in the binomial interest rate tree, add the OAS to obtain an "adjusted tree;"

5. Use the adjusted tree from part 4, above to determine the value of the security, which is $V_+$.

Similarly, the value of $V_-$ may be determined, except that in part 2, the yield curve is shifted down my a small number of basis points (e.g., $\Delta y$).

Municipal Index Selection Criteria

In one embodiment, a U.S. Municipal Master Index (UOAO) tracks the performance of the investment grade U.S. tax-exempt bond market. Qualifying bonds may have a remaining term to final maturity of at least one year, a fixed coupon schedule, and an investment grade composite rating (e.g., based on an average of Moody's, S&P and Fitch). Thus, pre-refunded bonds may be treated to their refunding date for purposes of determining qualification with respect to maturity requirements. Minimum size requirements vary based on the initial term to final stated maturity at time of issuance, e.g., as follows:

| Term to Final Stated Maturity at Time of Issuance | Minimum Size Requirements |
|---|---|
| <5 Years | $10 million |
| >5 Years and <10 Years | $15 million |
| >10 Years | $25 million |

As such, the UOAO index is re-balanced on the last calendar day of the month, based on information available up to and including the third business day before the last business day of the month. Issues that meet the qualifying criteria are included in the index for the following month. Issues that no longer meet the criteria during the course of the month remain in the index until the next month-end re-balancing at which point they are dropped from the index.

Synthetics

In one embodiment, asset portfolios may employ synthetic asset components to achieve parity with a selected asset index. In one embodiment to create a synthetic fair value government security, an excess return model may be used to compare the return of a bond to the return of a duration-matched basket of "fair value" synthetic Government securities derived from the Merrill Lynch Par Coupon Global Spline curves (the "fair value" Government curve for each respective currency in the global Index series). At the beginning of each month (i.e., the last calendar day of the preceding month), a series of synthetic securities are created for each point on the fair value Government curve in semi-annual increments (i.e., 0.5-year, 1-year, 1.5-year, 2-year, 2.5 year, 3-year . . . 30-year). Each security is priced at par, has a coupon and yield equal to the corresponding rate (in semi-annual terms) for the comparable maturity point on the fair value curve, and has an interest accrual date equal to the beginning-of-period date. A beginning-of-period duration is calculated (assuming cash settlement) for each synthetic security to be used as the basis for weighting the duration-matched baskets. Thereafter, current market prices for each security may be updated daily (based on the current day yield of each respective point on the fair value curve and an assumed cash settle) and a month-to-date total rate of return may be calculated as follows:

$$BTRR_n = \frac{(P_n + AI_n) - (P_0 + AI_0) + C\cdot\left(1 + \frac{r}{d}\right)^t}{P_0 + AI_0}$$

where:

BTRRn=individual bond month-to-date total return on day n

Pn=current day closing price

P0=prior month-end closing price

AIn=current day accrued interest

AI0=prior month-end accrued interest

C=coupon payments received during the period (including capital payments at current market value)

r=reinvestment rate (i.e., 1-month LIBID as of the prior month-end)

t=number of days between the receipt of the cash flow and day n d=day count convention for the reference LIBID instrument (i.e., 360 or 365)

Figure 10:
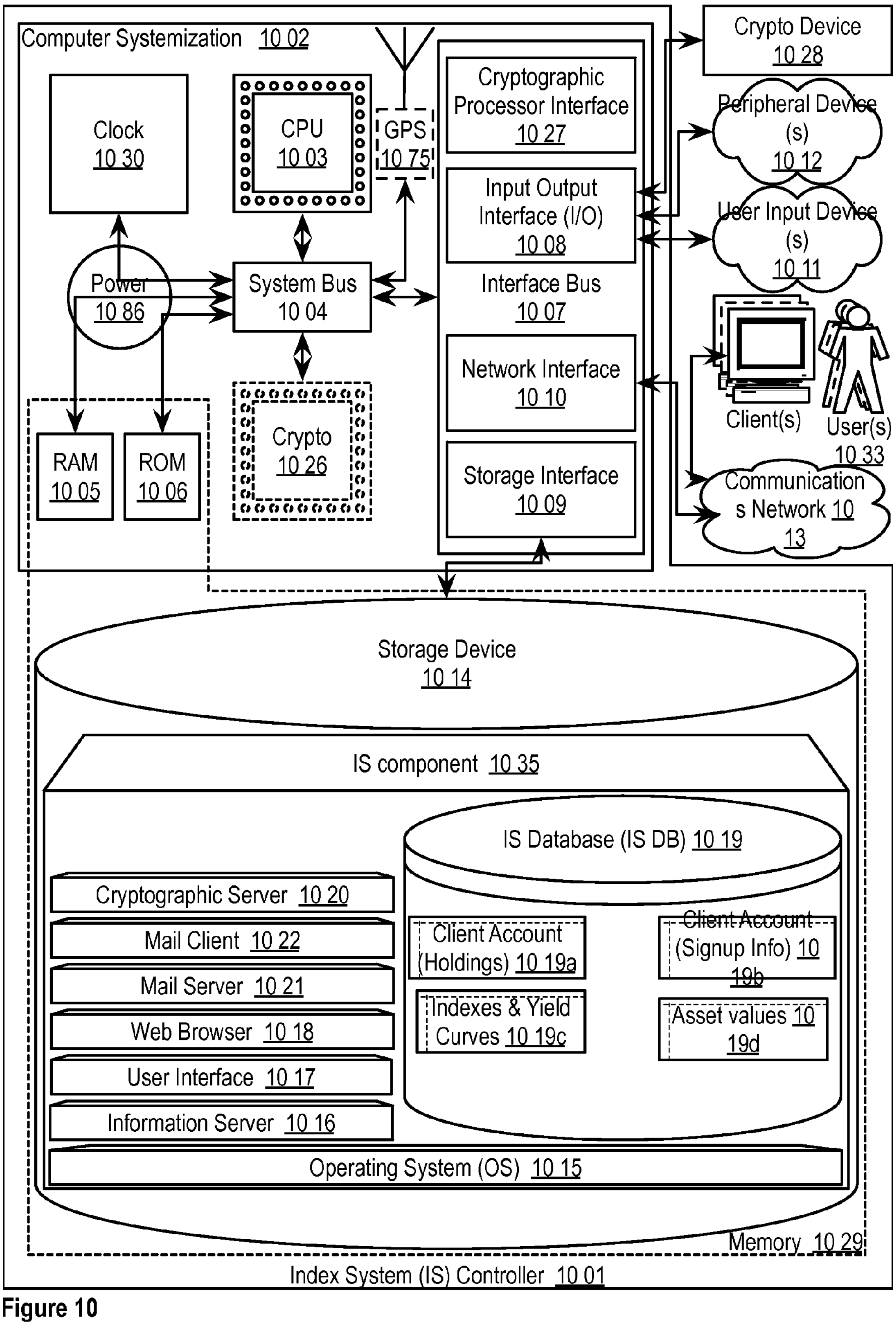
FIG. 10 of the present disclosure illustrates inventive aspects of a Asset index tracking controller in a block diagram.

The remaining term to maturity of the synthetic security declines over the course of the month. Therefore, it is necessary to interpolate the rates on the par coupon spline curve in order to derive the daily market yields for pricing the synthetic securities throughout the course of the month. In such an embodiment, weighting the duration-matched basket at the beginning of each month (i.e., the last calendar day of the preceding month), a duration-matched basket of fair value synthetic Government securities may then be created for each bond in the Index. The basket may be comprised of the two synthetic securities having the closest duration shorter and longer than that of the Index security. A beginning-of-period weight is calculated for the two synthetic securities such that the weighted average effective duration of the synthetic basket is equal to the effective duration (option-adjusted) of the Index security.

$$D_i=(W_{FVS}\cdot D_{FVS})+(W_{FVL}\cdot D_{FVL}) \text{ and}$$

$$W_{FVS}=\frac{(D_i-D_{FVL})}{(D_{FVS}-D_{FVL})}$$

$$W_{FVL}=1-W_{FVS}$$

where:

$D_i$=beginning-of-month effective duration of the actual Index bond $D_{FVS}$=beginning-of-month effective duration of the short duration fair value synthetic Government security $D_{FVL}$=beginning-of-month effective duration of the long duration fair value synthetic Government security $W_{FVS}$=basket weight of the short duration fair value synthetic Government security $W_{FVL}$=basket weight of the long duration fair value synthetic Government security Asset Index Tracking Controller FIG. 10 of the present disclosure illustrates inventive aspects of an asset index tracking controller 1001 in a block diagram. In this embodiment, the asset index tracking controller 1001 may serve to process, store, search, serve, identify, instruct, generate, match, and/or align asset portfolios to asset indices.

Typically, users, which may be people (e.g., investors, financial advisors, etc.) and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the Asset index tracking controller 1001 may be connected to and/or communicate with entities such as, but not limited to: one or more users from user input devices 1011; peripheral devices 1012; a cryptographic processor device 1028; and/or a communications network 1013.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Asset index tracking controller 1001 may be based on common computer systems that may comprise, but are not limited to, components such as: a computer systemization 1002 connected to memory 1029.

Computer Systemization

A computer systemization 1002 may comprise a clock 1030, central processing unit (CPU) 1003, a read only memory (ROM) 1006, a random access memory (RAM) 1005, and/or an interface bus 1007, and most frequently, although not necessarily, are all interconnected and/or communicating through a system bus 1004. Optionally, the computer systemization may be connected to an internal power source 1086. Optionally, a cryptographic processor 1026 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the Asset index tracking controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 1086 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the Asset index tracking thereby providing an electric current to all subsequent components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(ses) 1007 may accept, connect, and/or communicate to a number of interface adapters, conventionally although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1010 may accept, communicate, and/or connect to a communications network 1013. Through a communications network 113, the Asset index tracking controller is accessible through remote clients 1033*b* (e.g., computers with web browsers) by users 1033*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 1011 may be card readers, dongles, finger print readers, gloves, graphics tablets, joysticks, keyboards, mouse (mice), remote controls, retina readers, trackballs, trackpads, and/or the like.

Peripheral devices 1012 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Asset index tracking controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the Asset index tracking controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that the Asset index tracking controller and/or a computer systemization may employ various forms of memory 1029. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1029 will include ROM 1006, RAM 1005, and a storage device 1014. A storage device 1014 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 1029 may contain a collection of program and/or database modules and/or data such as, but not limited to: operating system module(s) 1015 (operating system); information server module(s) 1016 (information server); user interface module(s) 1017 (user interface); Web browser module(s) 1018 (Web browser); database(s) 1019; cryptographic server module(s) 1020 (cryptographic server); the asset index tracking module(s) 1035; and/or the like (i.e., collectively a module collection). These modules may be stored and accessed from the storage devices and/or from storage devices accessible through an interface bus. Although non-conventional software modules such as those in the module collection, typically, are stored in a local storage device 1014, they may also be loaded and/or stored in memory such as: peripheral devices, RAM, remote storage facilities through a communications network, ROM, various forms of memory, and/or the like.

Operating System

The operating system module 1015 is executable program code facilitating the operation of the Asset index tracking controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the asset index tracking controller to communicate with other entities through a communications network 1013. Various communication protocols may be used by the asset index tracking controller as a subcarrier transport mechanism for interaction, such as, but not limited to: multicast, TCP/IP, UDP, unicast, and/or the like.

Information Server

An information server module 1016 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the Asset index tracking controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the Asset index tracking database 1019, operating systems, other program modules, user interfaces, Web browsers, and/or the like.

Access to the asset index tracking database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Asset index tracking. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Asset index tracking as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 1017 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 1018 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the asset index tracking enabled nodes. The combined application may be nugatory on systems employing standard Web browsers.

Cryptographic Server

A cryptographic server module 1020 is stored program code that is executed by the CPU 1003, cryptographic processor 1026, cryptographic processor interface 1027, cryptographic processor device 1028, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Asset index tracking may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the asset index tracking module to engage in secure transactions if so desired. The cryptographic module facilitates the secure accessing of resources on the Asset index tracking and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Asset Index Tracking Database

The asset index tracking database module 1019 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the asset index tracking database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Asset index tracking database is implemented as a data-structure, the use of the Asset index tracking database 1019 may be integrated into another module such as the Asset index tracking module 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 1019 includes several tables 1019*a-e*. An investor account holdings table 1019*a* includes fields such as, but not limited to: investor ID, account IDs, transaction history, asset holdings, asset holding information, and/or the like. An investor account table 1019*b* includes fields such as, but not limited to: investor ID, investor name, investor address, investment preferences, rebalance interval, account IDs, profile settings, and/or the like. A indices and yield curves table 1019*c* includes fields such as, but not limited to: index ID, index value, index date, yield curve ID, yield curve value, an asset ID, and/or the like. An asset values table 1019*d* includes fields such as, but not limited to: an asset ID, an asset name, an asset bid value, an asset offer value, indicative asset characteristics, risk asset characteristics, tax characteristics, characteristics date, and/or the like.

In one embodiment, the asset index tracking database may interact with other database systems. For example, employing a distributed database system, queries and data access by the asset index tracking modules may treat the combination of the an asset index tracking and asset index tracker database as a single database entity. It should be noted that an asset index tracker version of the asset index tracking database might not have an employer account table and/or other tables specific to an asset index tracking database.

In one embodiment, user programs may contain various user interface primitives, which may serve to update the asset index tracking Also, various accounts may require custom database tables depending upon the environments and the types of clients the asset index tracking may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 1019*a-d*. The asset index tracking may be configured to keep track of various settings, inputs, and parameters via database controllers.

The asset index tracking database may communicate to and/or with other modules in a module collection, including itself, and/or facilities of the like. Most frequently, the Asset index tracking database communicates with the Asset index tracking module, other program modules, and/or the like. The database may contain, retain, and provide information regarding other nodes and data.

The Asset Index Tracking

The asset index tracking module 1035 is stored program code that is executed by the CPU. The asset index tracking affects accessing, obtaining and the provision of information, services, transactions, and/or the like across various communications networks.

The asset index tracking module enables an asset index tracker to align asset portfolios to selected asset indices.

The asset index tracking module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the Asset index tracking server employs a cryptographic server to encrypt and decrypt communications. The asset index tracking module may communicate to and/or with other modules in a module collection, including itself, and/or facilities of the like. Most frequently, the asset index tracking module communicates with the Asset index tracking database, operating systems, other program modules, and/or the like. The asset index tracking may contain, communicate, generate, obtain, and/or provide program module, system, user, and/or data communications, requests, and/or responses.

Distributed the Asset Index Tracking

The structure and/or operation of any of the asset index tracking node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the asset index tracking controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

1. A computer-implemented method to adjust a portfolio, comprising:

selecting an index of assets;

selecting a portfolio of asset holdings;

selecting component assets within the index that adjust to match the index, wherein the selection of component assets is based on indicative and risk characteristics, wherein the selection of component assets is based on an asset portfolio component alignment heuristic that employs duration and convexity to select assets for the portfolio, wherein duration is equal to $$\frac{V_- - V_+}{2V_0(\Delta y)},$$

wherein convexity is equal to $$\frac{V_+ + V_- - 2V_0}{2V_0(\Delta y)^2},$$

where:

$\Delta y$ is a change in rate used to calculate new values, $V_+$ is a price if the yield is increased by $\Delta y$, $V_-$ is a price if the yield is decreased by $\Delta y$, $V_0$ is an initial price, wherein the asset portfolio component alignment heuristic, includes:

a) targeting a number of assets to be included in a basket;

b) splitting the index into a number of groups composed of different assets;

c) determining a number of assets that will comprise each group;

d) excluding all assets with an issuer weight less than some weight threshold setting;

e) splitting each group into duration cells;

f) ranking the assets in each cell, wherein the ranking is by an absolute value of the difference between the duration of the assets and the duration of each cell;

g) selecting the assets with a smallest combined duration and convexity ranking differential within each cell;

h) distributing each group's market weight between its constituents;

i) sub-dividing each group's constituents; and j) rebalancing; and providing a recommendation to change a composition of the asset holdings so that the asset holdings will match the index;

adjusting the portfolio of asset holdings to match the index by effecting a trade of assets per the recommendation, wherein the effectuation of the trade occurs if a user approves the transaction, wherein the adjustment of the portfolio of asset holdings to the index recurs with a specified frequency, and wherein the adjustment of the portfolio of asset holdings matches the index to a degree specified by tolerances for index adjustment parameters.

2. A computer-implemented method to adjust a portfolio, comprising:

selecting an index of assets;

selecting a portfolio of asset holdings;

adjusting the portfolio of asset holdings to match the index.

3. The method of claim 2, further, comprising:

selecting component assets that adjust to match the index.

4. The method of claim 3, wherein the selection of component assets that replicate the index is made by selecting component assets within the index.

5. The method of claim 3, wherein the selection of component assets that replicate the index is made by selecting component assets within the portfolio.

6. The method of claim 3, wherein the component assets are synthetics.

7. The method of claim 3, wherein the selection of component assets is based on an asset portfolio component alignment heuristic that employs duration and convexity to select assets for the portfolio.

8. The method of claim 7, wherein duration is equal to $$\frac{V_- - V_+}{2V_0(\Delta y)},$$

where:

$\Delta y$ is a change in rate used to calculate new values;

$V_+$ is a price if the yield is increased by $\Delta y$;

$V_-$ is a price if the yield is decreased by $\Delta y$;

$V_0$ is an initial price.

9. The method of claim 7, wherein convexity is equal to $$\frac{V_+ + V_- - 2V_0}{2V_0(\Delta y)^2},$$

where:

$\Delta y$ is a change in rate used to calculate new values;

$V_+$ is a price if the yield is increased by $\Delta y$;

$V_-$ is a price if the yield is decreased by $\Delta y$;

$V_0$ is an initial price.

10. The method of claim 3, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each cell;

g) selects the assets with a smallest combined duration and convexity ranking differential within each cell;

h) distributes each group's market weight between its constituents;

i) sub-divides each group's constituents; and j) rebalances.

11. The method of claim 10, wherein that weight threshold is 0.5%.

12. The method of claim 10, wherein the ranking is by an absolute value of the difference between the duration of the assets and the duration of each cell.

13. The method of claim 3, wherein the selection of component assets is based on indicative, risk and tax characteristics.

14. The method of claim 13, wherein the indicative characteristics may include: coupon, maturity, price, yield.

15. The method of claim 13, wherein the risk characteristics may include: duration, convexity, option adjusted spreads.

that may include: coupon, maturity, price, yield, duration, convexity,

16. The method of claim 2, further, comprising:

providing a recommendation to change a composition of the asset holdings so that the asset holdings will match the index.

17. The method of claim 16, further, comprising:

effecting a trade of assets per the recommendation.

18. The method of claim 17, wherein the effectuation of the trade occurs if a user approves the transaction.

19. The method of claim 18, wherein the user is an investor.

20. The method of claim 18, wherein the user is a financial advisor.

21. The method of claim 17, wherein the effectuation of the trade occurs based on a setting specification.

22. The method of claim 21, wherein the setting specification is set to automatically execute trades if there is no user response to the recommendation.

23. The method of claim 21, wherein the setting specification is set to not execute trades if there is no user response to the recommendation.

24. The method of claim 2, wherein the adjustment of the portfolio of asset holdings to the index is based on an asset portfolio component alignment heuristic that employs duration and convexity to select assets for the portfolio.

25. The method of claim 24, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each;

g) selects the assets with a smallest combined duration and convexity ranking differential within each cell;

h) distributes each group's market weight between its constituents;

i) sub-divides each group's constituents; and j) rebalances.

26. The method of claim 25, wherein that weight threshold is 0.5%.

27. The method of claim 25, wherein the ranking is by an absolute value of the difference between the duration of the assets and the duration of each cell.

28. The method of claim 2, wherein the assets may include bonds, currencies, stocks, mutual funds, synthetics.

29. The method of claim 2, wherein the adjustment of the portfolio of asset holdings to the index recurs with a specified frequency.

30. The method of claim 29, wherein the specified frequency includes: continuous updates, a specified number of seconds, a specified number of minutes, a specified number of hours, a specified number of days, a specified number of weeks, a specified number of months, a specified number of quarters, a specified number of years.

31. The method of claim 29, wherein the specified frequency is based on a triggering event.

32. The method of claim 31, wherein the triggering event may be: a user login, an update to an economic indicator, a specified function.

33. The method of claim 2 wherein the adjustment of the portfolio of asset holdings matches the index to a degree specified by tolerances for index adjustment parameters.

34. The method of claim 33, wherein the index adjustment parameters may include maturity, duration, state.

35. The method of claim 2, wherein the adjustment of the portfolio of asset holdings to the index is constrained by an investor's profile.

36. The method of claim 35, wherein the investor's profile includes a measure of the investor's tolerance of risk and earning goals.

37. In memory, an interaction interface, comprising:

instruction signals, wherein the interaction interface is responsive to user and system event signals and wherein the instruction signals are issueable by a processor to invoke:

an interface element to specify an asset index;

an interface element to specify an index matching parameter type for a selected asset index;

an interface element to specify a tolerance value for the index matching parameter type.

38. The memory of claim 37, further, comprising:

an interface element to specify a frequency of asset portfolio rebalancing.

39. The memory of claim 37, further, comprising:

an interface element to specify which asset holdings are to comprise an asset portfolio for an asset index.

40. A system to adjust a portfolio, comprising:

means to select an index of assets;

means to select a portfolio of asset holdings;

means to select component assets within the index that adjust to match the index, wherein the selection of component assets is based on indicative and risk characteristics, wherein the selection of component assets is based on an asset portfolio component alignment heuristic that employs duration and convexity to select assets for the portfolio, wherein duration is equal to $$\frac{V_- - V_+}{2V_0(\Delta y)},$$

wherein convexity is equal to $$\frac{V_+ + V_- - 2V_0}{2V_0(\Delta y)^2},$$

where:

$\Delta y$ is a change in rate used to calculate new values, $V_+$ is a price if the yield is increased by $\Delta y$, $V_-$ is a price if the yield is decreased by $\Delta y$, $V_0$ is an initial price, wherein the asset portfolio component alignment heuristic, includes:

a) means to target a number of assets to be included in a basket;

b) means to split the index into a number of groups composed of different assets;

c) means to determine a number of assets that will comprise each group;

d) means to exclude all assets with an issuer weight less than some weight threshold setting;

e) means to split each group into duration cells;

f) means to rank the assets in each cell, wherein the rank is by an absolute value of the difference between the duration of the assets and the duration of each cell;

g) means to select the assets with a smallest combined duration and convexity rank differential within each cell;

h) means to distribute each group's market weight between its constituents;

i) means to sub-divide each group's constituents; and j) means to rebalance; and means to provide a recommendation to change a composition of the asset holdings so that the asset holdings will match the index;

means to adjust the portfolio of asset holdings to match the index by effecting a trade of assets per the recommendation, wherein the effectuation of the trade occurs if a user approves the transaction, wherein the adjustment of the portfolio of asset holdings to the index recurs with a specified frequency, and wherein the adjustment of the portfolio of asset holdings matches the index to a degree specified by tolerances for index adjustment parameters.

41. A system to adjust a portfolio, comprising:

means to select an index of assets;

means to select a portfolio of asset holdings;

means to adjust the portfolio of asset holdings to match the index.

42. The system of claim 41, further, comprising:

means to select component assets that adjust to match the index.

43. The system of claim 42, wherein the selection of component assets that replicate the index is made by selection of component assets within the index.

44. The system of claim 42, wherein the selection of component assets that replicate the index is made by selection of component assets within the portfolio.

45. The system of claim 42, wherein the component assets are synthetics.

46. The system of claim 42, wherein the selection of component assets is based on an asset portfolio component alignment heuristic that employs duration and convexity to select assets for the portfolio.

47. The system of claim 46, wherein duration is equal to $$\frac{V_- - V_+}{2V_0(\Delta y)},$$

where:

$\Delta y$ is a change in rate used to calculate new values;

$V_+$ is a price if the yield is increased by $\Delta y$;

$V_-$ is a price if the yield is decreased by $\Delta y$;

$V_0$ is an initial price.

48. The system of claim 46, wherein convexity is equal to $$\frac{V_+ + V_- - 2V_0}{2V_0(\Delta y)^2},$$

where:

$\Delta y$ is a change in rate used to calculate new values;

$V_+$ is a price if the yield is increased by $\Delta y$;

$V_-$ is a price if the yield is decreased by $\Delta y$;

$V_0$ is an initial price.

49. The system of claim 42, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each cell;

g) selects the assets with a smallest combined duration and convexity rank differential within each cell;

h) distributes each group's market weight between its constituents;

i) sub-divides each group's constituents; and j) rebalances.

50. The system of claim 49, wherein that weight threshold is 0.5%.

51. The system of claim 49, wherein the rank is by an absolute value of the difference between the duration of the assets and the duration of each cell.

52. The system of claim 42, wherein the selection of component assets is based on indicative, risk and tax characteristics.

53. The system of claim 52, wherein the indicative characteristics may include:

coupon, maturity, price, yield.

54. The system of claim 52, wherein the risk characteristics may include: duration, convexity, option adjusted spreads.

that may include: coupon, maturity, price, yield, duration, convexity,

55. The system of claim 41, further, comprising:

means to provide a recommendation to change a composition of the asset holdings so that the asset holdings will match the index.

56. The system of claim 55, further, comprising:

effecting a trade of assets per the recommendation.

57. The system of claim 56, wherein the effectuation of the trade occurs if a user approves the transaction.

58. The system of claim 57, wherein the user is an investor.

59. The system of claim 57, wherein the user is a financial advisor.

60. The system of claim 56, wherein the effectuation of the trade occurs based on a setting specification.

61. The system of claim 60, wherein the setting specification is set to automatically execute trades if there is no user response to the recommendation.

62. The system of claim 60, wherein the setting specification is set to not execute trades if there is no user response to the recommendation.

63. The system of claim 41, wherein the adjustment of the portfolio of asset holdings to the index is based on an asset portfolio component alignment heuristic that employs duration and convexity to select assets for the portfolio.

64. The system of claim 63, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each;

g) selects the assets with a smallest combined duration and convexity rank differential within each cell;

h) distributes each group's market weight between its constituents;

i) sub-divides each group's constituents; and j) rebalances.

65. The system of claim 64, wherein that weight threshold is 0.5%.

66. The system of claim 64, wherein the rank is by an absolute value of the difference between the duration of the assets and the duration of each cell.

67. The system of claim 41, wherein the assets may include bonds, currencies, stocks, mutual funds, synthetics.

68. The system of claim 41, wherein the adjustment of the portfolio of asset holdings to the index recurs with a specified frequency.

69. The system of claim 68, wherein the specified frequency includes: continuous updates, a specified number of seconds, a specified number of minutes, a specified number of hours, a specified number of days, a specified number of weeks, a specified number of months, a specified number of quarters, a specified number of years.

70. The system of claim 68, wherein the specified frequency is based on a triggering event.

71. The system of claim 70, wherein the triggering event may be: a user login, an update to an economic indicator, a specified function.

72. The system of claim 41 wherein the adjustment of the portfolio of asset holdings matches the index to a degree specified by tolerances for index adjustment parameters.

73. The system of claim 72, wherein the index adjustment parameters may include maturity, duration, state.

74. The system of claim 41, wherein the adjustment of the portfolio of asset holdings to the index is constrained by an investor's profile.

75. The system of claim 74, wherein the investor's profile includes a measure of the investor's tolerance of risk and earning goals.

76. A medium readable by a processor to adjust a portfolio, comprising:

instruction signals in the processor readable medium, wherein the instruction signals are issuable by the processor to:

select an index of assets;

select a portfolio of asset holdings;

select component assets within the index that adjust to match the index, wherein the selection of component assets is based on indicative and risk characteristics, wherein the selection of component assets is based on an asset portfolio component alignment heuristic that employs duration and convexity to select assets for the portfolio, wherein duration is equal to $$\frac{V_- - V_+}{2V_0(\Delta y)},$$

wherein convexity is equal to $$\frac{V_+ + V_- - 2V_0}{2V_0(\Delta y)^2},$$

where:

$\Delta y$ is a change in rate used to calculate new values, $V_+$ is a price if the yield is increased by $\Delta y$, $V_-$ is a price if the yield is decreased by $\Delta y$, $V_0$ is an initial price, wherein the asset portfolio component alignment heuristic, includes:

a) target a number of assets to be included in a basket;

b) split the index into a number of groups composed of different assets;

c) determine a number of assets that will comprise each group;

d) exclude all assets with an issuer weight less than some weight threshold setting;

e) split each group into duration cells;

f) rank the assets in each cell, wherein the rank is by an absolute value of the difference between the duration of the assets and the duration of each cell;

g) select the assets with a smallest combined duration and convexity rank differential within each cell;

h) distribute each group's market weight between its constituents;

i) sub-divide each group's constituents; and j) rebalance; and provide a recommendation to change a composition of the asset holdings so that the asset holdings will match the index;

adjust the portfolio of asset holdings to match the index by effecting a trade of assets per the recommendation, wherein the effectuation of the trade occurs if a user approves the transaction, wherein the adjustment of the portfolio of asset holdings to the index recurs with a specified frequency, and wherein the adjustment of the portfolio of asset holdings matches the index to a degree specified by tolerances for index adjustment parameters.

77. A medium readable by a processor to adjust a portfolio, comprising:

instruction signals in the processor readable medium, wherein the instruction signals are issuable by the processor to:

select an index of assets;

select a portfolio of asset holdings;

adjust the portfolio of asset holdings to match the index.

78. The medium of claim 77, further, comprising:

select component assets that adjust to match the index.

79. The medium of claim 78, wherein the selection of component assets that replicate the index is made by selection of component assets within the index.

80. The medium of claim 78, wherein the selection of component assets that replicate the index is made by selection of component assets within the portfolio.

81. The medium of claim 78, wherein the component assets are synthetics.

82. The medium of claim 78, wherein the selection of component assets is based on an asset portfolio component alignment heuristic that employs duration and convexity to select assets for the portfolio.

83. The medium of claim 82, wherein duration is equal to $$\frac{V_- - V_+}{2V_0(\Delta y)},$$

where:

Δy is a change in rate used to calculate new values;

$V_+$ is a price if the yield is increased by Δy;

$V_-$ is a price if the yield is decreased by Δy;

$V_0$ is an initial price.

84. The medium of claim 82, wherein convexity is equal to $$\frac{V_+ + V_- - 2V_0}{2V_0(\Delta y)^2},$$

where:

Δy is a change in rate used to calculate new values;

$V_+$ is a price if the yield is increased by Δy;

$V_-$ is a price if the yield is decreased by Δy;

$V_0$ is an initial price.

85. The medium of claim 78, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each cell;

g) selects the assets with a smallest combined duration and convexity rank differential within each cell;

h) distributes each group's market weight between its constituents;

i) sub-divides each group's constituents; and j) rebalances.

86. The medium of claim 85, wherein that weight threshold is 0.5%.

87. The medium of claim 85, wherein the rank is by an absolute value of the difference between the duration of the assets and the duration of each cell.

88. The medium of claim 78, wherein the selection of component assets is based on indicative, risk and tax characteristics.

89. The medium of claim 88, wherein the indicative characteristics may include: coupon, maturity, price, yield.

90. The medium of claim 88, wherein the risk characteristics may include: duration, convexity, option adjusted spreads.

that may include: coupon, maturity, price, yield, duration, convexity,

91. The medium of claim 77, further, comprising:

provide a recommendation to change a composition of the asset holdings so that the asset holdings will match the index.

92. The medium of claim 91, further, comprising:

effecting a trade of assets per the recommendation.

93. The medium of claim 92, wherein the effectuation of the trade occurs if a user approves the transaction.

94. The medium of claim 93, wherein the user is an investor.

95. The medium of claim 93, wherein the user is a financial advisor.

96. The medium of claim 92, wherein the effectuation of the trade occurs based on a setting specification.

97. The medium of claim 96, wherein the setting specification is set to automatically execute trades if there is no user response to the recommendation.

98. The medium of claim 96, wherein the setting specification is set to not execute trades if there is no user response to the recommendation.

99. The medium of claim 77, wherein the adjustment of the portfolio of asset holdings to the index is based on an asset portfolio component alignment heuristic that employs duration and convexity to select assets for the portfolio.

100. The medium of claim 99, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each;

g) selects the assets with a smallest combined duration and convexity rank differential within each cell;

h) distributes each group's market weight between its constituents;

i) sub-divides each group's constituents; and j) rebalances.

101. The medium of claim 100, wherein that weight threshold is 0.5%.

102. The medium of claim 100, wherein the rank is by an absolute value of the difference between the duration of the assets and the duration of each cell.

103. The medium of claim 77, wherein the assets may include bonds, currencies, stocks, mutual funds, synthetics.

104. The medium of claim 77, wherein the adjustment of the portfolio of asset holdings to the index recurs with a specified frequency.

105. The medium of claim 104, wherein the specified frequency includes: continuous updates, a specified number of seconds, a specified number of minutes, a specified number of hours, a specified number of days, a specified number of weeks, a specified number of months, a specified number of quarters, a specified number of years.

106. The medium of claim 104, wherein the specified frequency is based on a triggering event.

107. The medium of claim 106, wherein the triggering event may be: a user login, an update to an economic indicator, a specified function.

108. The medium of claim 77 wherein the adjustment of the portfolio of asset holdings matches the index to a degree specified by tolerances for index adjustment parameters.

109. The medium of claim 108, wherein the index adjustment parameters may include maturity, duration, state.

110. The medium of claim 77, wherein the adjustment of the portfolio of asset holdings to the index is constrained by an investor's profile.

111. The medium of claim 110, wherein the investor's profile includes a measure of the investor's tolerance of risk and earning goals.

112. An apparatus to adjust a portfolio, comprising:

a memory;

a processor disposed in communication with said memory, and configured to issue a plurality of processing instructions stored in the memory, wherein the instructions issue signals to:

select an index of assets;

select a portfolio of asset holdings;

select component assets within the index that adjust to match the index, wherein the selection of component assets is based on indicative and risk characteristics, wherein the selection of component assets is based on an asset portfolio component alignment heuristic that employs duration and convexity to select assets for the portfolio, wherein duration is equal to $$\frac{V_- - V_+}{2V_0(\Delta y)},$$

wherein convexity is equal to $$\frac{V_+ + V_- - 2V_0}{2V_0(\Delta y)^2},$$

where:

$\Delta y$ is a change in rate used to calculate new values, $V_+$ is a price if the yield is increased by $\Delta y$, $V_-$ is a price if the yield is decreased by $\Delta y$, $V_0$ is an initial price, wherein the asset portfolio component alignment heuristic, includes:

a) target a number of assets to be included in a basket;

b) split the index into a number of groups composed of different assets;

c) determine a number of assets that will comprise each group;

d) exclude all assets with an issuer weight less than some weight threshold setting;

e) split each group into duration cells;

f) rank the assets in each cell, wherein the rank is by an absolute value of the difference between the duration of the assets and the duration of each cell;

g) select the assets with a smallest combined duration and convexity rank differential within each cell;

h) distribute each group's market weight between its constituents;

i) sub-divide each group's constituents; and j) rebalance; and provide a recommendation to change a composition of the asset holdings so that the asset holdings will match the index;

adjust the portfolio of asset holdings to match the index by effecting a trade of assets per the recommendation, wherein the effectuation of the trade occurs if a user approves the transaction, wherein the adjustment of the portfolio of asset holdings to the index recurs with a specified frequency, and wherein the adjustment of the portfolio of asset holdings matches the index to a degree specified by tolerances for index adjustment parameters.

113. An apparatus to adjust a portfolio, comprising:

a memory;

a processor disposed in communication with said memory, and configured to issue a plurality of processing instructions stored in the memory, wherein the instructions issue signals to:

select an index of assets;

select a portfolio of asset holdings;

adjust the portfolio of asset holdings to match the index.

114. The apparatus of claim 113, further, comprising:

select component assets that adjust to match the index.

115. The apparatus of claim 114, wherein the selection of component assets that replicate the index is made by selection of component assets within the index.

116. The apparatus of claim 114, wherein the selection of component assets that replicate the index is made by selection of component assets within the portfolio.

117. The apparatus of claim 114, wherein the component assets are synthetics.

118. The apparatus of claim 114, wherein the selection of component assets is based on an asset portfolio component alignment heuristic that employs duration and convexity to select assets for the portfolio.

119. The apparatus of claim 118, wherein duration is equal to $$\frac{V_- - V_+}{2V_0(\Delta y)},$$

where:

Δy is a change in rate used to calculate new values;

$V_+$ is a price if the yield is increased by Δy;

$V_-$ is a price if the yield is decreased by Δy;

$V_0$ is an initial price.

120. The apparatus of claim 118, wherein convexity is equal to $$\frac{V_+ + V_- - 2V_0}{2V_0(\Delta y)^2},$$

where:

Δy is a change in rate used to calculate new values;

$V_+$ is a price if the yield is increased by Δy;

$V_-$ is a price if the yield is decreased by Δy;

$V_0$ is an initial price.

121. The apparatus of claim 114, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each cell;

g) selects the assets with a smallest combined duration and convexity rank differential within each cell;

h) distributes each group's market weight between its constituents;

i) sub-divides each group's constituents; and j) rebalances.

122. The apparatus of claim 121, wherein that weight threshold is 0.5%.

123. The apparatus of claim 121, wherein the rank is by an absolute value of the difference between the duration of the assets and the duration of each cell.

124. The apparatus of claim 114, wherein the selection of component assets is based on indicative, risk and tax characteristics.

125. The apparatus of claim 124, wherein the indicative characteristics may include: coupon, maturity, price, yield.

126. The apparatus of claim 124, wherein the risk characteristics may include:

duration, convexity, option adjusted spreads.

that may include: coupon, maturity, price, yield, duration, convexity,

127. The apparatus of claim 113, further, comprising:

provide a recommendation to change a composition of the asset holdings so that the asset holdings will match the index.

128. The apparatus of claim 127, further, comprising:

effecting a trade of assets per the recommendation.

129. The apparatus of claim 128, wherein the effectuation of the trade occurs if a user approves the transaction.

130. The apparatus of claim 129, wherein the user is an investor.

131. The apparatus of claim 129, wherein the user is a financial advisor.

132. The apparatus of claim 128, wherein the effectuation of the trade occurs based on a setting specification.

133. The apparatus of claim 132, wherein the setting specification is set to automatically execute trades if there is no user response to the recommendation.

134. The apparatus of claim 132, wherein the setting specification is set to not execute trades if there is no user response to the recommendation.

135. The apparatus of claim 113, wherein the adjustment of the portfolio of asset holdings to the index is based on an asset portfolio component alignment heuristic that employs duration and convexity to select assets for the portfolio.

136. The apparatus of claim 135, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each;

g) selects the assets with a smallest combined duration and convexity rank differential within each cell;

h) distributes each group's market weight between its constituents;

i) sub-divides each group's constituents; and j) rebalances.

137. The apparatus of claim 136, wherein that weight threshold is 0.5%.

138. The apparatus of claim 136, wherein the rank is by an absolute value of the difference between the duration of the assets and the duration of each cell.

139. The apparatus of claim 113, wherein the assets may include bonds, currencies, stocks, mutual funds, synthetics.

140. The apparatus of claim 113, wherein the adjustment of the portfolio of asset holdings to the index recurs with a specified frequency.

141. The apparatus of claim 140, wherein the specified frequency includes: continuous updates, a specified number of seconds, a specified number of minutes, a specified number of hours, a specified number of days, a specified number of weeks, a specified number of months, a specified number of quarters, a specified number of years.

142. The apparatus of claim 140, wherein the specified frequency is based on a triggering event.

143. The apparatus of claim 142, wherein the triggering event may be: a user login, an update to an economic indicator, a specified function.

144. The apparatus of claim 113 wherein the adjustment of the portfolio of asset holdings matches the index to a degree specified by tolerances for index adjustment parameters.

145. The apparatus of claim 144, wherein the index adjustment parameters may include maturity, duration, state.

146. The apparatus of claim 113, wherein the adjustment of the portfolio of asset holdings to the index is constrained by an investor's profile.

147. The apparatus of claim 146, wherein the investor's profile includes a measure of the investor's tolerance of risk and earning goals.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method to adjust a portfolio, comprising:

selecting by a processor an index of assets;

selecting a portfolio of asset holdings;

selecting by the processor component assets within the index that adjust to match the index, wherein the selection of component assets is based on indicate risk characteristics, wherein the selection of component assets is based on an asset portfolio component alignment heuristic that employs duration and convexity to select assets for the portfolio, wherein duration is equal to V_−V+2Vo(Ay)

wherein convexity is equal to V++V__−2Vo where:

Δy is a change in rate used to calculate new values,

V+ is a price if the yield is increased by Δy,

V_ is a price if the yield is decreased by Ay, and

Vo is an initial price, wherein the asset portfolio component alignment heuristic, includes:

a) targeting a number of assets to be included in a basket;

b) splitting the index into a number of groups composed of different assets;

c) determining a number of assets that will comprise each group;

d) excluding all assets with an issuer weight less than some weight threshold setting;

e) splitting each group into duration cells;

f) ranking the assets in each cell, wherein the ranking is by an absolute value of the difference between the duration of the assets and the duration of each cell;

g) selecting the assets with a smallest combined duration and convexity ranking differential within each cell;

h) distributing each group's market weight between its constituents;

i) sub-dividing each group's constituents; and j) rebalancing;

providing a recommendation to change a composition of the asset holdings so that the asset holdings will match the index; and adjusting by the processor the portfolio of asset holdings to match the index by effecting a trade of assets per the recommendation, wherein the effectuation of the trade occurs if a user approves the transaction, wherein the adjustment of the portfolio of asset holdings to the index recurs with a specified frequency, and wherein the adjustment of the portfolio of asset holdings matches the index to a degree specified by tolerances for index adjustment parameters.

2. A processor-implemented method to adjust a portfolio, comprising:

selecting by a processor an index of assets;

selecting a portfolio of asset holdings;

selecting component assets that adjust to match the index; and adjusting by the processor the portfolio of asset holdings to match the index wherein the selection of component assets is based on an asset portfolio component alignment heuristic that employs duration and convexity to select assets for the portfolio wherein duration is equal to (V−V+)/(2Vo(Δy) where:

Δy is a change in rate used to calculate new values;

V± is a price if the yield is increased by Δy;

V is a price if the yield is decreased by Δy; and

Vo is an initial price.

3. The method of claim 2, wherein the selection of component assets that replicate the index is made by selecting component assets within the index.

4. The method of claim 2, wherein the selection of component assets that replicate the index is made by selecting component assets within the portfolio.

5. The method of claim 2, wherein the component assets are synthetics.

6. The method of claim 5, wherein convexity is equal to $(V_{+}+V_{-}-2V_{o})/(2V_{o}(\Delta y)^{2})$ where:

$\Delta y$ is a change in rate used to calculate new values;

V+ is a price if the yield is increased by $\Delta y$;

V_ is a price if the yield is decreased by $\Delta y$; and

Vo is an initial price.

7. The method of claim 2, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than a weight threshold setting;

e) splits each group into duration cells;

f) ranks the assets in each cell;

g) selects the assets with a smallest combined duration and convexity ranking differential within each cell;

h) distributes each group's market weight between each group's constituents;

i) sub-divides each group's constituents; and j) rebalances.

8. The method of claim 7, wherein that weight threshold is 0.5%.

9. The method of claim 7, wherein the ranking is by an absolute value of the difference between the duration of the assets and the duration of each cell.

10. The method of claim 2, wherein the selection of component assets is based on indicative, risk and tax characteristics.

11. The method of claim 10, wherein the indicative characteristics may include: coupon, maturity, price, yield.

12. The method of claim 10, wherein the risk characteristics may include: duration, convexity, option adjusted spreads that may include: coupon, maturity, price, yield, duration, convexity.

13. The method of claim 2, further comprising: providing a recommendation to change a composition of the asset holdings so that the asset holdings will match the index.

14. The method of claim 13, further comprising: effecting a trade of assets per the recommendation.

15. The method of claim 14, wherein the effectuation of the trade occurs if a user approves the transaction.

16. The method of claim 15, wherein the user is an investor.

17. The method of claim 15, wherein the user is a financial advisor.

18. The method of claim 14, wherein the effectuation of the trade occurs based on a setting specification.

19. The method of claim 18, wherein the setting specification is set to automatically execute trades if there is no user response to the recommendation.

20. The method of claim 18, wherein the setting specification is set to not execute trades if there is no user response to the recommendation.

21. The method of claim 2, wherein the adjustment of the portfolio of asset holdings to the index is based on an asset portfolio component alignment heuristic that employs duration and convexity to select assets for the portfolio.

22. The method of claim 21, wherein the selection of component assets is based on an asset portfolio component alignment heuristic that:

a) targets a number of assets to be included in a basket;

b) splits the index into a number of groups composed of different assets;

c) determines a number of assets that will comprise each group;

d) excludes all assets with an issuer weight less than some weight threshold setting;

e) splits each group into duration cells;

f) ranks the assets in each;

g) selects the assets with a smallest combined duration and convexity ranking differential within each cell;

h) distributes each group's market weight between its constituents;

i) sub-divides each group's constituents; and j) rebalances.

23. The method of claim 22, wherein that weight threshold is 0.5%.

24. The method of claim 22, wherein the ranking is by an absolute value of the difference between the duration of the assets and the duration of each cell.

25. The method of claim 2, wherein the assets may include bonds, currencies, stocks, mutual funds, synthetics.

26. The method of claim 2, wherein the adjustment of the portfolio of asset holdings to the index recurs with a specified frequency.

27. The method of claim 26, wherein the specified frequency includes: continuous updates, a specified number of seconds, a specified number of minutes, a specified number of hours, a specified number of days, a specified number of weeks, a specified number of months, a specified number of quarters, a specified number of years.

28. The method of claim 26, wherein the specified frequency is based on a triggering event.

29. The method of claim 28, wherein the triggering event may be: a user login, an update to an economic indicator, a specified function.

30. The method of claim 2 wherein the adjustment of the portfolio of asset holdings matches the index to a degree specified by tolerances for index adjustment parameters.

31. The method of claim 30, wherein the index adjustment parameters may include maturity, duration, state.

32. The method of claim 2, wherein the adjustment of the portfolio of asset holdings to the index is constrained by an investors profile.

33. The method of claim 32, wherein the investors profile includes a measure of the investors tolerance of risk and earning goals.

* * * * *